US012368679B2

(12) United States Patent
Yamaura et al.

(10) Patent No.: US 12,368,679 B2
(45) Date of Patent: Jul. 22, 2025

(54) COMMUNICATION CONTROL DEVICE, INFORMATION PROCESSING DEVICE, COMMUNICATION CONTROL METHOD, INFORMATION PROCESSING METHOD, AND STORAGE MEDIUM

(71) Applicant: KABUSHIKI KAISHA TOSHIBA, Tokyo (JP)

(72) Inventors: Takahiro Yamaura, Kawasaki (JP); Yasin Oge, Sagamihara (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 383 days.

(21) Appl. No.: 17/930,385

(22) Filed: Sep. 7, 2022

(65) Prior Publication Data
US 2023/0171200 A1 Jun. 1, 2023

(30) Foreign Application Priority Data
Dec. 1, 2021 (JP) ................. 2021-195485

(51) Int. Cl.
*H04L 47/56* (2022.01)
(52) U.S. Cl.
CPC .................. *H04L 47/562* (2013.01)
(58) Field of Classification Search
CPC ...................................... H04L 47/562
See application file for complete search history.

(56) References Cited

U.S. PATENT DOCUMENTS

| 10,511,455 | B1* | 12/2019 | Sharma | H04L 69/12 |
| 2008/0228977 | A1* | 9/2008 | Dignum | G06F 13/1642 |
| | | | | 710/240 |
| 2018/0309655 | A1* | 10/2018 | Joseph | H04L 43/50 |
| 2019/0007344 | A1* | 1/2019 | Mangin | H04L 47/6275 |

(Continued)

FOREIGN PATENT DOCUMENTS

| JP | 2018-125597 A | 8/2018 |
| JP | 2019-54350 | 4/2019 |

(Continued)

OTHER PUBLICATIONS

"IEEE Standard for Local and metropolitan area networks—Bridges and Bridged Networks—Amendment 26: Frame Preemption", IEEE Std 802.1Q™-2016 (Amendment to IEEE Std 802.1Q™-2014), 2016, 52 Pages.

(Continued)

*Primary Examiner* — Melanie Jagannathan
(74) *Attorney, Agent, or Firm* — Oblon, McClelland, Maier & Neustadt, L.L.P.

(57) ABSTRACT

According to one embodiment, a communication control device includes a transmission control unit and a communication unit. The transmission control unit is configured to control transmission of a message stored in a queue based on transmission control information generated from gate control information in which open or close status of a gate corresponding to each of a plurality of queues is specified. The communication unit is configured to transmit the message under control of the transmission control unit. The transmission control information indicates timing of next event related to the transmission of the message when the transmission of the message is controlled.

14 Claims, 50 Drawing Sheets

(56) References Cited

U.S. PATENT DOCUMENTS

| | | | |
|---|---|---|---|
| 2019/0104073 A1* | 4/2019 | Choi | H04W 72/0446 |
| 2019/0121781 A1* | 4/2019 | Kasichainula | G06F 15/17331 |
| 2019/0158620 A1* | 5/2019 | Oge | H04L 47/2416 |
| 2019/0166061 A1* | 5/2019 | Farkas | H04L 47/6275 |
| 2019/0199641 A1* | 6/2019 | Lo Bello | H04L 47/22 |
| 2019/0199642 A1* | 6/2019 | Jiang | H04L 45/50 |
| 2019/0215832 A1 | 7/2019 | Nishimura | |
| 2019/0306075 A1* | 10/2019 | Nishimura | H04L 43/0894 |
| 2019/0356612 A1* | 11/2019 | Hikimochi | H04L 49/9084 |
| 2020/0213240 A1* | 7/2020 | Götz | H04L 47/28 |
| 2020/0259896 A1* | 8/2020 | Sachs | H04W 56/0065 |
| 2020/0389405 A1* | 12/2020 | Mardmoeller | H04L 47/34 |
| 2021/0014177 A1* | 1/2021 | Kasichainula | H04L 47/6295 |
| 2021/0226843 A1* | 7/2021 | Bhaduri | H04L 41/0806 |
| 2021/0377181 A1* | 12/2021 | Oge | H04L 41/0661 |
| 2021/0377189 A1 | 12/2021 | Yamaura et al. | |
| 2022/0104062 A1* | 3/2022 | Aijaz | H04W 28/0268 |
| 2022/0197841 A1 | 6/2022 | Yamaura et al. | |
| 2022/0345417 A1* | 10/2022 | Kasichainula | H04L 47/30 |
| 2023/0291692 A1* | 9/2023 | Bonneville | H04L 47/2491 |

FOREIGN PATENT DOCUMENTS

| | | |
|---|---|---|
| JP | 2019-96930 | 6/2019 |
| JP | 6867240 B2 | 4/2021 |
| JP | 2021-190902 A | 12/2021 |
| JP | 2022-96476 A | 6/2022 |

OTHER PUBLICATIONS

"IEEE Standard for Local and metropolitan area networks—Bridges and Bridged Networks—Amendment 25: Enhancements for Scheduled Traffic", IEEE Std 802.1Qbv™-2015 (Amendment to IEEE Std 802.1Q™-2014 as amended by IEEE Std 802.1Qca™-2015, IEEE Std 802.1Qcd™-2015, and IEEE Std 802.1Q-2014/Cor 1-2015), 2016, 57 Pages.

"IEEE Standard for Local and Metropolitan Area Networks—Bridges and Bridged Networks", IEEE Std 802.1Q™-2018 (Revision of IEEE Std 802.1Q-2014), 2018, 1,993 Pages.

"IEEE Standard for Ethernet—Amendment 5: Specification and Management Parameters for Interspersing Express Traffic", IEEE Std 802.3br™-2016 (Amendment to IEEE Std 802.3™-2015 as amended by IEEE Std 802.3bw™-2015, IEEE Std 802.3by™-2016, IEEE Std 802.3bq™-2016, and IEEE Std 802.3bp™-2016), 2016, 58 Pages.

Lo Bello et al., "Schedulability analysis of Time-Sensitive Networks with Scheduled Traffic and preemption support", Journal of Parallel and Distributed Computing, vol. 144, 2020, pp. 153-177.

Office Action mailed Feb. 12, 2025, in Japanese Application No. 2021-195485 filed Dec. 1, 2021 (w/computer-generated English translation).

* cited by examiner

|  | Operations | Gate statuses | | | | | | | | Time intervals |
|---|---|---|---|---|---|---|---|---|---|---|
|  |  | TC7 | TC6 | TC5 | TC4 | TC3 | TC2 | TC1 | TC0 |  |
| T00 | SetGateStates | o | c | o | c | o | c | o | o | 128μs |
| T01 | SetGateStates | c | o | o | o | o | o | o | o | 128μs |
| T02 | SetGateStates | o | o | c | o | c | o | c | o | 512μs |
| T03 | SetGateStates | o | o | c | o | c | o | c | o | 128μs |
| T04 | SetGateStates | c | c | o | c | o | c | o | o | 128μs |
| T05 | SetGateStates | o | c | o | c | o | c | o | o | 512μs |

F I G. 3

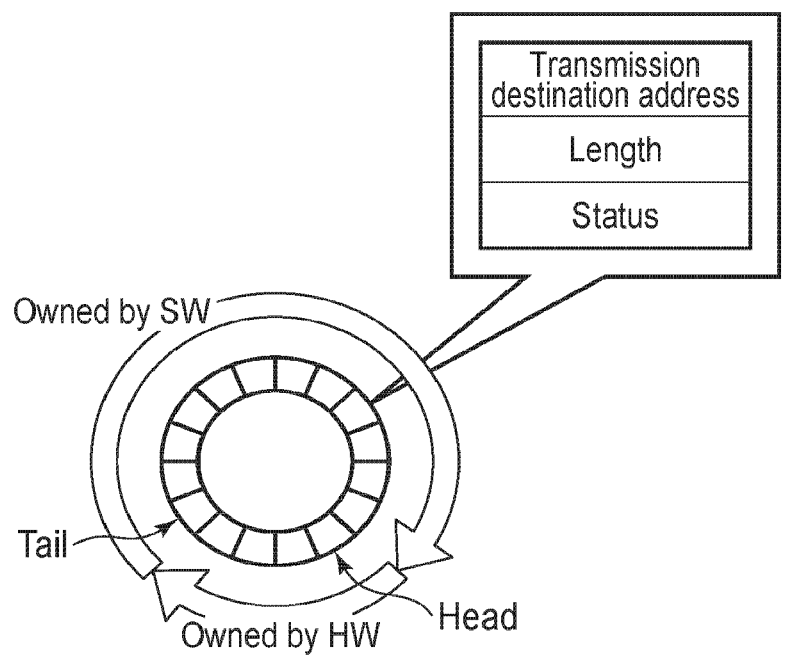
F I G. 4
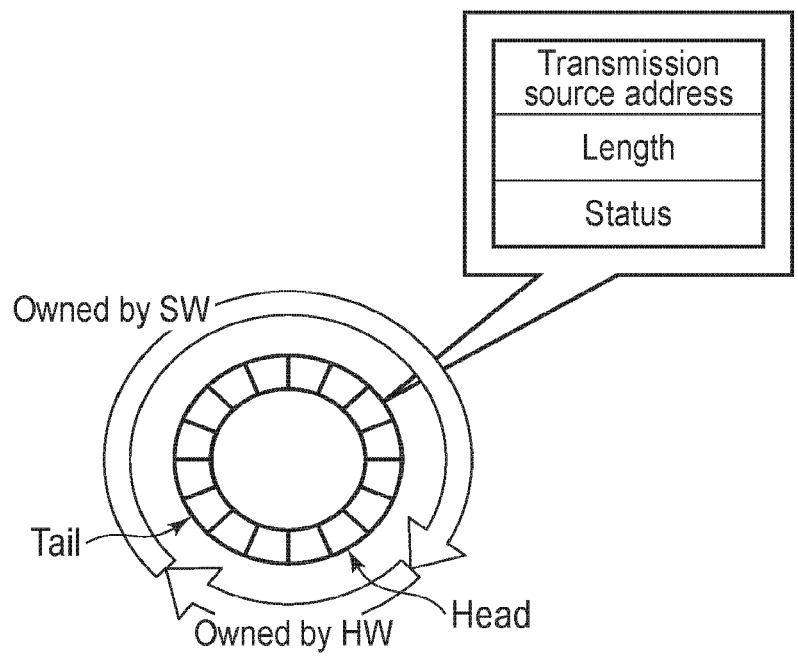
F I G. 5

| Traffic classes | TC7 | TC6 | TC5 | TC4 | TC3 | TC2 | TC1 | TC0 |
|---|---|---|---|---|---|---|---|---|
| Frame preemption statuses | Express | Express | Express | Express | Express | Express | Express | Preemptable |

FIG. 6

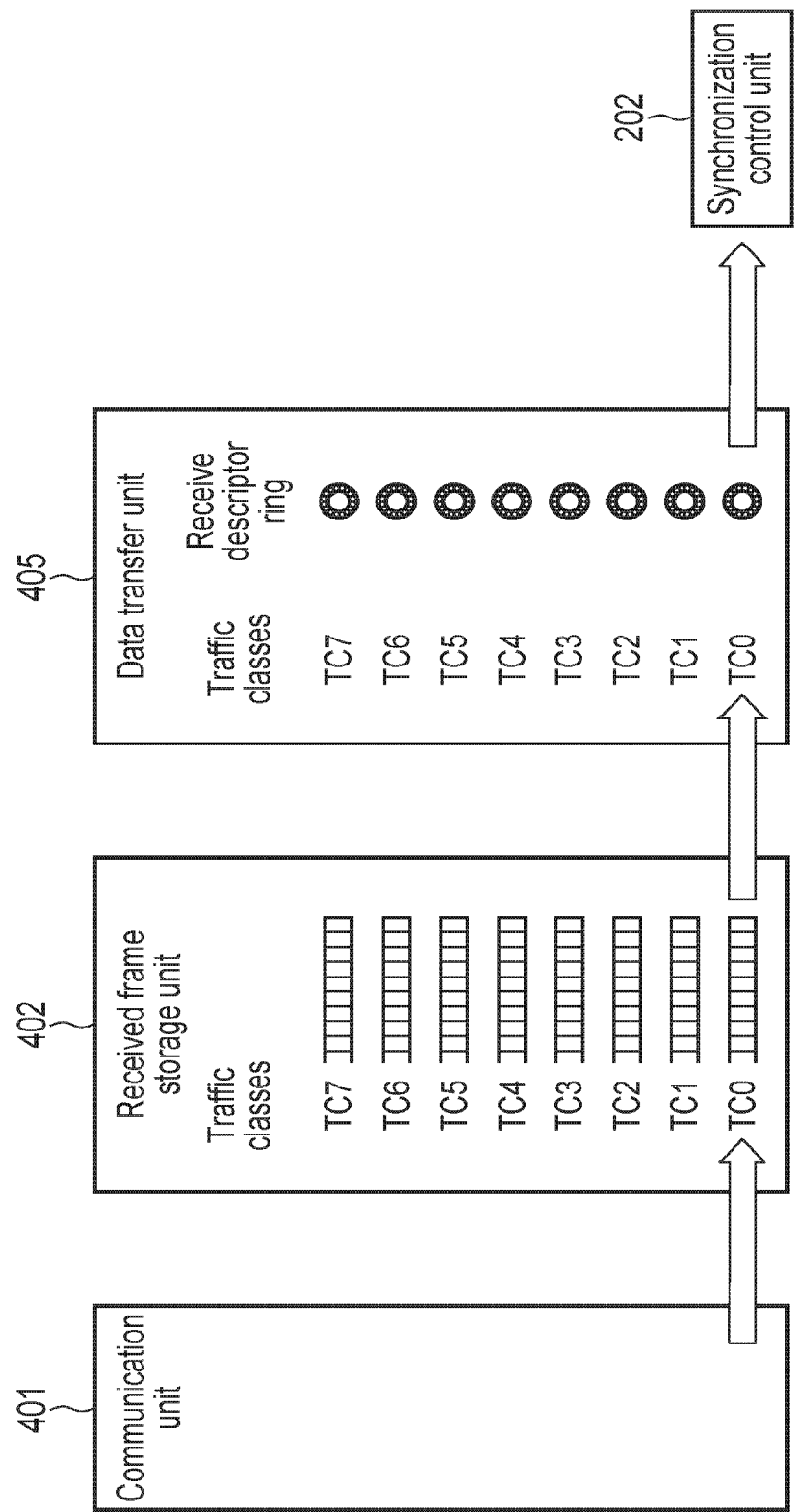
F I G. 7

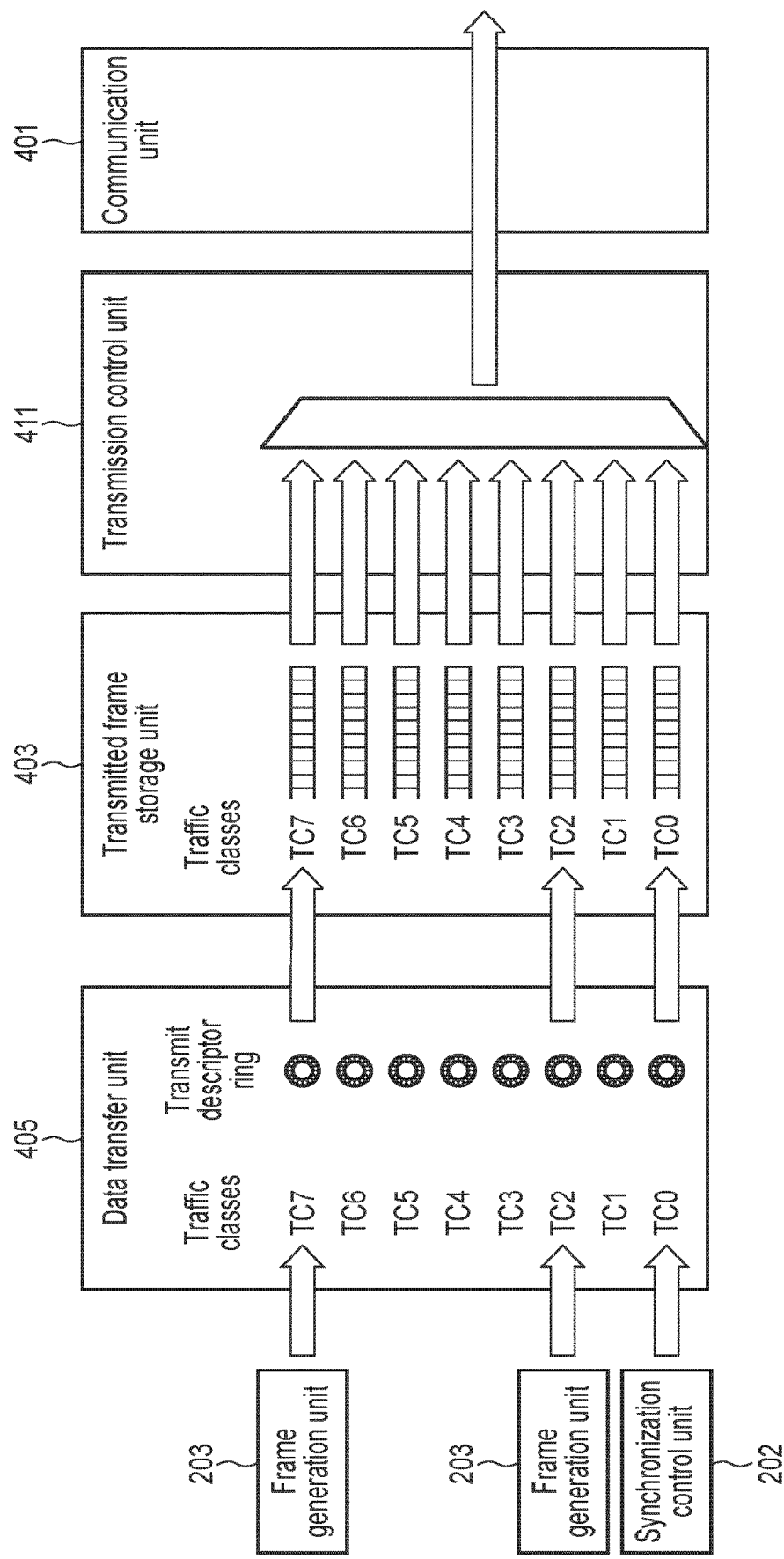
F I G. 8

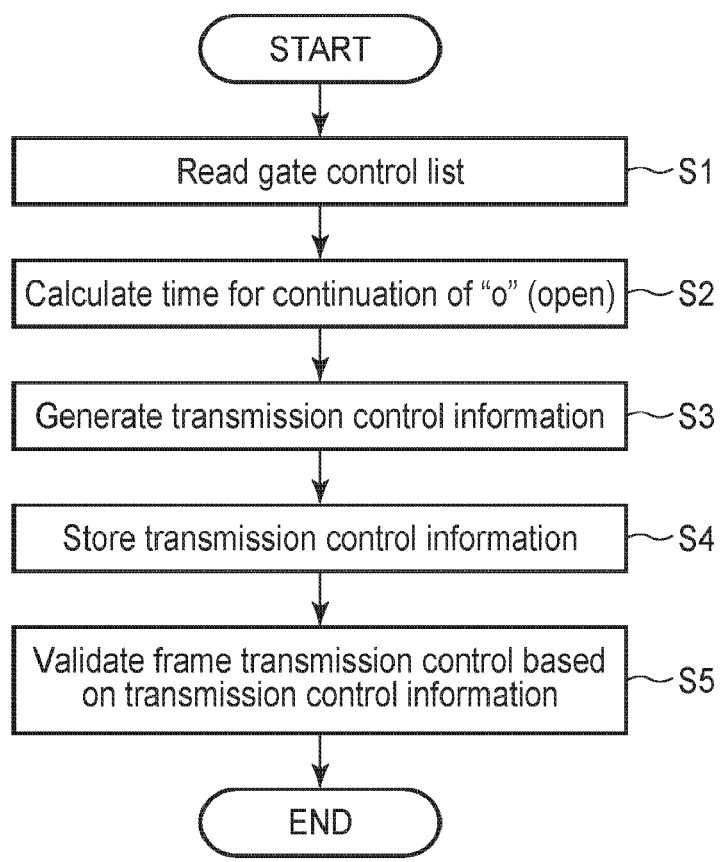
F I G. 9

| | Gate statuses | | | | | | | | Time intervals |
|---|---|---|---|---|---|---|---|---|---|
| | TC7 | TC6 | TC5 | TC4 | TC3 | TC2 | TC1 | TC0 | |
| T00 | o (128μs) | C | o (256μs) | C | o (256μs) | C | o (256μs) | o (∞) | 128μs |
| T01 | C | o (768μs) | o (128μs) | o (768μs) | o (128μs) | o (768μs) | o (128μs) | o (∞) | 128μs |
| T02 | o (640μs) | o (640μs) | C | o (640μs) | C | o (640μs) | C | o (∞) | 512μs |
| T03 | o (128μs) | o (128μs) | C | o (128μs) | C | o (128μs) | C | o (∞) | 128μs |
| T04 | C | C | o (896μs) | C | o (896μs) | C | o (896μs) | o (∞) | 128μs |
| T05 | o (640μs) | C | o (768μs) | C | o (768μs) | C | o (768μs) | o (∞) | 512μs |

FIG. 10

| Period information | Transmittable information (Frame transmittable time) | | | | | | | |
| --- | --- | --- | --- | --- | --- | --- | --- | --- |
| Time | TC7 | TC6 | TC5 | TC4 | TC3 | TC2 | TC1 | TC0 |
| <128μs | 128μs | 0μs | 256μs | 0μs | 256μs | 0μs | 256μs | ∞ |
| <256μs | 0μs | 768μs | 128μs | 768μs | 128μs | 768μs | 128μs | ∞ |
| <768μs | 640μs | 640μs | 0μs | 640μs | 0μs | 640μs | 0μs | ∞ |
| <896μs | 128μs | 128μs | 0μs | 128μs | 0μs | 128μs | 0μs | ∞ |
| <1024μs | 0μs | 0μs | 896μs | 0μs | 896μs | 0μs | 896μs | ∞ |
| <1536μs | 640μs | 0μs | 768μs | 0μs | 768μs | 0μs | 768μs | ∞ |

F I G. 11

| Period information | Transmittable information (Frame transmittable time) | | | | | | | | |
|---|---|---|---|---|---|---|---|---|---|
| Time | TC7 | TC6 | TC5 | TC4 | TC3 | TC2 | TC1 | TC0 |
| <128μs | 128μs | | | | | | | ∞ |
| <256μs | | 768μs | 256μs | | 256μs | | 256μs | |
| <768μs | 640μs | | | 768μs | | 768μs | | |
| <896μs | | | | | | | | |
| <1024μs | | | 896μs | | 896μs | | 896μs | |
| <1536μs | 640μs | | | | | | | |

F I G. 12

| Period information | Transmittable information (Number of frame transmittable bits) | | | | | | | |
|---|---|---|---|---|---|---|---|---|
| Time | TC7 | TC6 | TC5 | TC4 | TC3 | TC2 | TC1 | TC0 |
| <128μs | 128000 | 0 | 256000 | 0 | 256000 | 0 | 256000 | ∞ |
| <256μs | 0 | 768000 | 128000 | 768000 | 128000 | 768000 | 128000 | ∞ |
| <768μs | 640000 | 640000 | 0 | 640000 | 0 | 640000 | 0 | ∞ |
| <896μs | 128000 | 128000 | 0 | 128000 | 0 | 128000 | 0 | ∞ |
| <1024μs | 0 | 0 | 896000 | 0 | 896000 | 0 | 896000 | ∞ |
| <1536μs | 640000 | 0 | 768000 | 0 | 768000 | 0 | 768000 | ∞ |

F I G. 13

| Period information | Transmittable information (Number of frame transmittable bits) | | | | | | | |
| --- | --- | --- | --- | --- | --- | --- | --- | --- |
| Time | TC7 | TC6 | TC5 | TC4 | TC3 | TC2 | TC1 | TC0 |
| <128μs | 128000 | | 256000 | | 256000 | | 256000 | ∞ |
| <256μs | | 768000 | | 768000 | | 768000 | | |
| <768μs | 640000 | | | | | | | |
| <896μs | | | | | 896000 | | | |
| <1024μs | | | 896000 | | | | 896000 | |
| <1536μs | 640000 | | | | | | | |

F I G. 14

| Period information | Transmittable information (Number of frame transmittable bits) | | | | | | | |
|---|---|---|---|---|---|---|---|---|
| Number of bits | TC7 | TC6 | TC5 | TC4 | TC3 | TC2 | TC1 | TC0 |
| <128000 | 128000 | 0 | 256000 | 0 | 256000 | 0 | 256000 | ∞ |
| <256000 | 0 | 768000 | 128000 | 768000 | 128000 | 768000 | 128000 | ∞ |
| <768000 | 640000 | 640000 | 0 | 640000 | 0 | 640000 | 0 | ∞ |
| <896000 | 128000 | 128000 | 0 | 128000 | 0 | 128000 | 0 | ∞ |
| <1024000 | 0 | 0 | 896000 | 0 | 896000 | 0 | 896000 | ∞ |
| <1536000 | 640000 | 0 | 768000 | 0 | 768000 | 0 | 768000 | ∞ |

F I G. 15

| Period information | Transmittable information (Number of frame transmittable bits) | | | | | | | |
|---|---|---|---|---|---|---|---|---|
| Number of bits | TC7 | TC6 | TC5 | TC4 | TC3 | TC2 | TC1 | TC0 |
| <128000 | 128000 | | | | | | 256000 | ∞ |
| <256000 | 640000 | 768000 | 256000 | | 256000 | | | |
| <768000 | | | | 768000 | | 768000 | | |
| <896000 | | | 896000 | | 896000 | | 896000 | |
| <1024000 | 640000 | | | | | | | |
| <1536000 | 640000 | | | | | | | |

F I G. 16

| Period information | Transmittable information (Number of frame transmittable bits) | | | | | | | |
|---|---|---|---|---|---|---|---|---|
| Time intervals (Number of clock cycles) | TC7 | TC6 | TC5 | TC4 | TC3 | TC2 | TC1 | TC0 |
| 20000 | 128000 | 0 | 256000 | 0 | 256000 | 0 | 256000 | ∞ |
| 20000 | 0 | 768000 | 128000 | 768000 | 128000 | 768000 | 128000 | ∞ |
| 80000 | 640000 | 640000 | 0 | 640000 | 0 | 640000 | 0 | ∞ |
| 20000 | 128000 | 128000 | 0 | 128000 | 0 | 128000 | 0 | ∞ |
| 20000 | 0 | 0 | 896000 | 0 | 896000 | 0 | 896000 | ∞ |
| 80000 | 640000 | 0 | 768000 | 0 | 768000 | 0 | 768000 | ∞ |

F I G. 17

| Period information | Transmittable information (Number of frame transmittable bits) | | | | | | | |
|---|---|---|---|---|---|---|---|---|
| Time intervals (Number of clock cycles) | TC7 | TC6 | TC5 | TC4 | TC3 | TC2 | TC1 | TC0 |
| 20000 | 128000 | | 256000 | | 256000 | | 256000 | ∞ |
| 20000 | | 768000 | | 768000 | | 768000 | | |
| 80000 | 640000 | | | | | | | |
| 20000 | | | 896000 | | 896000 | | 896000 | |
| 80000 | 640000 | | | | | | | |

F I G. 18

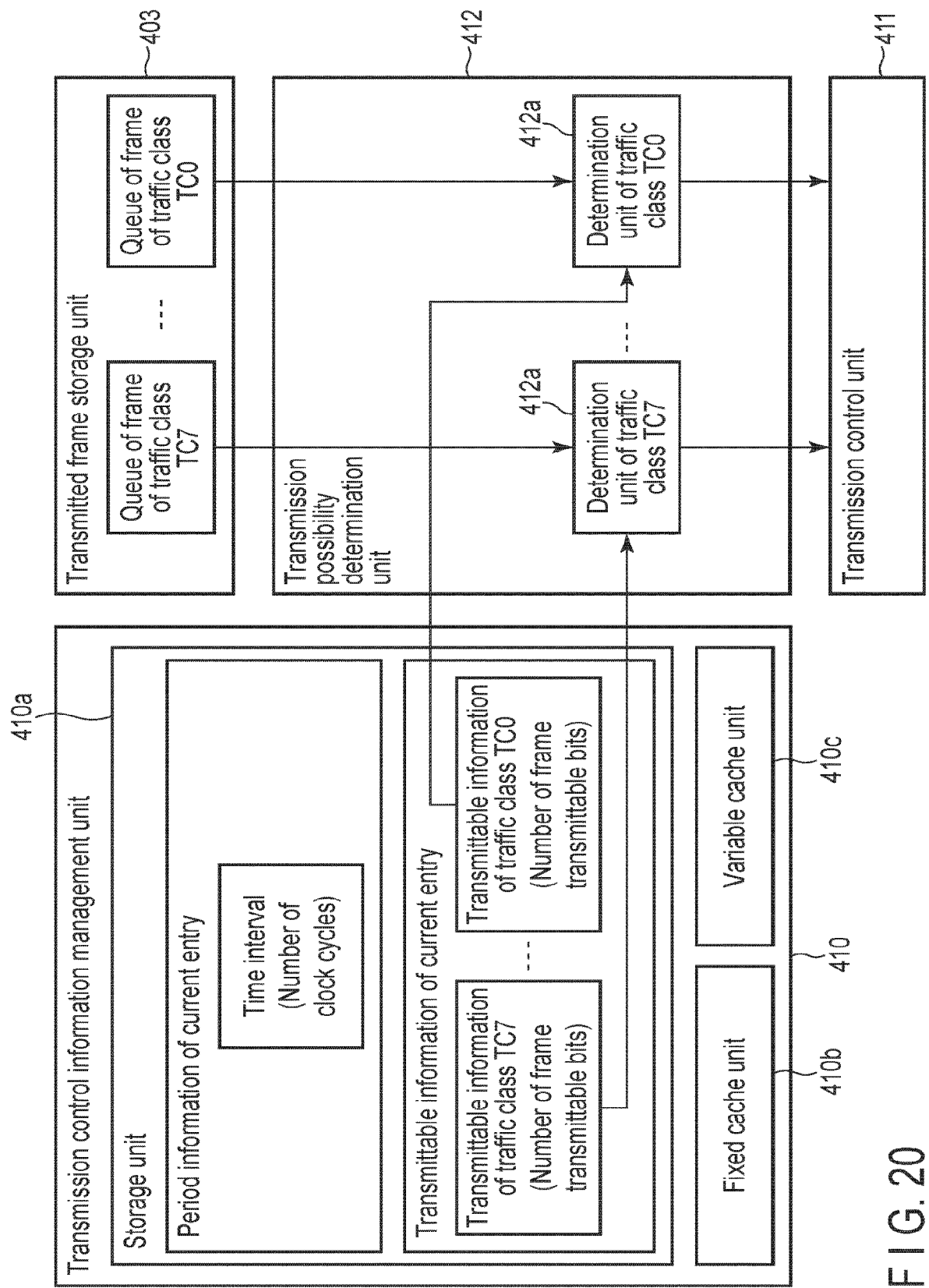
F I G. 20

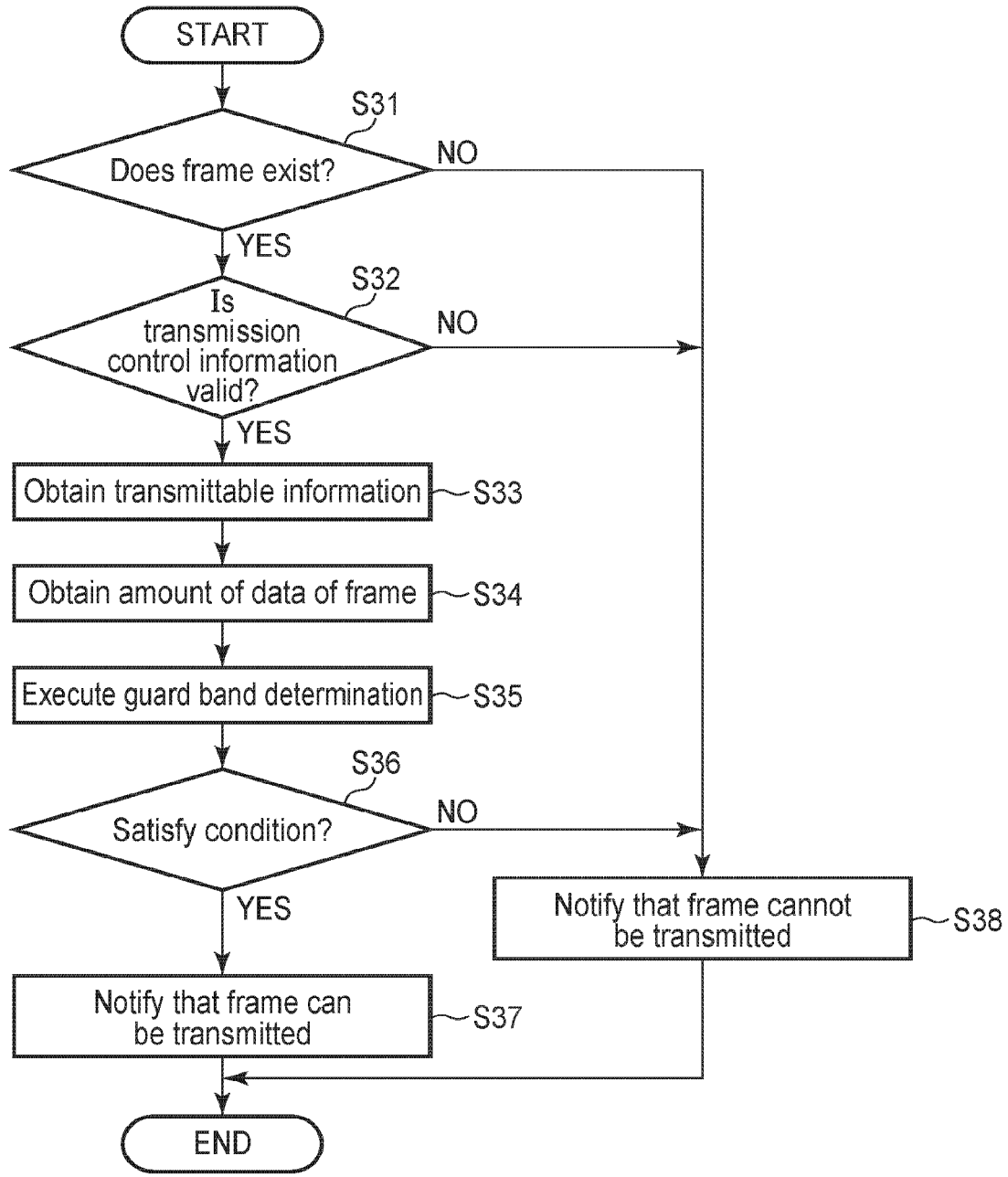
F I G. 22

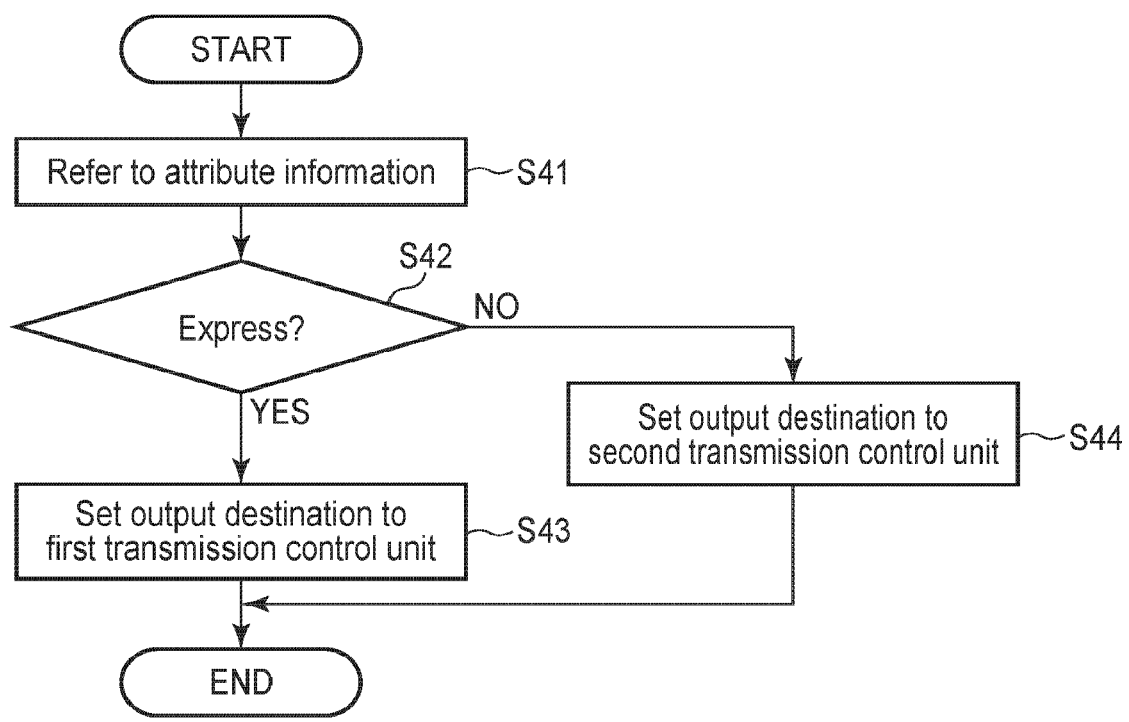
F I G. 24

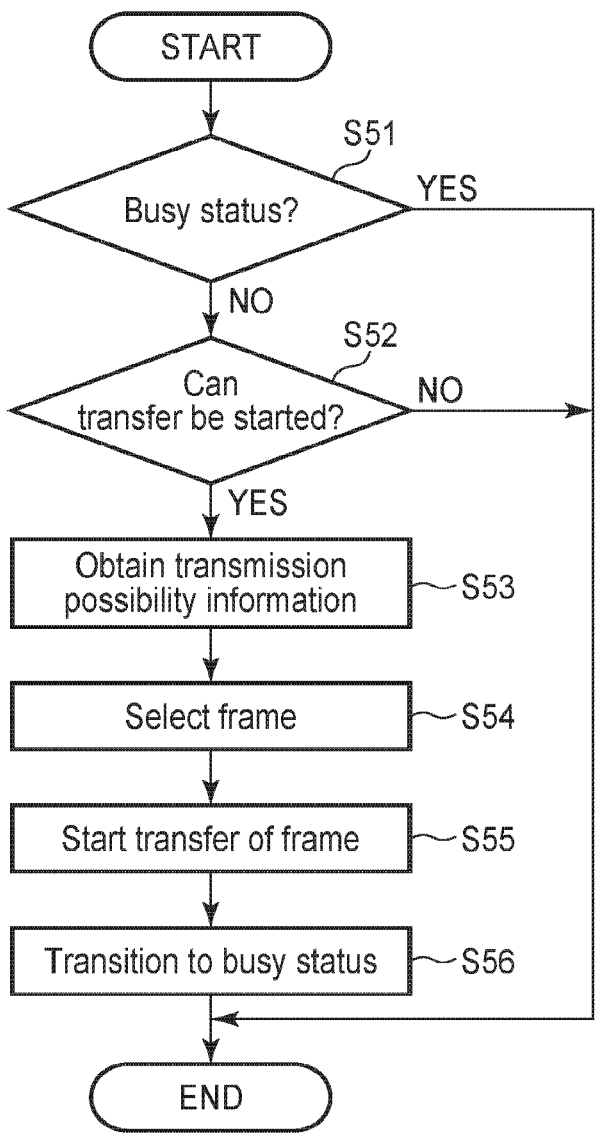
F I G. 25

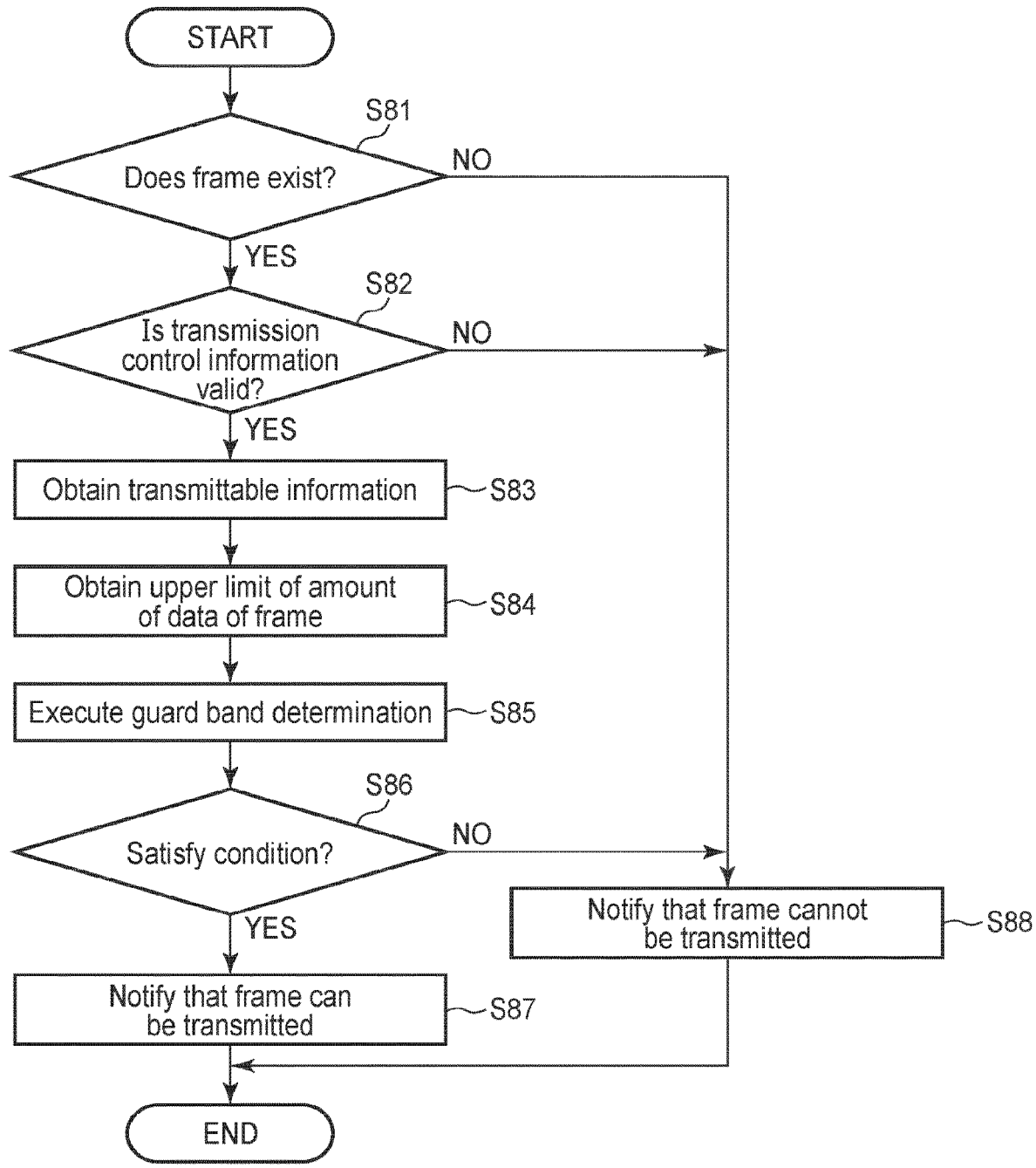
F I G. 27

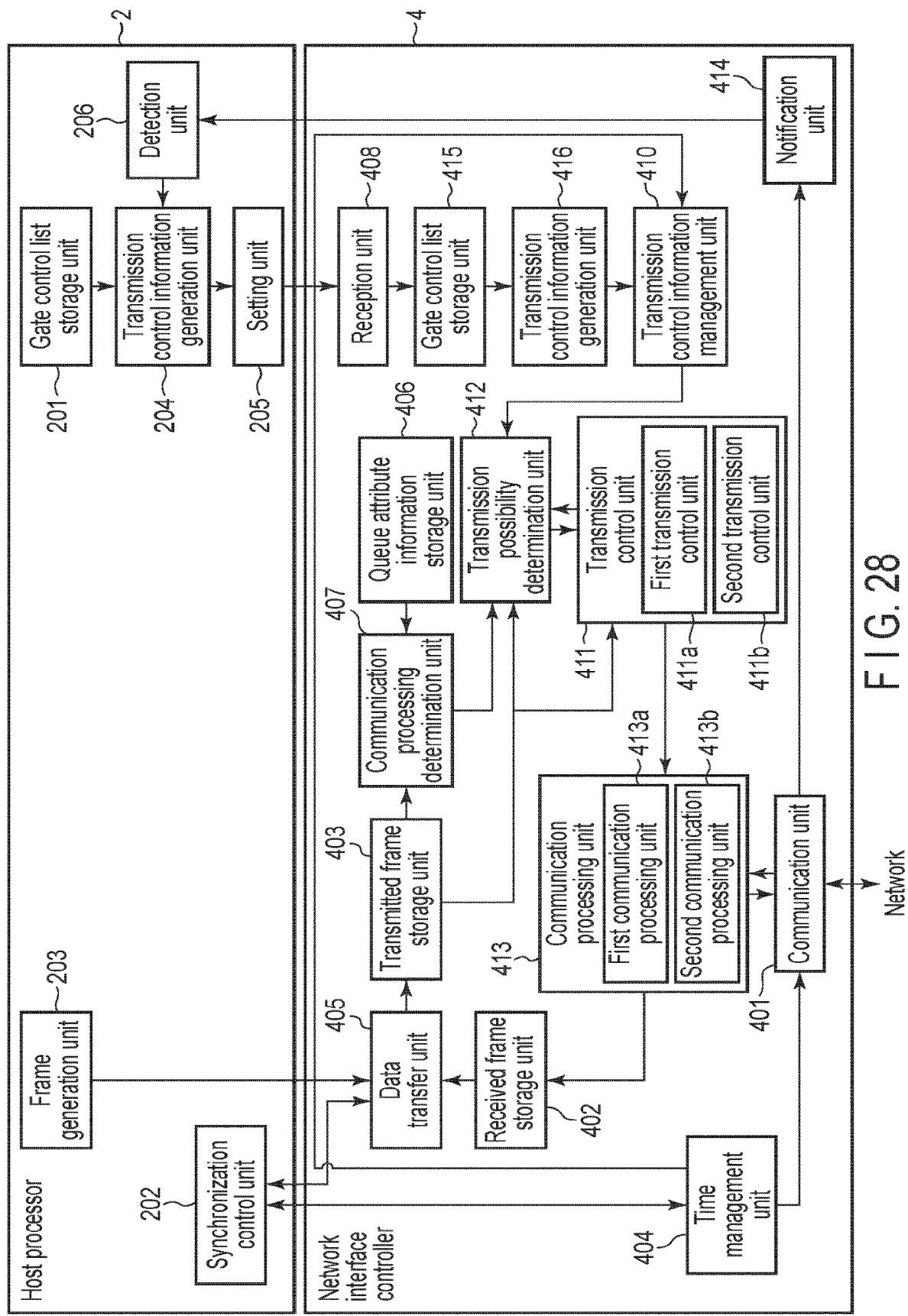
F I G. 28

| | Operations | Gate statuses | | | | | | | | | Time intervals |
|---|---|---|---|---|---|---|---|---|---|---|---|
| | | TC7 | TC6 | TC5 | TC4 | TC3 | TC2 | TC1 | TC0 | | |
| T00 | SetGateStates | O | C | O | C | O | C | O | O | | 128μs |
| T01 | SetGateStates | C | O | O | O | O | O | O | O | | 128μs |
| T02 | Set-And-Hold-MAC | O | O | C | O | C | O | C | O | | 512μs |
| T03 | Set-And-Release-MAC | O | O | C | O | C | O | C | O | | 128μs |
| T04 | SetGateStates | C | C | O | C | O | C | O | O | | 128μs |
| T05 | SetGateStates | O | C | O | C | O | C | O | O | | 512μs |

F I G. 30

| Period information | Transmittable information (Number of Frame transmittable bits) | | | | | | | | Split transmission control information | |
|---|---|---|---|---|---|---|---|---|---|---|
| Time interval (Number of clock cycles) | TC7 | TC6 | TC5 | TC4 | TC3 | TC2 | TC1 | TC0 | Initial status | Split transmission control residual (Number of clock cycles) |
| 20000 | 128000 | 0 | 256000 | 0 | 256000 | 0 | 256000 | ∞ | Release | 0 |
| 20000 | 0 | 768000 | 128000 | 768000 | 128000 | 768000 | 128000 | ∞ | Release | 5 |
| 80000 | 640000 | 640000 | 0 | 640000 | 0 | 640000 | 0 | ∞ | Hold | 1 |
| 20000 | 128000 | 128000 | 0 | 128000 | 0 | 128000 | 0 | ∞ | Release | 0 |
| 20000 | 0 | 0 | 896000 | 0 | 896000 | 0 | 896000 | ∞ | Release | 0 |
| 80000 | 640000 | 0 | 768000 | 0 | 768000 | 0 | 768000 | ∞ | Release | 0 |

F I G. 31

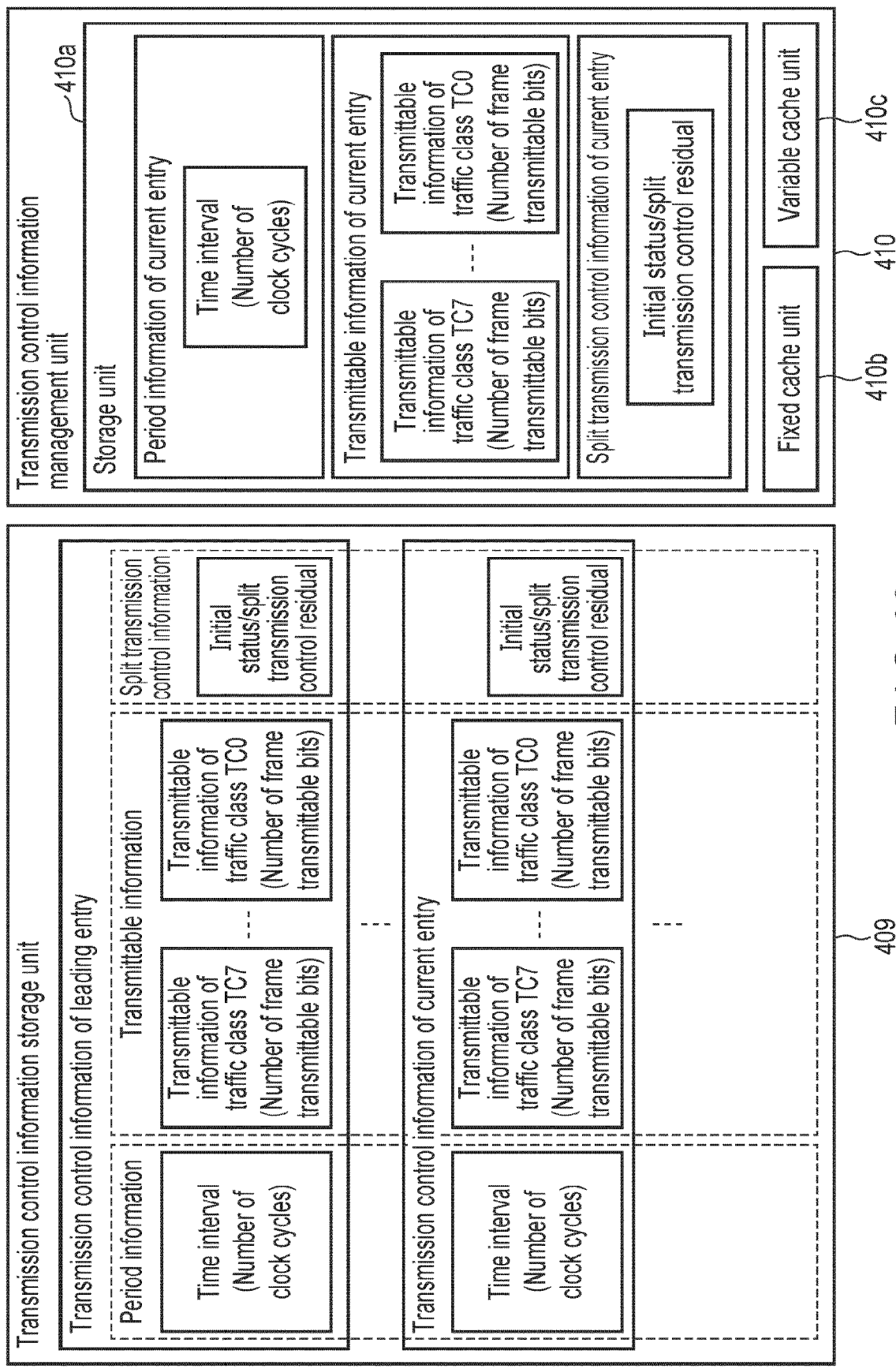
F I G. 32

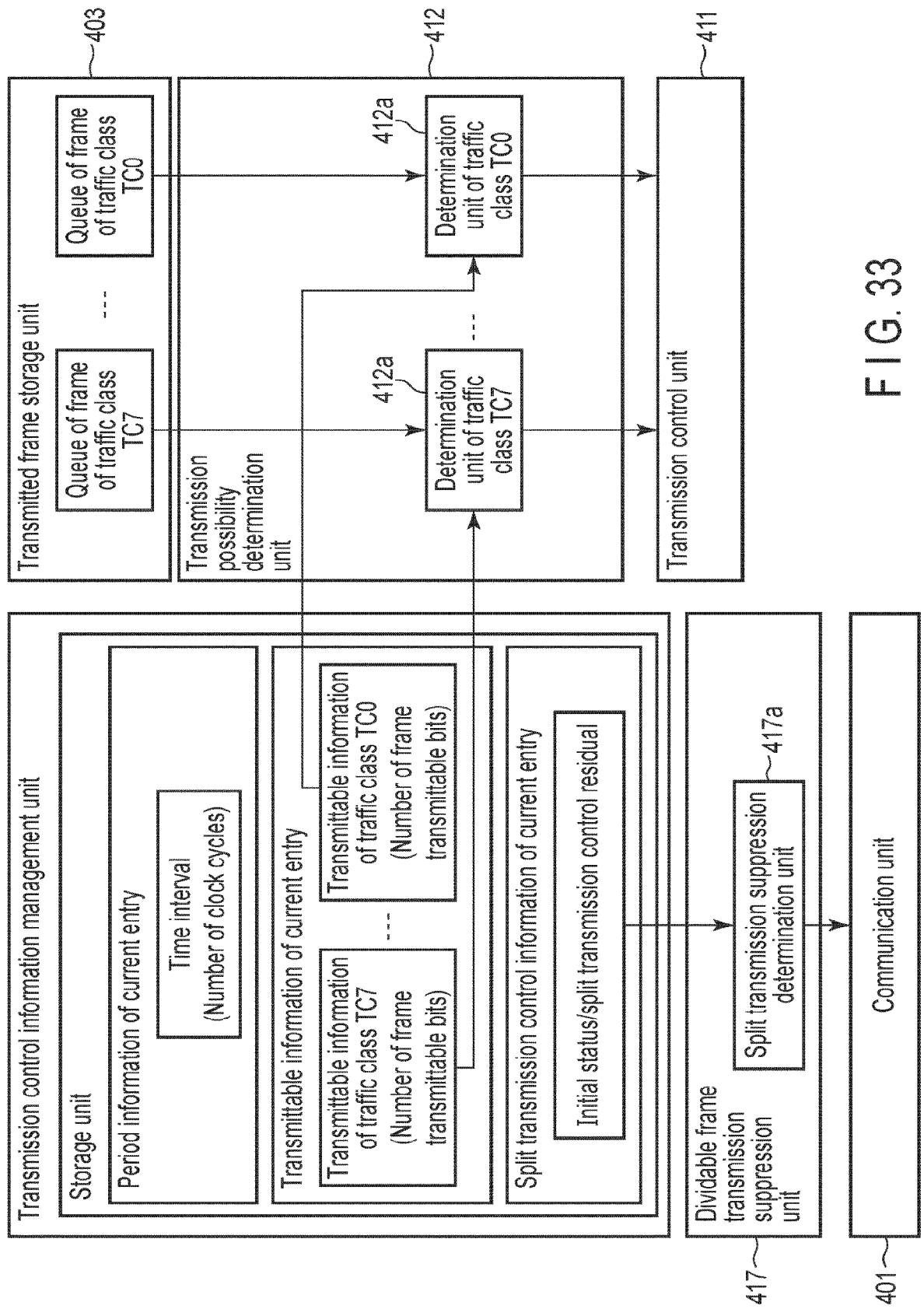
F I G. 33

| Period information | Transmittable information (Number of Frame transmittable bits) | | | | | | | | Split transmission control information | |
|---|---|---|---|---|---|---|---|---|---|---|
| Time interval (Number of clock cycles) | TC7 | TC6 | TC5 | TC4 | TC3 | TC2 | TC1 | TC0 | Initial status | Split transmission control residual (Number of clock cycles) |
| 20000 | 128000 | 0 | 256000 | 0 | 256000 | 0 | 256000 | ∞ | Release | 4294967295 |
| 20000 | 0 | 768000 | 128000 | 768000 | 128000 | 768000 | 128000 | ∞ | Release | 19995 |
| 80000 | 640000 | 640000 | 0 | 640000 | 0 | 640000 | 0 | ∞ | Hold | 79999 |
| 20000 | 128000 | 128000 | 0 | 128000 | 0 | 128000 | 0 | ∞ | Release | 4294967295 |
| 20000 | 0 | 0 | 896000 | 0 | 896000 | 0 | 896000 | ∞ | Release | 4294967295 |
| 80000 | 640000 | 0 | 768000 | 0 | 768000 | 0 | 768000 | ∞ | Release | 4294967295 |

F I G. 35

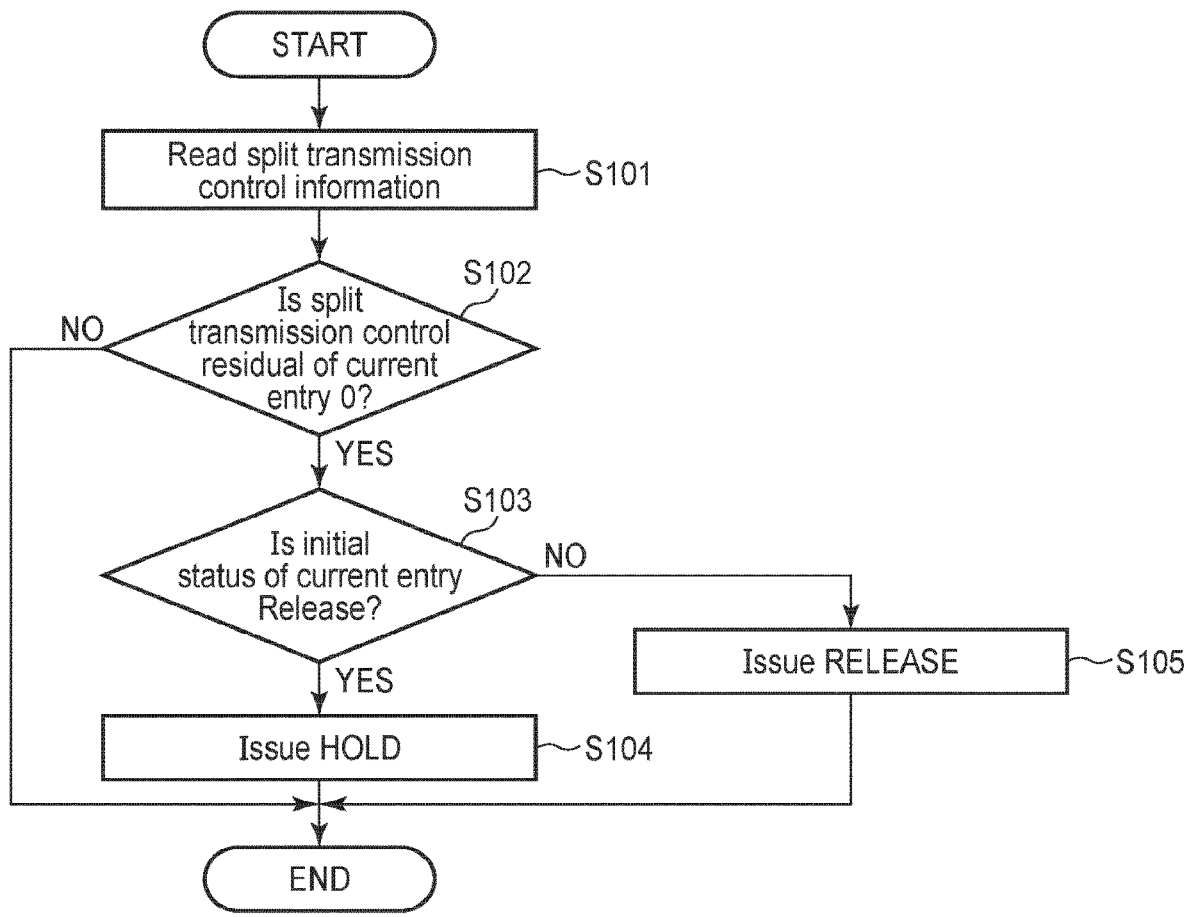
F I G. 37

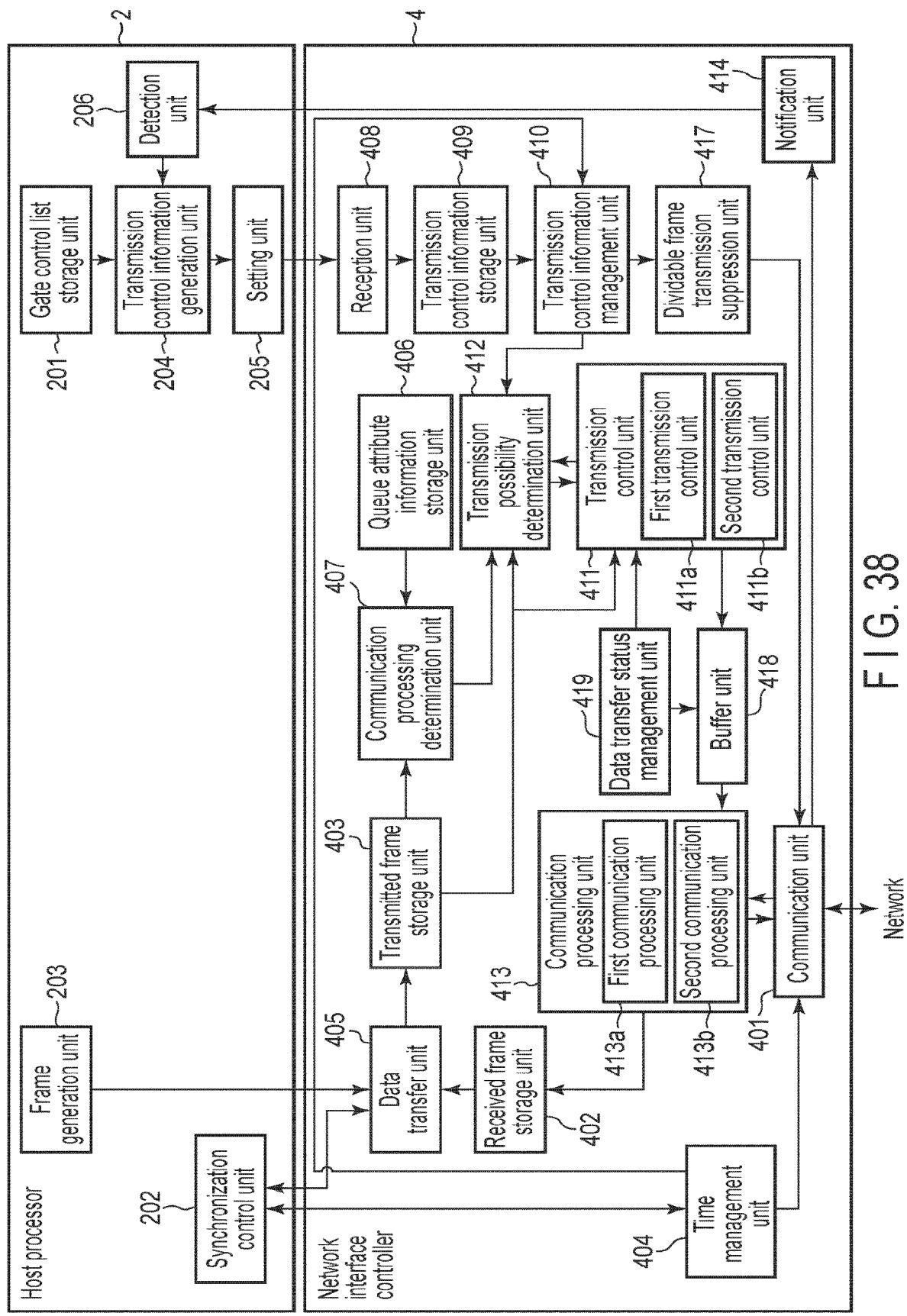
F I G. 38

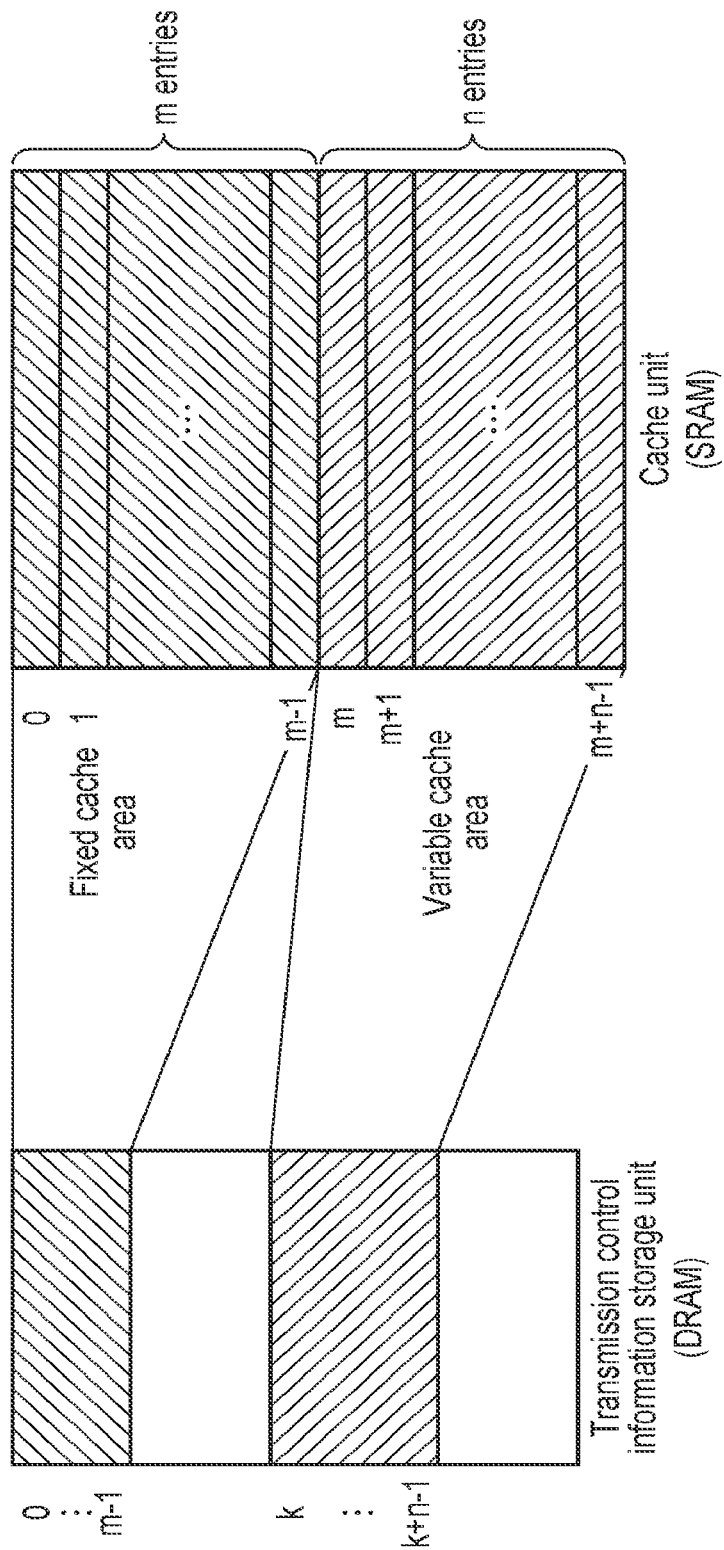
F I G. 40

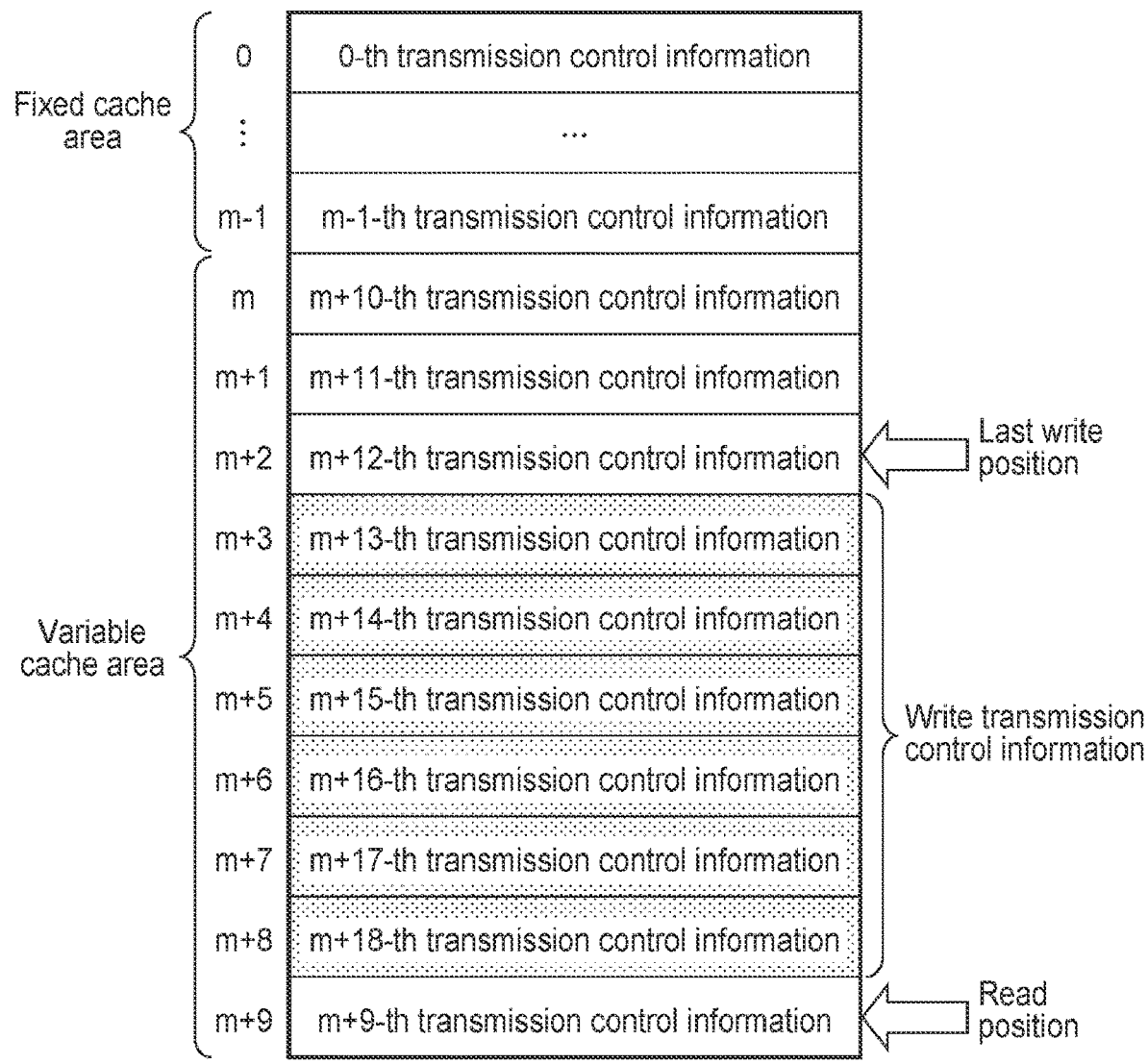
F I G. 46

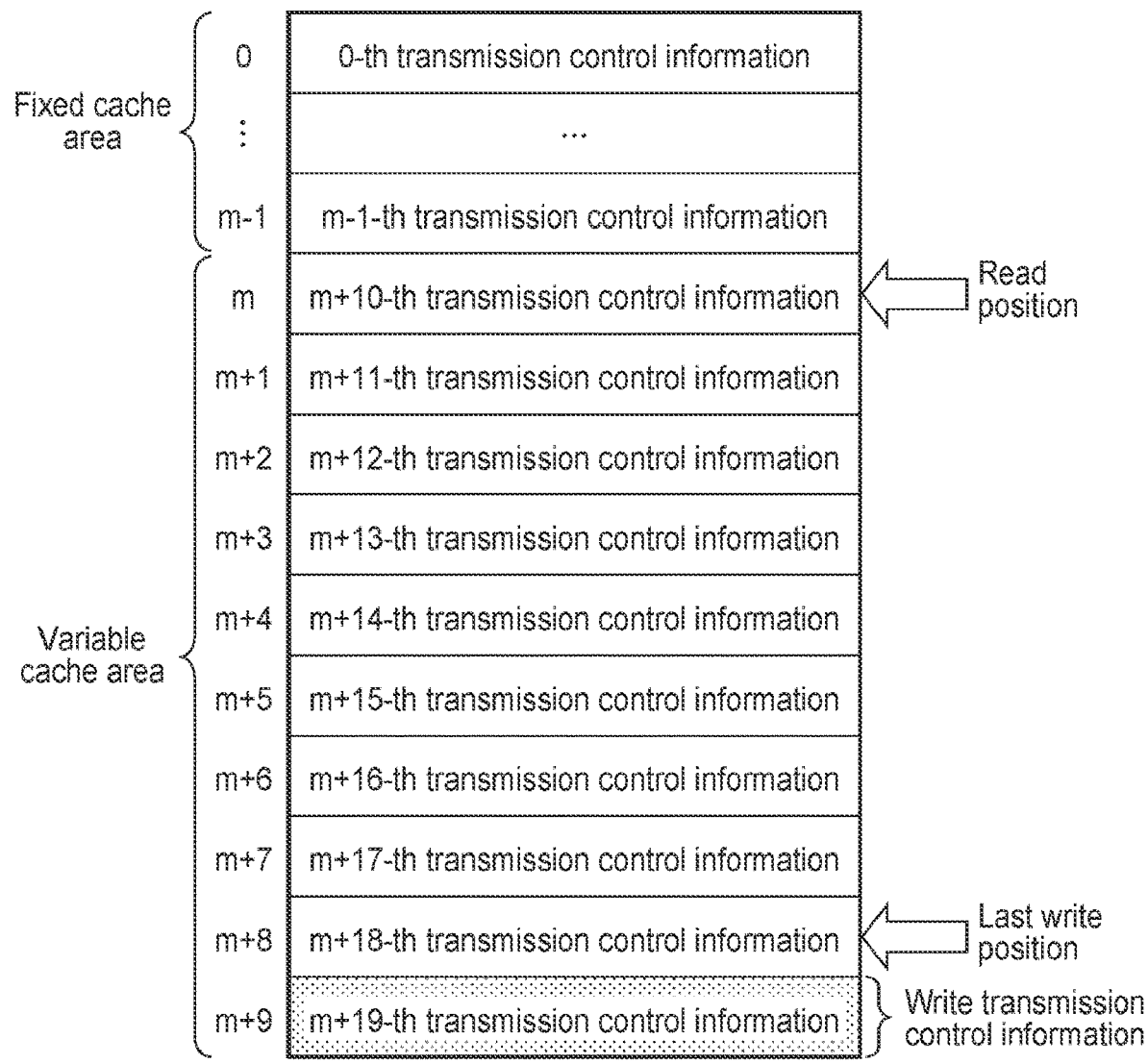
F I G. 47

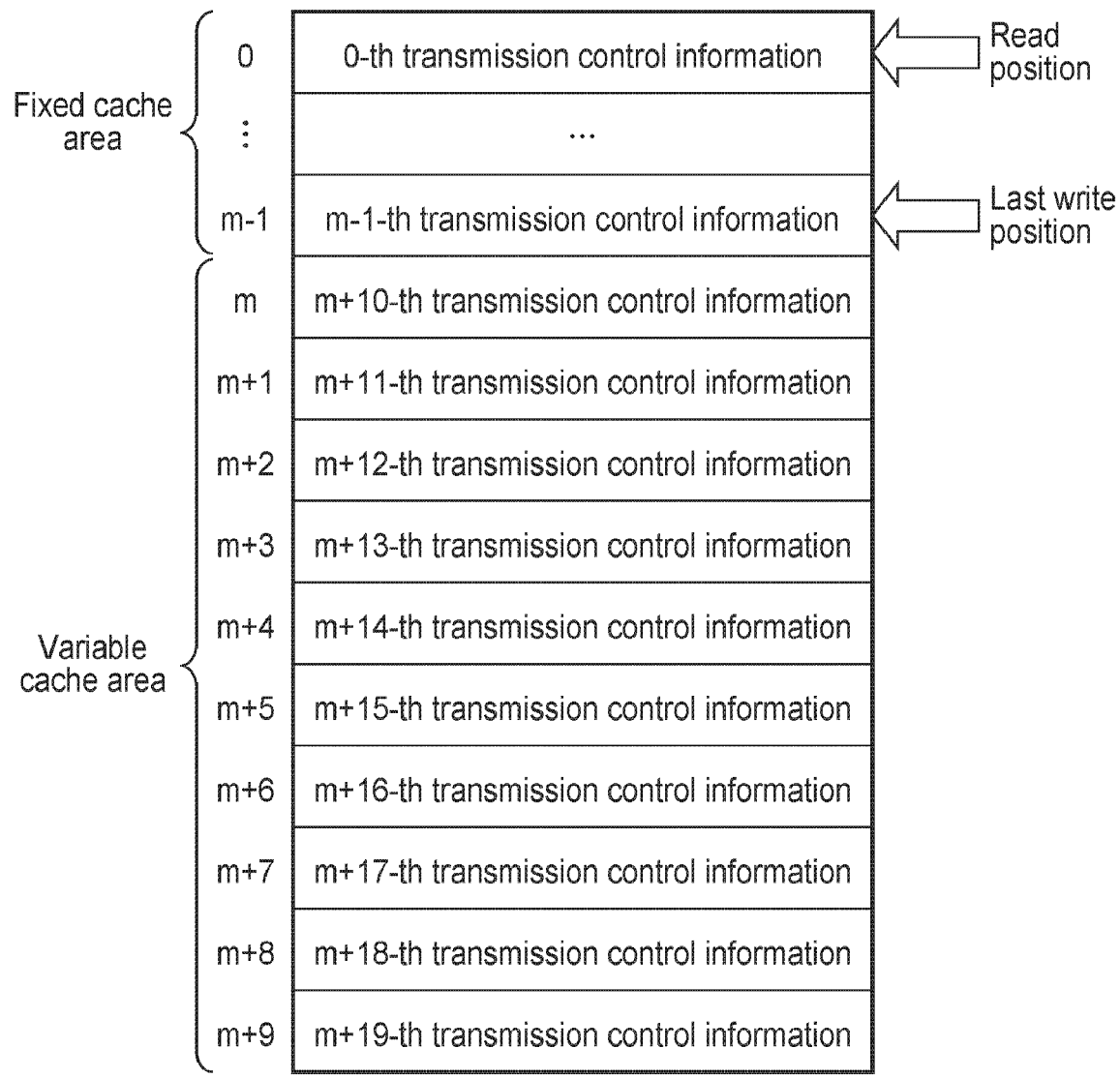
F I G. 48

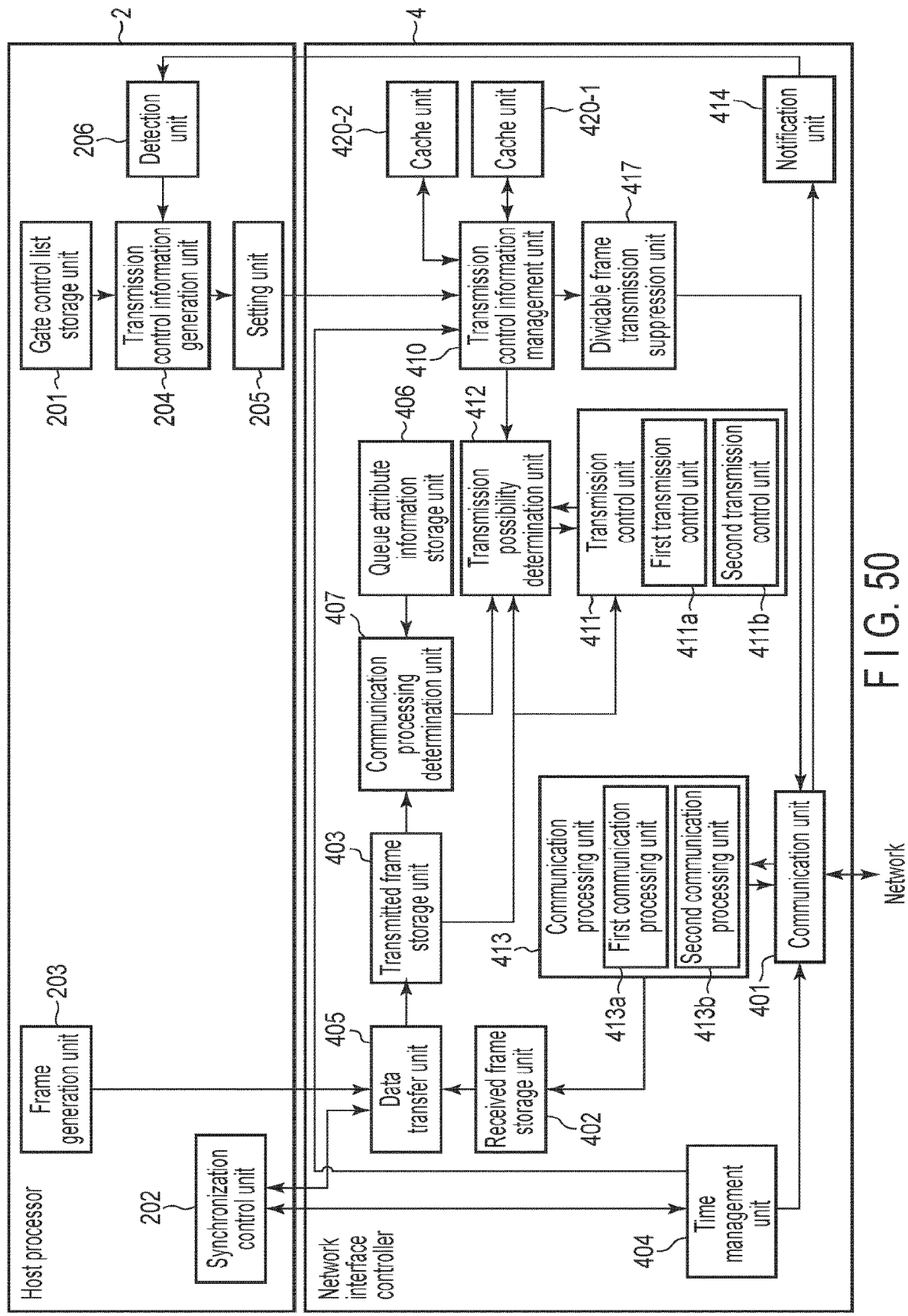
F I G. 50

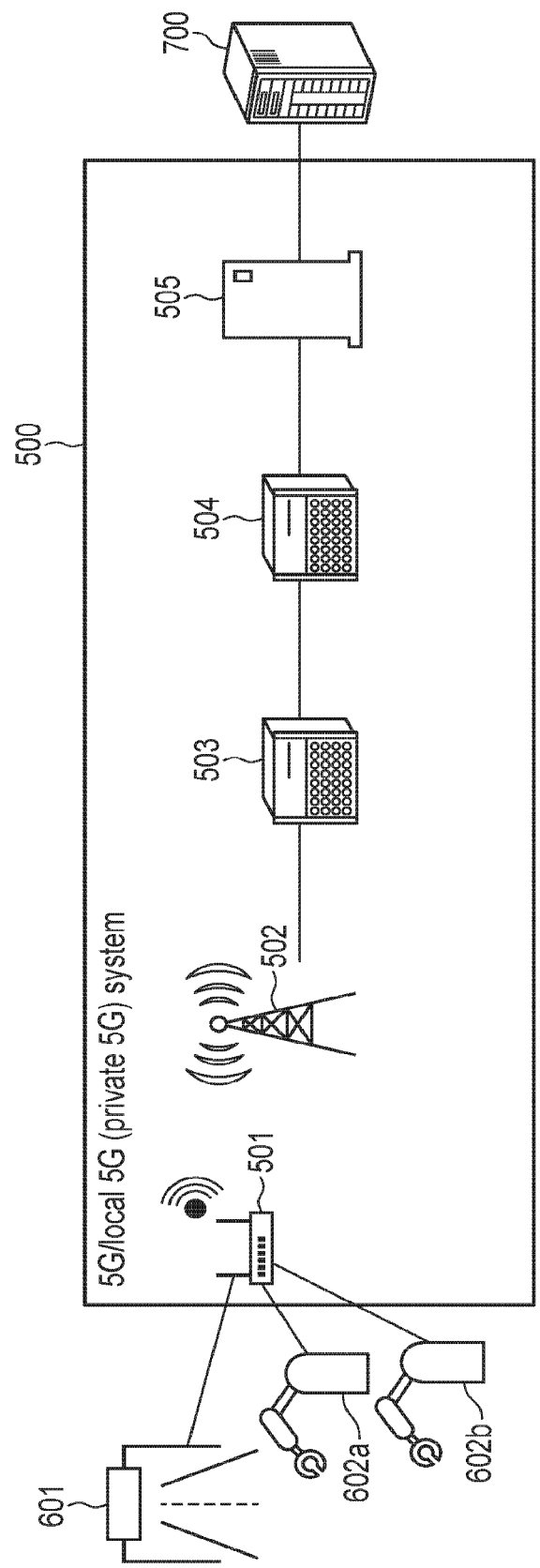
F I G. 52

COMMUNICATION CONTROL DEVICE, INFORMATION PROCESSING DEVICE, COMMUNICATION CONTROL METHOD, INFORMATION PROCESSING METHOD, AND STORAGE MEDIUM

CROSS-REFERENCE TO RELATED APPLICATIONS

This application is based upon and claims the benefit of priority from Japanese Patent Application No. 2021-195485, filed Dec. 1, 2021, the entire contents of which are incorporated herein by reference.

FIELD

Embodiments described herein relate generally to a communication control device, a communication control method, an information processing device, an information processing method, and a storage medium.

BACKGROUND

A communication device executing real-time communication via a network conforming to Time-Sensitive Networking (TSN) standard or the like is known. In TSN, based on a gate control list in which open or close status of a plurality of gates corresponding to each of a plurality of queues (i.e., whether or not to transmit messages stored in the queues) is specified in units of time, transmission of messages from the queues is controlled.

However, a bandwidth often cannot be effectively utilized in the above-described TSN standard or the like.

BRIEF DESCRIPTION OF THE DRAWINGS

FIG. 3 is a table showing an example of a gate control list.

FIG. 4 is a diagram showing a configuration example of a receive descriptor.

FIG. 5 is a diagram showing a configuration example of a transmit descriptor.

FIG. 6 is a table showing an example of attribute information stored in a queue attribute information storage unit.

FIG. 7 is a diagram illustrating an outline of operation of a frame reception process.

FIG. 8 is a diagram illustrating an outline of operation of a frame transmission process.

FIG. 9 is a flowchart showing an example of a transmission control information generation process.

FIG. 10 is a table showing an example of a continuous open time.

FIG. 11 is a table specifically illustrating transmission control information.

FIG. 12 is a table specifically illustrating the transmission control information.

FIG. 13 is a table specifically explaining the transmission control information.

FIG. 14 is a table specifically illustrating the transmission control information.

FIG. 15 is a table specifically illustrating the transmission control information.

FIG. 16 is a table specifically illustrating the transmission control information.

FIG. 17 is a table specifically illustrating the transmission control information.

FIG. 18 is a table specifically illustrating the transmission control information.

FIG. 20 is a diagram illustrating an example of a composition of a transmission possibility determination unit.

FIG. 22 is a flowchart showing an example of a procedure of a guard band determination process.

FIG. 24 is a flowchart showing an example of a procedure of a communication processing determination unit.

FIG. 25 is a flowchart showing an example of a procedure of a frame selection process.

FIG. 27 is a flowchart showing another example of the procedure of the guard band determination process.

FIG. 28 is a block diagram showing an example of a functional configuration of a communication device according to a modified example of the embodiment.

FIG. 30 is a table showing an example of a gate control list.

FIG. 31 is a table showing an example of a transmission control information.

FIG. 32 is a diagram illustrating an example of a configuration of a transmission control information management unit.

FIG. 33 is a diagram illustrating an example of a configuration of a transmission control information management unit.

FIG. 35 is a table showing an example of transmission control information according to the modified example of the embodiment.

FIG. 37 is a flowchart showing an example of a procedure of a dividable frame transmission suppression unit.

FIG. 38 is a block diagram showing another example of the functional configuration of the communication device.

FIG. 40 is a diagram showing a configuration example of cache areas inside a cache unit.

FIG. 46 is a table specifically illustrating the transmission control information updating process.

FIG. 47 is a table specifically illustrating the transmission control information updating process.

FIG. 48 is a table specifically illustrating the transmission control information updating process.

FIG. 50 is a diagram showing another example of the functional configuration of the communication device.

FIG. 52 is a diagram showing a configuration example of a system using the communication device according to each of the embodiments.

DETAILED DESCRIPTION

In general, according to one embodiment, a communication control device includes a transmission control unit and a communication unit. The transmission control unit is configured to control transmission of a message stored in a queue based on transmission control information generated from gate control information in which open or close status of a gate corresponding to each of a plurality of queues is specified. The communication unit is configured to transmit the message under control of the transmission control unit. The transmission control information indicates timing of next event related to the transmission of the message when the transmission of the message is controlled.

Various embodiments will be described with reference to the accompanying drawings.

First Embodiment

First, a first embodiment will be described. A communication device according to the embodiment is a device configured to execute real-time communication of messages via a network. An example of employing Time-Sensitive Networking (TSN) as a standard for real-time communication will be described below, but the standards applicable to the embodiment are not limited to the TSN.

By the way, in IEEE 802.1Qbv of the TSN, a gate control list (gate control information) in which the open or close status of gates corresponding to each of a plurality of queues is specified in time units, is used to determine whether or not a frame (example of a message) stored in the queue can be transmitted. This gate control list includes an entry for each time unit and, in each of the plurality of queues, when an open status of the gate corresponding to the queue is continuous (successive) over a plurality of entries (time units), the frame stored in the queue can be transmitted until the gate is finally closed.

However, when the operation of IEEE 802.1Qbv thus defined is implemented, it is necessary to determine possibility of the frame transmission (i.e., to control the frame transmission) while reading the status of the previous gate. In such a configuration, it is not possible to assure finishing the process within a certain period of time, processing cannot be executed in real time. In addition, if a status of a previous gate is not considered to cause the processing to be executed in real time, the prepared bandwidth cannot be used effectively. Furthermore, in order to effectively use the bandwidth of less than one frame before the gate is closed, a frame interrupt function defined under IEEE 802.1Qbu is required to be used together.

Thus, in the embodiments, a communication device capable of effectively using the bandwidth will be described in consideration of the above-described circumstances.

Figure 1:
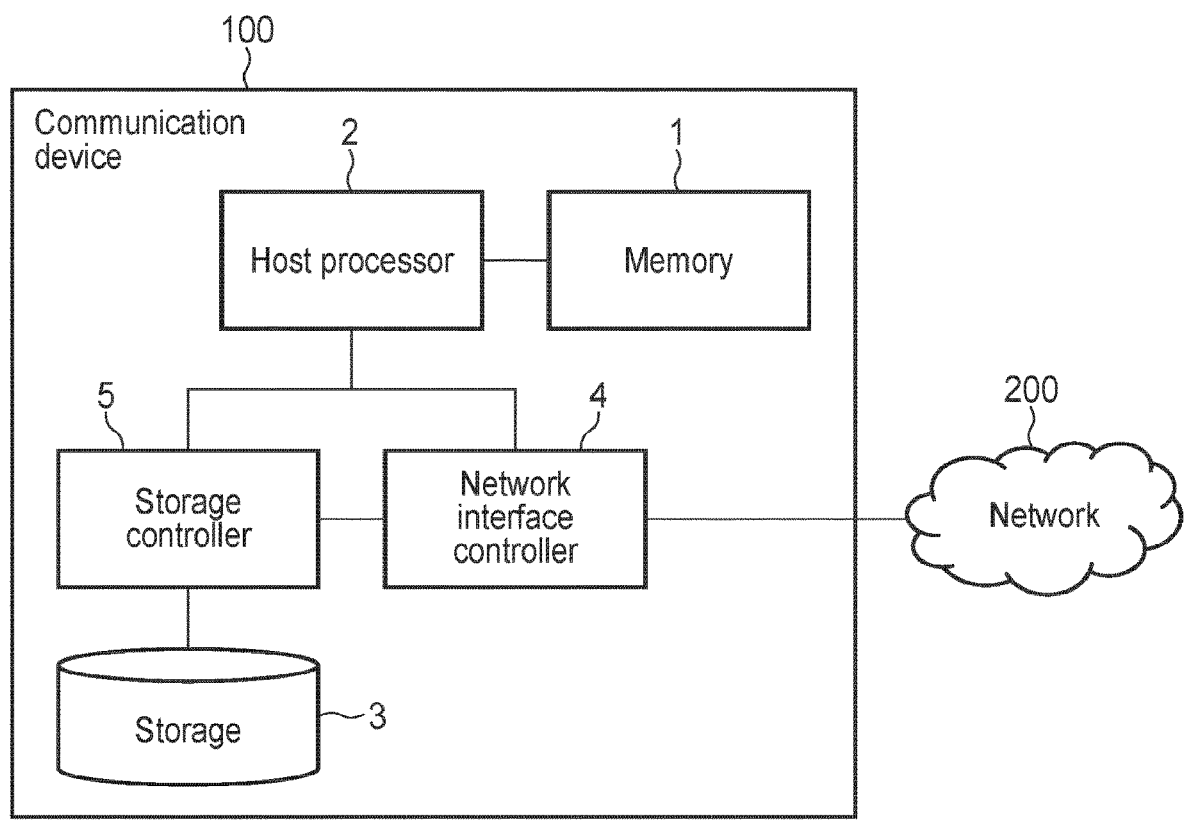
FIG. 1 is a diagram showing an example of a hardware configuration of a communication device according to a first embodiment.

FIG. 1 shows an example of a hardware configuration of the communication device according to the embodiment. As shown in FIG. 1, a communication device 100 includes a memory 1, a host processor 2, a storage 3, a network interface controller 4, a storage controller 5, and the like.

The memory 1 is connected to the host processor 2 via a memory controller in the host processor 2. For example, the memory 1 is implemented by, for example, a Dynamic Random Access Memory (DRAM) or the like.

The host processor 2 is connected to the storage controller 5 by using a bus of PCI Express (registered trademark) or the like. Similarly, the host processor 2 is connected to the network interface controller 4 by using a bus of PCI Express or the like.

The host processor 2 functions as an information processing device expanding images of an executable program stored in the storage 3 into the memory 1 and executing processing while reading commands and data on the memory 1. The processing executed by the host processor 2 is executed by one or more cores provided in the host processor 2. The memory 1 and the host processor 2 are shown separately in FIG. 1, but the host processor 2 may be constituted integrally with the memory 1.

The storage 3 is implemented by, for example, a hard disk drive (HDD), a solid status drive (SSD) or the like. The storage 3 is connected to the storage controller 5 under standards such as SATA, SAS, and U.2 (SFF-8639). In addition, the storage 3 and the storage controller 5 may be constituted integrally.

The network interface controller 4 functions as a communication control device that connects the host processor 2 to the network 200.

The network 200 is, for example, Ethernet (registered trademark). More specifically, the network 200 is a network conforming to standards defined under IEEE 802.1. The standards defined under IEEE 802.1 are, for example, the above-described TSN standard, Audio Video Bridging (AVB) standard, and the like. In addition, the type of the network 200 may be any type. More specifically, the network 200 is, for example, an office network, a network inside a data center, an in-vehicle network, a factory network, a network of mobile base stations, a network of core facilities, or the like.

The network interface controller 4 and the storage controller 5 are implemented by, for example, application specific integrated circuits (ASICs), field-programmable gate arrays (FPGAs), or processors such as central processing units (CPUs). In addition, the network interface controller 4 and the storage controller 5 may also be implemented by combining two or three of the ASICs, the FPGAs, and the processors. The network interface controller 4 and storage controller 5 may incorporate memories different from the above-described memory 1. The network interface controller 4 and storage controller 5 may be mounted as a separate chip from the host processor 2 or may be mounted on the same chip as the host processor 2 as System-on-a-Chip (SoC).

Figure 2:
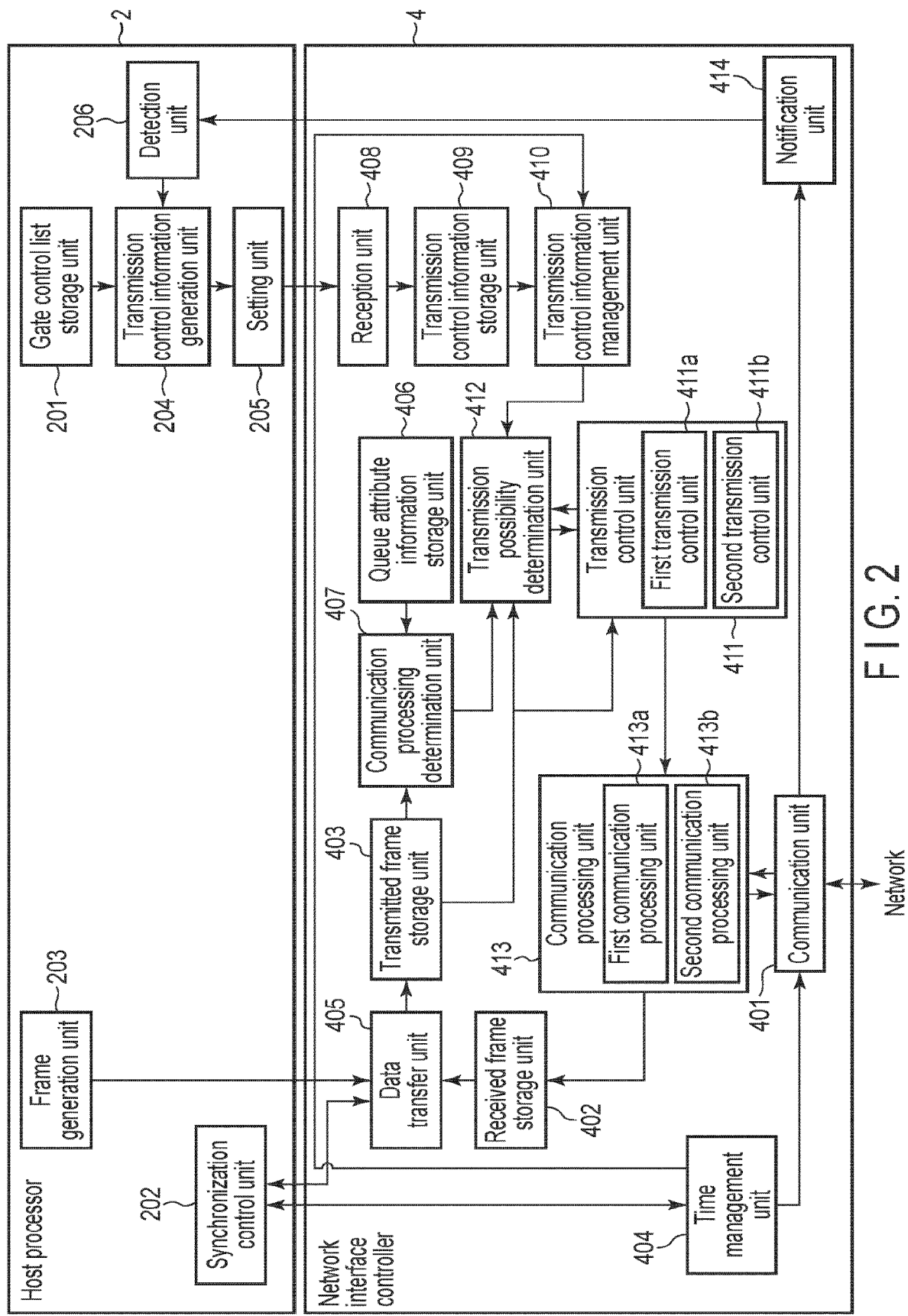
FIG. 2 is a block diagram showing an example of a functional configuration of the communication device.

FIG. 2 is a block diagram showing an example of a functional configuration of the communication device 100 according to the embodiment. In FIG. 2, the functional configuration of the host processor (information processing device) and the network interface controller 4 (communication control device) provided in the communication device 100 will be mainly described.

As shown in FIG. 2, the host processor 2 includes a gate control list storage unit 201, a synchronization control unit 202, a frame generation unit 203, a transmission control information generation unit 204, a setting unit 205, and a detection unit 206.

The gate control list storage unit 201 stores a gate control list used in the above-mentioned frame transmission control (transmission timing control). The gate control list is the information used to execute the control of Enhancements for scheduled traffic defined under IEEE 802.1Q.

The gate control list stored in the gate control list storage unit 201 may be stored in the storage 3 or the like in advance or, for example, received (obtained) via network 200 by centralized network configuration (CNC) defined under IEEE 802.1Qcc.

FIG. 3 shows an example of the gate control list. The gate control list shown in FIG. 3 includes six entries from T00 to T05. Each of the entries includes a time interval and a gate status of a queue corresponding to each of the eight traffic classes. TC0 to TC7 refer to the traffic classes. For example, TC7 refers to traffic class No. 7.

The gate status of each traffic class is represented by "o" and "C". "o" indicates that the gate is open. "C" indicates that the gate is closed. The gate status indicates whether or not transmission in the queue of the traffic class (transmission of frames stored in the queue) is permitted.

The time interval indicates the time in which the entry lasts. For example, in the example in FIG. 3, 128 μs are set in the time interval of the entry T00. This indicates that the entry T00 continues for 128 μs. The set gate status is maintained for the time interval in the order from T00 and, as the time elapses in order of T01, T02, . . . the gate status of the gate of each traffic class is switched. When the last entry (T05 in the example in FIG. 3) is completed, gate control for one cycle is complete. For start timing of a next cycle, the processing may be repeated by returning to the first entry (T00 in the example in FIG. 3) immediately after the last entry has ended. Alternatively, the start timing of the next cycle may be determined based on the time information managed by a time management unit 404. The next cycle may be forced to start based on the time information before the gate control for one cycle is completely ended.

In addition, each entry further includes an operation. In the example shown in FIG. 3, SetGateStates is set in common for each entry, and SetGateStates indicates setting "o" or "C" as the gate status for a plurality of queues (queues for ports included by the network interface controller 4).

Although not shown in FIG. 3, the time (base time) at which gate control is started is also set (stored) in the gate control list. The base time is included in the transmission control information to be described below and is transmitted to the network interface controller 4. The base time is expressed in, for example, year, month, date, hour, minute, second, and the like, but may be expressed in any other format as long as it can specify the timing of starting the gate control. Furthermore, although not shown in FIG. 3, the time (cycle time) for one cycle of the gate control may be included in the gate control list. For example, the total value of the time intervals of all the entries (T00 to T05 in the example in FIG. 3) included in the gate control list may be set (stored) as the cycle time. The cycle time is expressed in, for example, μsec or the like in the same manner as the time interval, but may be expressed in the other format as long as it can specify the time for one cycle.

The synchronization control unit 202 executes time synchronization with other communication devices via the network 200. For example, the synchronization control unit 202 executes the time synchronization under the time synchronization protocol such as IEEE 1588 or IEEE 802.1AS via the network 200 and corrects the time information managed by the network interface controller 4 (time management unit 404 to be described later).

The frame generation unit 203 generates frames (transmitted frames) to be transmitted via the network interface controller 4. The frame refers to the smallest unit of data exchanged at the data link layer. For example, the frame generation unit 203 generates the data included in the transmitted frame, and a header and a footer of a protocol corresponding to the upper layer of Ethernet. For example, the frame generation unit 203 is implemented by a transmission application, a protocol stack, and a device driver operating on the host processor 2.

The frame generator 203 sets the traffic class to the transmitted frame in accordance with the characteristics of the information to be transmitted, and the like. When eight traffic classes are used, for example, values of TC0 to TC7 are used as the identification information of the traffic classes.

Only one frame generation unit 203 is shown in FIG. 2, but the host processor 203, but the host processor 2 may be configured to include a plurality of frame generation units 203.

The transmission control information generation unit 204 generates transmission control information from the gate control list stored in the gate control list storage unit 201. For example, at the initialization time and in a case where a change in link speed or operating speed information is detected by the detection unit 206 to be described below, the transmission control information generation unit 204 reads the gate control list from the gate control list storage unit 201 and generates transmission control information. Details of the process of generating the transmission control information will be described below, but the transmission control information generated by the transmission control information generation unit 204 is the information indicating timing at which next event related to transmission of the frame occurs at the time of controlling the frame transmission. More specifically, (each entry of) the transmission control information includes period information indicating the period allocated to the entry, and transmittable information indicating the amount of data (hereinafter referred to as a transmittable amount) and the time of frames that can be transmitted before the gate is next closed at the start of the period (i.e., gate switching timing).

The setting unit 205 transmits the transmission control information generated by the transmission control information generation unit 204 to the network interface controller 4.

The detection unit 206 detects changes in the link speed of the network interface controller 4. For example, the detection unit 206 receives a notification from the network interface controller 4 and detects the change in the link speed. The link speed represents the speed of communication over the network 200 by the network interface controller 4. In addition, for example, the detection unit 206 receives a notification from the network interface controller 4 and also detects a change in operating speed information including at least one of clock information and bit width information. The clock information represents a clock frequency or clock cycle for executing a frame transmission control (process) in the network interface controller 4. The clock frequency or clock cycle (clock period) for executing the frame transmission control in the embodiment includes a clock frequency on a data transmission path between a transmission control unit 409 and a communication unit 401 and a clock frequency on the communication unit 401. The bit width information represents the bit width of the bus at the time when the network interface controller 4 (communication unit 401) transmits a frame, the bit width of the bus provided between the transmission control unit 411 and the communication processing unit 413, the bit width of the bus provided between the communication processing unit 413 and the communication unit 401. In other words, although not shown in the figure, the change in the operating speed information that the network interface controller 4 notifies the detection unit 206 may be based on the clock information or the bit width information other than that of the communication unit 401.

The above-described gate control list storage unit 201 is implemented by, for example, the memory 1 configured integrally with the host processor 2, but may also be implemented by a memory other than the memory 1.

In addition, each of the above-described units 202 to 206 is implemented by, for example, one or more processors. More specifically, each of the units 202 to 206 may be implemented by urging a processor such as a central processing unit (CPU) to execute a program, i.e., by software. Each of the units 202 to 206 may be implemented by hardware such as a dedicated integrated circuit (IC) or a combination of software and hardware. When a plurality of processors are used to implement each of the units 202 to 206, each processor may be used to implement one of the units 202 to 206 or to implement two or more of the units 202 to 206.

In addition, as shown in FIG. 2, the network interface controller 4 includes the communication unit 401, a received frame storage unit 402, a transmitted frame storage unit 403, the time management unit 404, a data transfer unit 405, a queue attribute information storage unit 406, a communication processing determination unit 407, a reception unit 408, the transmission control information storage unit 409, a transmission control information management unit 410, a transmission control unit 411, a transmission possibility determination unit 412, a communication processing unit 413, and a notification unit 414.

The communication unit 401 includes functions referred to as a media access controller (MAC) and PHY, and executes processing necessary for frame transmission and reception under protocols of a data link layer and a physical layer in the network 200. More specifically, the communication unit 401 executes processing of a data link layer and a physical layer of Ethernet as defined under IEEE 802.3.

The received frame storage unit 402 stores received frames received by the communication unit 401. The received frame storage unit 402 stores sets of data and frames of the received frames in order, using a queue (FIFO) prepared for each traffic class. The data of the frames may include time stamp information obtained at the reception.

The transmitted frame storage unit 403 stores transmitted frames generated by the frame generation unit 203 included in the host processor 2. The transmitted frame storage unit 403 stores sets of data and frames of the transmitted frames in order, using a queue (FIFO) prepared for each traffic class.

The time management unit 404 manages, for example, (time information indicating) the time in the network interface controller 4.

When the synchronization control unit 202 executes time synchronization, the communication unit 401 executes obtaining the time stamps from the received frames and assigning the time stamps to the transmitted frames, using the time information provided by the time management unit 404.

The data transfer unit 405 transfers data to and from the memory 1 (host processor 2). For example, the data transfer unit 405 transfers the frames by Direct Memory Access (DMA) data, between the received frame storage unit 402 and the memory 1 and between the memory 1 and the transmitted frame storage unit 403.

When the frames are received, the data transfer unit 405 reads a transfer destination address from a receive descriptor, and writes the data of the received frames read from the corresponding queue in the received frame storage unit 402 to an area of the memory 1 specified by the transfer destination address. Then, the data transfer unit 405 writes a length and a status of the receive descriptor.

In contrast, when the frames are transmitted, the data transfer unit 405 reads the transfer source address and the length from the transmit descriptor, reads the data for the length specified by the length from the area of the memory 1 specified by the transfer source address, and writes the data of the frames to the corresponding queue in the transmitted frame storage unit 403. Then, the data transfer unit 405 writes the status of the transmit descriptor.

The frame transmission and reception under the time synchronization protocol are also executed via the data transfer unit 405. For example, the synchronization control unit 202 calculates the time offset to the master connected via the network 200 from the time stamp of each frame, and corrects the time information of the time management unit 404.

FIG. 4 is a diagram showing a configuration example of the receive descriptor. As shown in FIG. 4, the receive descriptor is a ring buffer and is managed using two variables referred to as Head and Tail. As shown in FIG. 4, the descriptor from Head to Tail-1 indicates a descriptor owned by hardware (HW), i.e., the network interface controller 4. In addition, the descriptor from Tail to Head-1 indicates a descriptor owned by software (SW), i.e., software (frame generation unit 203 and synchronization control unit 202) running on the host processor 2. Values of Head and Tail are notified between the network interface controller 4 and the host processor 2 using a register interface and an interrupt signal.

Each entry (each descriptor) of the receive descriptor (receive descriptor ring) includes a transfer destination address, a length and a status. The transfer destination address indicates a leading address that indicates a leading position of the storage area of the data storage unit (for example, memory 1) that stores the data of the frame to be received. The length indicates the length of the frame to be received. Information indicating the status of the receiving process is stored in the status.

FIG. 5 shows a configuration example of the transmit descriptor. Detailed explanation is omitted, but the transmit descriptor is a ring buffer, similarly to the above-described receive descriptor, and is managed using two variables referred to as Head and Tail.

Each entry (each descriptor) of the transmit descriptor (transmit descriptor ring) includes a transfer source address, a length and a status. The transfer source address indicates a leading address that indicates a leading position of the storage area of the data storage unit (for example, memory 1) that stores the data of the frame to be transmitted. The length indicates the length of the frame to be transmitted. Information indicating the status of the transmitting process is stored in the status.

The above-described statuses include, for example, error bits, DONE bits, and the like. The error bit indicates the presence or absence of a transfer error. The DONE bit indicates that the process has been ended in the network interface controller 4. When the DONE bit of the receive descriptor is 1, the bit indicates that the receiving process has been ended. When the DONE bit of the transmit descriptor is 1, the bit indicates that the transmitting process has been ended. The network interface controller 4 writes 1 to each bit (error bit and DONE bit). Then, after confirming each bit, the frame generation unit 203 or the synchronization control unit 202 clears each bit by writing 0 to each bit.

It is assumed here that, for example, the network interface controller 4 of the embodiment is configured to execute transmission and reception of undividable frames (high priority frames required to be transmitted at low latency) referred to as express frames by express Media Access Control (eMAC) defined under IEEE 802.3br and transmission and reception of dividable frames (low priority frames not required to be transmitted at low latency) referred to as preemptable frames by preemptable Media Access Control (pMAC) and includes a frame interrupt function defined under IEEE 802.1Qbu described above.

The queues in which the above express frames (i.e., undividable frames) and the preemptable frames (i.e., dividable frames) are stored are determined in advance, and which frame is stored in each of a plurality of queues is stored (set) in the queue attribute information storage unit 406 as attribute information indicating the attributes of the queues.

FIG. 6 is a table showing an example of the attribute information stored in the queue attribute information storage unit 406. As shown in FIG. 6, for example, the attribute information is stored in the queue attribute information storage unit 406 in the form of a frame preemption status table, and includes correspondence between the traffic classes and the frame preemption statuses. The frame preemption status takes two types of values, i.e., express (frame) and preemptable (frame).

According to the attribute information shown in FIG. 6, it is indicated that the frames in the queues of traffic classes TC1 to TC7 are transmitted as express frames, and the frames in the queue of traffic class TC0 are transmitted as preemptable frames.

The communication processing determination unit 407 determines whether the frames stored in each of the plurality of queues are transmitted as the express frames or transmitted as the preemptable frames, and determines the communication processing for the frames, by referring to the attribute information (frame preemption status table) stored in the above-described queue attribute information storage unit 406.

The reception unit 408 accepts input of the transmission control information transmitted by the setting unit 205 of the host processor 2. The reception unit 408 may be able to set the transmission control information by a predefined register. The setting unit 205 may notify the leading address and length of the transmission control information stored in the memory 1 in a predetermined format, and the reception unit 408 may access the memory 1 and read the transmission control information.

The transmission control information accepted by the reception unit 408 is stored in the transmission control information storage unit 409.

The transmission control information management unit 410 determines timing of reading (loading) a new entry from among a plurality of entries included in the transmission control information stored in the transmission control information storage unit 409, based on the time information managed by the time management unit 404 (global clock synchronized throughout the network) and the local clock inside the network interface controller 4 (for example, a 156.25 MHz clock signal supplied by a 10 Gbps MAC). More specifically, for example, the transmission control information management unit 410 determines the timing of reading the leading entry of the gate control list (start timing of transmission control information, corresponding to the timing of validating CycleStart of IEEE 802.1Qbv), with reference to the above-described global clock, base time, and cycle time. In addition, timing of reading a second or subsequent entry (i-th entry) (corresponding to the timing at which ExitTimer of IEEE 802.1Qbv becomes 0) is determined based on the above-described local clock and a time interval of the i−1st entry (the time during which the entry continues).

In addition, the transmission control information management unit 410 manages the read entry and updates, for example, (the transmittable amount indicated by) the transmittable information included in the entry, based on (progress of) the local clock.

The transmittable information included in the entry managed by the transmission control information management unit 410 is provided to the transmission possibility determination unit 412. The transmittable information provided to the transmission possibility determination unit 410 by the transmission control information management unit 408 is the number of frame transmission bits or the frame transmission time to be described below.

The transmission control unit 411 controls the transmission start timing (transmission timing) of the frame selected from the frames stored in the plurality of queues, by cooperating with the transmission possibility determination unit 412. The above-described communication unit 401 transmits the frame in accordance with the control of the transmission control unit 411. The transmission control unit 411 includes a first transmission control unit 411a that controls the transmission of the above-described express frames, and a second transmission control unit 411b that controls the transmission of the preemptable frames.

The transmission possibility determination unit 412 executes determination (hereinafter referred to as guard band determination) on whether or not to transmit the frame stored in the leading queue of the plurality of queues (leading frame of the queue) under enhancements for scheduled traffic. The guard band determination in the embodiment is executed based on the transmittable information provided by the transmission control information management unit 410 as described above, and a transmission cost at the time when the leading frame of each of the plurality of queues is transmitted by the communication unit 401.

The communication processing unit 413 includes a first communication processing unit 413a and a second communication processing unit 413b. The first communication processing unit 413a executes eMAC processing defined under IEEE 802.3br. More specifically, the first communication processing unit 413a executes transmission and reception processing of the above-described express frames. In contrast, the second communication processing unit 413b executes pMAC processing defined under IEEE 802.3br. More specifically, the second communication processing unit 413b executes the transmission and reception process of the above-described preemptable frames.

If it is determined by the communication processing determination unit 407 that the frame to be transmitted is the express frame, the communication processing determination unit 407 determines processing the frame to be transmitted by the first communication processing unit 413a and transmitting the frame. In this case, the transmission of the frame to be transmitted is controlled by the first transmission control unit 411a, and the frame is delivered from the first transmission control unit 411a to the first communication processing unit 413a. In contrast, if it is determined by the communication processing determination unit 407 that the frame to be transmitted is the preemptable frame, the communication processing determination unit 407 determines processing the frame to be transmitted by the second communication processing unit 413b and transmitting the frame. In this case, the transmission of the frame to be transmitted is controlled by the second transmission control unit 411b, and the frame is delivered from the second transmission control unit 411b to the second communication processing unit 413b. The communication unit 401 transmits the frame processed by the first communication processing unit 413a and the frame processed by the second communication processing unit 413b.

In the embodiment, the communication unit 401 operates to transmit the frame processed by the first communication processing unit 413 with a higher priority than the frame processed by the second communication processing unit 413b. More specifically, for example, when a transmission request from the first communication processing unit 413a occurs while the frame processed by the second communication processing unit 413b is being transmitted, the transmission of the frame processed by the second communication processing unit 413b is stopped (i.e., the frame is divided) and the frame processed by the first communication processing unit 413a is transmitted. When there are no more transmission requests from the first communication processing unit 413a, the stopped transmission of the frame processed by the second communication processing unit 413b is resumed.

In other words, in the embodiment, when the process of transmitting the express frame occurs during the process of transmitting the preemptable frame, the process of transmitting the preemptable frame can be suspended and interrupted by the process of transmitting the express frame.

The frame transmission (process) has been described here, and when the express frame is received by the communication unit 401, the express frame is delivered from the communication unit 401 to the first communication processing unit 413a. In addition, when the preemptable frame is received by the communication unit 401, the preemptable frame is delivered from the communication unit 401 to the second communication processing unit 413b. The frame processed by the first communication processing unit 413a and the second communication processing unit 413b is stored in the received frame storage unit 402. The preemptable frame is the dividable frame as described above and, when divided frames arrive, the second communication processing unit 413b executes a process of connecting the divided frames and generating an original frame.

The notification unit 414 acquires a link speed and operating speed information of the communication unit 401 and notifies the host processor 2 (detection The 414 notifies the host processor 2 (detection unit 206) of the link speed and the operating speed information of the communication unit 401. For this notification, interruption may be used or the detection unit 206 may be made to execute a polling operation.

The received frame storage unit 402, the transmitted frame storage unit 403, the queue attribute information storage unit 406, and the transmission control information storage unit 409 as described above are implemented by, for example, static random access memories (SRAMs).

In addition, in the embodiment, it is assumed that each of the above-described units 401, 404, 405, 407, 408, and 410 to 414 is implemented by hardware such as a dedicated IC, but each of the units 401, 404, 405, 407, 408, and 410 to 414 may be implemented by urging one or more processors to run programs, i.e., by software or may be implemented by a combination of software and hardware. In addition, when a plurality of processors are used to implement each of the units 401, 404, 405, 407, 408, and 410 to 414, each processor may be used to implement two or more of the units 401, 404, 405, 407, 408, and 410 to 414.

Next, an overview of the operations of the frame reception process and the frame transmission process will be described with reference to FIG. 7 and FIG. 8.

FIG. 7 is a diagram showing the overview of the operation of the frame reception process. The communication unit 401 checks presence of a virtual local area network (VLAN) tag of the received frame and, if the VLAN tag is present, classifies the received frame into a traffic class by using its priority code point (PCP) value. The received frames are stored in order in the corresponding queues of the received frame storage unit 402 via the communication processing unit 413 (first communication processing unit 413a and second communication processing unit 413b). After that, the received frames are stored in the memory address of the memory 1 set in the corresponding receive descriptor of the data transfer unit 405, and are delivered to the synchronization control unit 202, and the like.

FIG. 8 is a diagram showing the overview of the operation of the frame transmission process. The frame transmission process is started with the frame generation unit 203 or the synchronization control unit 202. The frame generation unit 203 and the synchronization control unit 202 generate the payload data for the frames and assign headers and (if necessary) footers for each protocol, and generate frames (transmitted frames). The frame generation unit 203 and the synchronization control unit 202 select a traffic class to transmit the frame in accordance with the characteristics of the application and the like. For example, the transmit descriptor of the data transfer unit 405 is prepared for each traffic class. The frame which is instructed to be transferred using the transmit descriptor is read from the memory 1 and transferred to the queue of the corresponding traffic class in the transmitted frame storage unit 403. After that, the transmission control unit 411 (first transmission control unit 411a and second transmission control unit 411b) selects the frame to be transmitted and transmits the frame via the communication processing unit 413 (first communication processing unit 413a and second communication processing unit 413b) and the communication unit 401.

Next, the transmission control information generation process will be described with reference to a flowchart in FIG. 9. For example, the transmission control information generation process is executed when the gate control list is set and when a change in the link speed or operating speed information is detected by the detection unit 206.

The transmission control information generation unit 204 reads the gate control list from the gate control list storage unit 201 (step S1). It is assumed here that, for example, the gate control list shown in FIG. 3 is read.

The transmission control information generation unit 204 calculates the time for which "o" in the gate control list continues (continuous open time) for each traffic class (step S2).

FIG. 10 shows an example of the continuous open time calculated in step S2. For example, for entry T02 of traffic class TC7, "o" continues from T02 to T03, and becomes "C" in T04. Since the time intervals of T02 and T03 are 512 μs and 128 μs, "o" continues for 512+128=640 μs from the leading part of T02. Similarly, in the case of T03, "o" continues for 128 μs since it becomes "C" in T04. When advancing to the last entry, the gate control list returns to the first entry (leading entry). In the case of T05, since "o" continues from T05 to T00, "o" is considered to continue for 512+128=640 μs. When the gate status is always "o" similarly to traffic class TC0, "o" continues as long as the gate control list is not changed, and the continuous open time becomes infinite (∞).

The description returns again to FIG. 9, and the transmission control information generator 204 generates the transmission control information by using the continuous open time calculated in step S2 (step S3).

The transmission control information generated in step S3 will be described below. FIG. 11 to FIG. 18 are tables specifically illustrating the transmission control information generated by the transmission control information generation unit 204.

The transmission control information shown in FIG. 11 includes the time during which frames can be transmitted in the queue of each traffic class at the timing of gate switching (hereinafter referred to as a frame transmittable time) as transmittable information. In addition, in the example shown in FIG. 11, the time corresponds to period information and is expressed as a relative value (relative time) from the leading time of the gate control list. The transmission control information includes information on the base time and the cycle time set in the gate control list.

FIG. 11 shows an example of the transmission control information that includes the frame transmission available time for all traffic classes at the time of gate switching. In contrast, FIG. 12 shows an example of the transmission control information including the only frame transmittable time for a newly open case. In the example shown in FIG. 12, the entry in the fourth line may be deleted.

By the way, if, for example, the link speed is obtained, the frame transmittable time can be converted into the amount of data in the frame that can be transmitted in the time (i.e., the number of frame transmittable bits). FIG. 13 and FIG. 14 show an example of the transmission control information that includes the number of frame transmittable bits to which the frame transmittable time shown in FIG. 11 and FIG. 12 is converted, as the transmittable time, in a case where the link speed is 1 Gbps. For example, when the link speed is 1 Gbps, the number of bits that can be transmitted in 128 μs is 1,000,000,000×(128/1,000,000)=128,000,000 bits. If the transmittable information is expressed by the number of frame transmittable bits, the amount of calculation required when using the number of frame transmittable bits can be reduced on the network interface controller 4 side. Furthermore, the relative value (period information) from the leading part may be expressed in bits instead of time. FIG. 15 and FIG. 16 show examples of transmission control information employing a number of bits instead of time. When the transmittable information is not expressed as the number of frame transmittable bits, for example, the link speed does not need to be detected, and the above-described process of detecting the link speed in the detection unit 206 may be omitted.

FIG. 13 to FIG. 16 described above show the examples in which the transmittable information (transmittable amount) is expressed in bits, but the transmittable information may also be expressed in bytes.

Furthermore, as shown in FIG. 17, the period information included in the transmission control information may be the number of clock cycles (i.e., the number of clock cycles based on the local clock) of the network interface controller 4 (for example, transmission control unit 411), which indicates the value of the time interval included in the gate control list. In addition, the value of the time interval may also be expressed in hours similarly to the gate control list.

The number of clock cycles indicating the above value of the time interval indicates how many clock operations of the transmission control unit 411 or the like correspond to the time interval of each entry. For example, when the transmission control unit 411 operates at 156.25 MHz, one clock cycle is 1/156.25=6.4 ns. For example, the time interval of 128 μs is expressed as 128 μs/6.4 ns=20,000 in clock cycle.

The transmission control information including the transmittable information (number of frame transmittable bits) for all traffic classes at the timing of gate switching is shown in FIG. 17, but the transmission control information may be, for example, transmission control information including the only transmittable information for a newly open case as shown in FIG. 18.

The transmission control information including the number of clock cycles as the period information as described above is generated based on, for example, clock information indicating the clock frequency or clock cycle in which the network interface controller 4 (transmission control unit 411 or the like) executes processing, or the like. The clock information may be obtained as the operating speed information by, for example, the notification unit 414 as described above, and may be notified to the host processor 2 (detection unit 206) by the notification unit 414.

The specific examples of the transmission control information have been described with reference to FIG. 11 to FIG. 18, and the transmission control information in the embodiment includes the timing at which events related to the frame transmission occur. The events include entry switching and gate closing. The timing at which events occur includes the base time, cycle time, and time interval (period information for each entry), which are the timing information (entry switching information) for entry switching (including cycle start), and the transmittable information including the transmittable amount or transmittable time corresponding to the queue of each traffic class, which is the timing information for closing the gate.

Description returns again to FIG. 9, and the setting unit 205 urges the transmission control information storage unit 409 included in the network interface controller 4 to store the transmission control information generated in step S3 (step S4).

When the transmission control information is stored in the transmission control information storage unit 409 in step S4, for example, the transmission control unit 411 validates the frame transmission control (gate control), based on the transmission control information (step S5).

Figure 19:
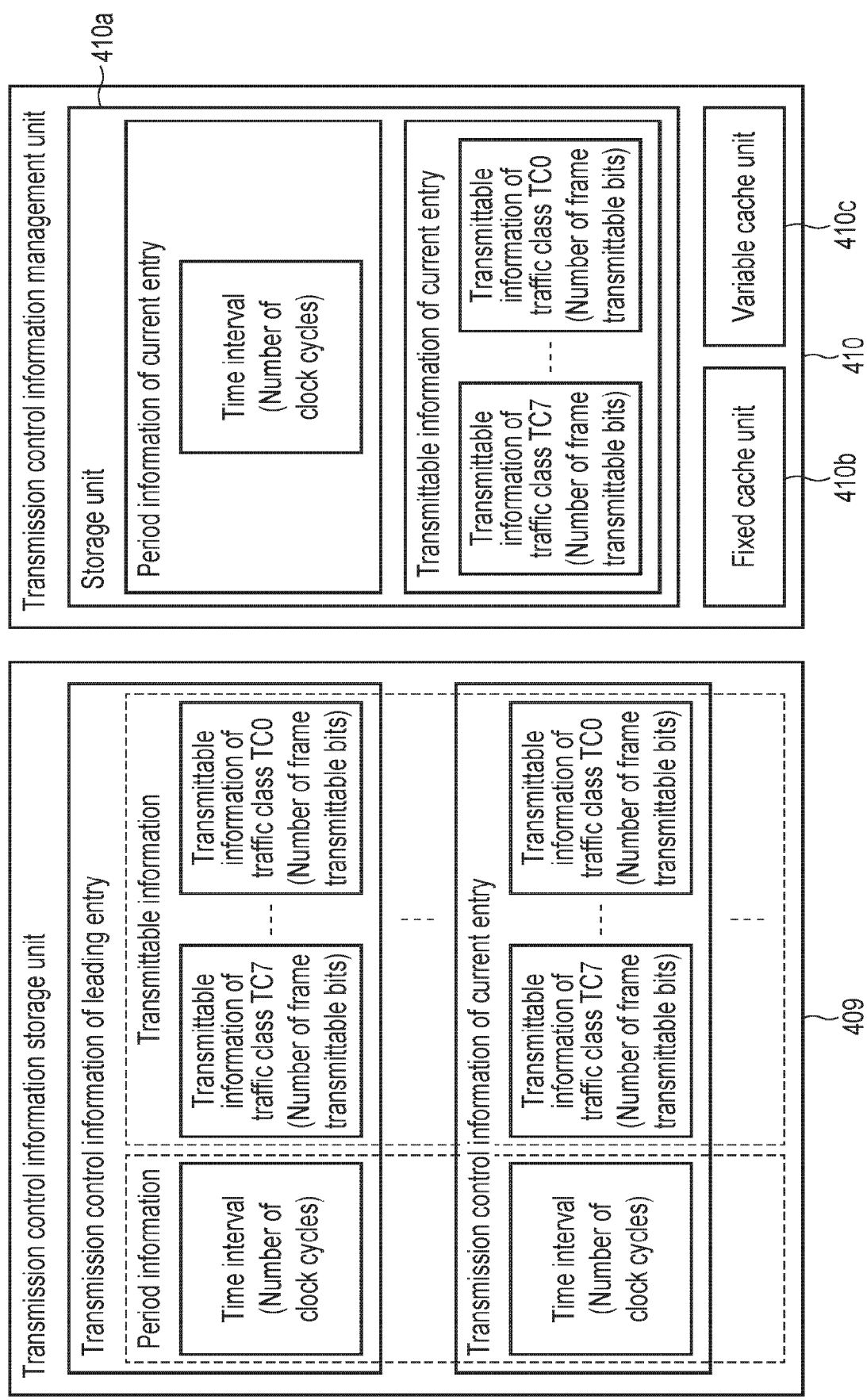
FIG. 19 is a diagram illustrating an example of a configuration of a transmission control information management unit.

When the processes in FIG. 9 are executed as described above, the transmission control information including a plurality of entries is stored in the transmission control information storage unit 409 as shown in, for example, FIG. 19, and the transmission control information management unit 410 can specify and read a currently valid entry (hereinafter referred to as a current entry) among the plurality of entries, using the time managed in the time management unit 404 (i.e., global clock), local clock, base time, and cycle time. The current entry read by the transmission control information management unit 410 is temporarily stored in a storage unit (temporary storage unit) 410a in the transmission control information management unit 410.

The current entry stored in the storage unit 410a is assumed to include the period information (time interval indicated by the number of clock cycles) and the transmittable information (number of frame transmittable bits) for each traffic class as shown in FIG. 17 and FIG. 18 described above.

Furthermore, the transmission control information management unit 410 includes a fixed cache unit 410b and a variable cache unit 410c. The fixed cache unit 410b holds the leading entry (period information and transmittable information). The variable cache unit 410c holds an entry (period information and transmittable information) following the current entry. Even in a case where, for example, the transmission control information management unit 410 cannot immediately read the entry from the transmission control information storage unit 409, the current entry can be appropriately switched at the entry switching timing, by preparing such fixed cache unit 410b and variable cache unit 410c. The fixed cache unit 410b fixedly holds the leading entry, while the variable cache unit 410c operates to hold the entry following the current entry every time the current entry stored in the storage unit 410a is switched.

It has been described that the transmission control information management unit 410 includes the fixed cache unit 410b and the variable cache unit 410c, but the transmission control information management unit 410 may be configured to include one cache unit, which includes a storage area corresponding to the fixed cache unit 410b and a storage area corresponding to the variable cache unit 410c.

When the current entry is stored in the storage unit 410a in the transmission control information management unit 410 as described with reference to FIG. 19, the transmission possibility determination unit 412 obtains the transmittable information (number of frame transmittable bits) included in the current entry, obtains the frame stored at the leading part of each of the plurality of queues prepared in the transmitted frame storage unit 403, and executes the above-describe guard band determination. As shown in FIG. 20, the transmission possibility determination unit 412 is assumed to include a plurality of determination units (hereinafter referred to as traffic class determination units) 412a corresponding to a plurality of traffic classes. According to this, the guard band determination is executed for each traffic class. More specifically, for example, the determination unit 412a of traffic class TC7 executes the guard band determination using the transmittable information of traffic class TC7 which is read from the storage unit 410a in the transmission control information management unit 410 and the frame information obtained from the queue of traffic class TC7. Traffic class TC7 has been described, and (the determination units 412a of) the other traffic classes are also constituted in the same manner.

The operations of the network interface controller 4 (communication control device) according to the embodiment will be described below. It is assumed in the following descriptions that, for example, the transmission control information shown in FIG. 17 is stored in the transmission control information storage unit 409.

Figure 21:
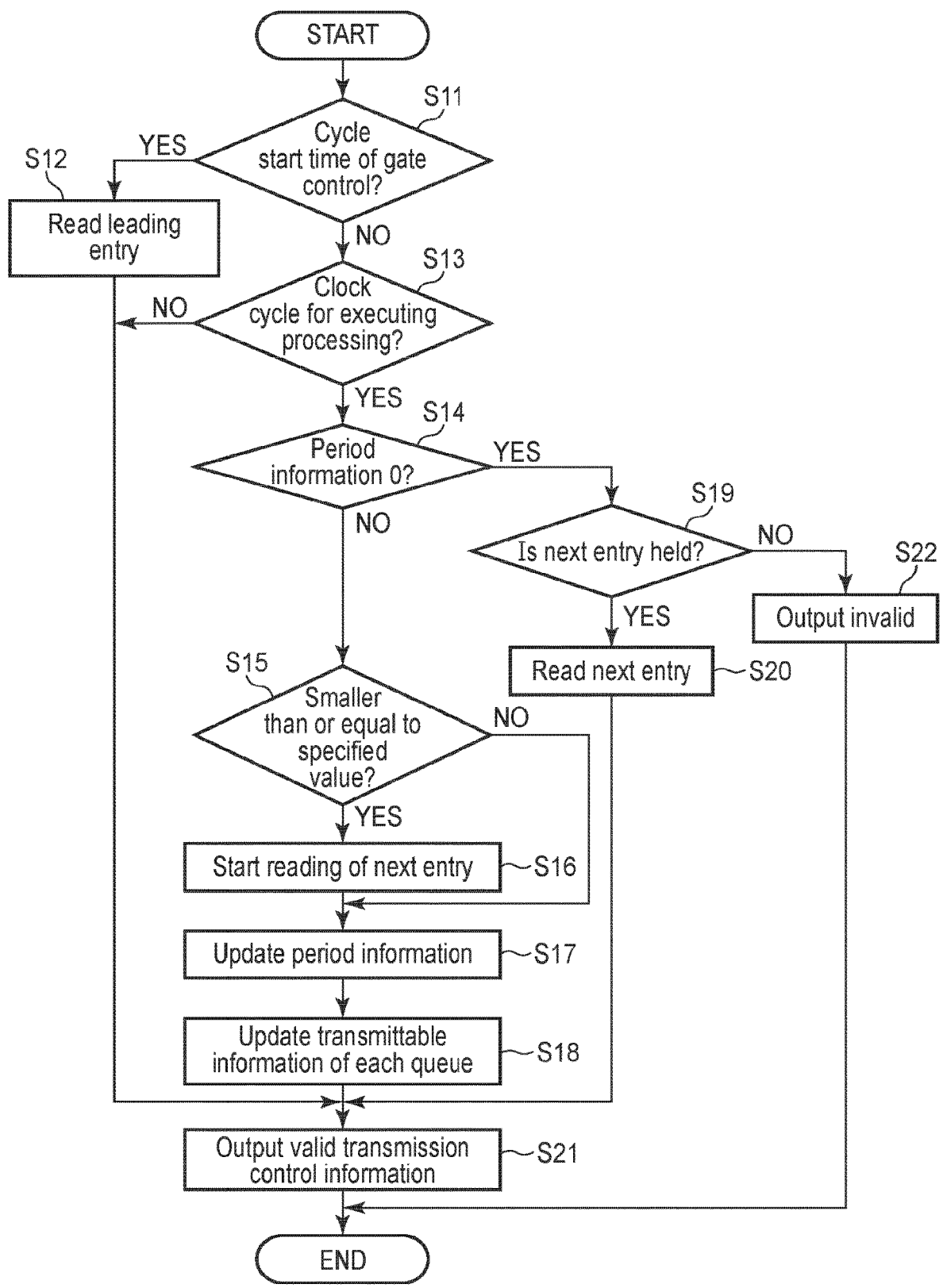
FIG. 21 is a flowchart showing an example of a procedure of the transmission control information management unit.

First, an example of a procedure of the transmission control information management unit 410 will be described with reference to a flowchart of FIG. 21. The processing shown in FIG. 21 is executed in each clock cycle based on the local clock (operation clock of the transmission control unit 411 or the like) in the network interface controller 4. In addition, it is assumed that a leading entry of the transmission control information is stored in the fixed cache unit 410b provided in the transmission control information management unit 410 from the transmission control information storage unit 409.

The transmission control information management unit 410 determines whether or not the current time is the start time of the gate control cycle (i.e., start time of the leading process) by referring to the time information managed in the time management unit 404 (i.e., time information provided by the time management unit 404) (step S11). The process in step S11 corresponds to the process of determining whether or not a cycle start signal under IEEE 802.Qbv is active, and executes the determination using the cycle time and base time included in the transmission control information and the time information provided by the time management unit 404.

If it is determined that the current time is the start time of the gate control cycle (YES in step S11), the transmission control information management unit 410 reads the leading entry of the transmission control information from the fixed cache unit 410b provided in the transmission control information management unit 410 (step S12). When the process of step S12 is executed, the entry read in step S12 is stored in the storage unit 410a in the transmission control information management unit 410 as the above-described current entry.

In contrast, if it is determined that the current time is not the start time of the gate control cycle (NO in step S11), the transmission control information management unit 410 determines whether or not the current clock cycle is a clock cycle for processing (i.e., a clock cycle according to the number of preset processing unit clock cycles) (step S13). For example, if the number of processing unit clock cycles is 1, it means executing the processing in every clock cycle. In addition, for example, if the number of processing unit clock cycles is five (i.e., processing is executed once every five clock cycles), then four clock cycles following the clock cycle in which the processing has been executed is not executed, but the processing is executed in the next clock cycle.

If it is determined that the current clock cycle is the clock cycle for executing (YES in step S13), the transmission control information management unit 410 determines whether or not the period information (time interval value expressed as the number of clock cycles) included in the current entry stored in the memory unit 410a is 0 (step S14).

If it is determined that the period information is not 0 (NO in step S14), the transmission control information management unit 410 determines whether or not the period information included in the current entry stored in the storage unit 410a is smaller than or equal to a specified value (step S15). The specified value in step S15 is set in consideration of the time required to read the entry from the transmission control information storage unit 409.

If it is determined that the period information is smaller than or equal to the specified value (YES in step S15), the transmission control information management unit 410 starts reading the entry following the current entry from the transmission control information storage unit 409 (step S16). If reading the entry following the current entry is completed by executing the process of step S16, the next entry is held in the variable cache unit 410c provided in the transmission control information management unit 410.

In contrast, if it is determined that the period information is not smaller than or equal to the specified value (NO in step S15), the process of step S16 is not executed.

Next, the transmission control information management unit 410 updates the period information included in the current entry stored in the storage unit 410a (step S17). In step S17, a process of subtracting the above number of processing unit clock cycles from the period information (number of clock cycles) is executed.

In addition, the transmission control information management unit 410 updates the transmittable information (for example, the number of frame transmittable bits or the frame transmittable time) for each traffic class included in the current entry stored in the storage unit 410a (step S18). If the transmittable information is the number of frame transmittable bits, a process of subtracting, for example, a predetermined value such as the amount of data that can be transmitted for the number of processing unit clock cycles by the communication unit 401 from (the number of frame transmittable bits indicated by) the transmittable information of each traffic class is executed in step S18. In the case of frame transmission to the outside, the amount of data that can be transmitted per clock cycle needs to be consistent with the data transfer rate of the MAC. Although not shown in the figure, when only internal data transfer is executed, the amount of data that can be transmitted per clock cycle needs to be consistent with the data transfer rate of the internal module connected to the output portion of the transmission control unit 411 (i.e., the module that does not make direct communication with the external network to which the communication unit 401 is connected). For example, to implement 10 Gbps in a case where one clock cycle is 6.4 ns when executing frame transmission to the outside (when the operating frequency is 156.25 MHz), 64-bit data are transferred for each clock cycle. In this case, if the number of processing unit clock cycles is set to five, 64 bits×5=320 bits are subtracted from the transmittable information (number of frame transmittable bits) of each traffic class in step S18. In contrast, if the transmittable information is the frame transmittable time, a process of subtracting a value corresponding to the actually elapsed time from (the frame transmittable time indicated by) the transmittable information may be executed in step S18.

In contrast, if it is determined that the period information is 0 (YES in step S14), the determination means that the period allocated to the current entry stored in the memory unit 410a has expired, and the transmission control information management unit 410 determines whether or not the next entry is held in the variable cache unit 410c provided in the transmission control information management unit 410 (step S19).

If it is determined that the next entry is held in the variable cache unit 410c (YES in step S19), the transmission control information management unit 410 reads the next entry from the variable cache unit 410c (step S20). The next entry read in step S20 is stored in the storage unit 410a as the current entry.

If the above step S12 is executed, the transmission control information management unit 410 outputs the current entry stored in the storage unit 410a as valid transmission control information (step S21). In other words, the transmission control information management unit 410 outputs the transmission available information (for example, number of frame transmittable bits or frame transmittable time) updated to the latest status. The process of step S21 is also executed in the same manner when it is determined in step S13 that the current clock cycle is not the clock cycle for processing (NO in step S13), when the process in step S18 is executed, and when the process in step S20 is executed.

In contrast, if it is determined in step S19 that the next entry is not held in the variable cache unit 410c (NO in step S19), the transmission control information management unit 410 outputs "invalid" indicating that the current entry stored in the storage unit 410a is invalid (step S22). In the embodiment, "invalid" means that the transmission control information (entry) has not been updated to the latest status. In other words, "invalid" means that the transmittable information (for example, the number of frame transmittable bits or the frame transmittable time) has not been updated to the latest status.

It has been described with reference to FIG. 21 that the process in step S21 is executed if the current clock cycle is not determined as a clock cycle for processing in step S13, but the process in step S22 may be executed if the current clock cycle is not determined as a clock cycle for processing. In addition, the value calculated as the transmission control information may be a value obtained by subtracting the number of processing unit clocks in advance.

By executing the above process shown in FIG. 21, the transmission control information management unit 410 can appropriately switch entries according to the operating clock of the transmission control unit 411 or the like and keep the period information and the transmittable information of each traffic class, which are included in the entries, in the latest status at any time.

For example, if the operating frequency of the network interface controller 4 (for example, transmission control unit 411) and the bus width transmitted on the network 200 (i.e., the amount of data that can be transmitted per clock cycle by the communication unit 401) do not match, the value that is subtracted from the transmittable information of each traffic class (hereafter referred to as the subtracted value) may be changed in step S18. In this case, the host processor 2 may notify the transmission control information management unit 410 of information on the subtracted value to be changed (subtracted value information). For example, when the subtracted value is changed at a predetermined clock cycle, the subtracted value information may be, for example, information including a first subtracted value and its repetition number and a second subtracted value and its repetition number, or the like. The subtracted value information may be the information in other formats as long as the subtracted value at each clock cycle position in a predetermined clock cycle (operating clock) can be specified.

It has been described that the transmission control information shown in FIG. 17 is stored in the transmission control information storage unit 409, but, for example, if the transmission control information shown in FIG. 10, i.e., the transmittable information is expressed in terms of time in the transmission control information storage unit 409, 6.4 ns may be subtracted from the transmittable information (frame transmittable time) for each clock cycle, based on, for example, the clock operating frequency of 156.25 MHz. In addition, when the period (information) assigned to each entry, such as the transmission control information shown in FIG. 10, is managed in terms of time (relative time from the leading part of the gate control list), it may be determined whether or not a new entry is read based on the time information managed by the time management unit 404. In addition, the time interval in each entry may be kept and determined in the form of time.

Next, the frame transmission control of the embodiment will be described. In the frame transmission control in the embodiment, when the transmission control based on the transmission control information (gate control) is validated in step S5 shown in FIG. 9 described above, the following guard band determination process and frame selection process are executed in parallel at each clock cycle. It is assumed that the local clock signal inside the network interface controller 4 (for example, 156.25 MHz clock signal supplied from the 10 Gbps MAC) is used as a synchronization clock signal which execution of these processes is based, but the other clock signals may be used.

The guard band determination process and frame selection process described above will be described below. It is assumed here that the store-and-forward method is employed in the network interface controller 4 (transmitted frame storage unit 403).

First, an example of a procedure of the guard band determination will be described with reference to a flowchart of FIG. 22. The guard band determination process is executed by the transmission possibility determination unit 412. In addition, as described above, the transmission possibility determination unit 412 includes a plurality of determination units 412 corresponding to a plurality of traffic classes, and the guard band determination process is executed by each of the plurality of determination units 412a.

The guard band determination processing executed by a determination unit (hereinafter referred to as a target determination unit) 412a among a plurality of determination units 412a will be described. In addition, the queue of the traffic class corresponding to the target determination unit 412a is referred to as a target queue for convenience.

In this case, the target determination unit 412a determines whether or not a frame in a transmittable status is in the target queue (step S31). When the store-and-forward method is employed in the network interface controller 4 (transmitted frame storage unit 403) as described above, the above-mentioned "transmittable frame in the target queue" means that a frame in which all data are stored in the target queue is present (i.e., a frame in which all data constituting the frame are collected is stored in the target queue). In other words, a transmittable frame is a frame whose amount of data is fixed.

If it is determined that a transmittable frame is in the target queue (YES in step S31), the target determination unit 412a determines whether or not the transmission control information is valid (i.e., the current entry is output as valid transmission control information from the transmission control information management unit 410) (step S32). In other words, the target determination unit 412a determines whether or not the transmission control information updated to the latest status is output from the transmission control information management unit 410.

If it is determined that the transmission control information is valid (YES in step S32), the target determination unit 412a obtains the transmittable information of the traffic class corresponding to the target determination unit 412a included in the current entry output from the transmission control information management unit 410 (step S33).

Next, the target determination unit 412a obtains the amount of data (frame length) of a frame (hereinafter referred to as a target frame) stored at the leading part of the target queue (step S34).

When the process of step S34 is executed, the target determination unit 412a executes the guard band determination, based on the transmittable information (number of frame transmittable bits or frame transmittable time) obtained in step S33 and the total communication cost (transmission cost) for which the target frame is transmitted by the communication unit 401 (step S35).

Figure 23:
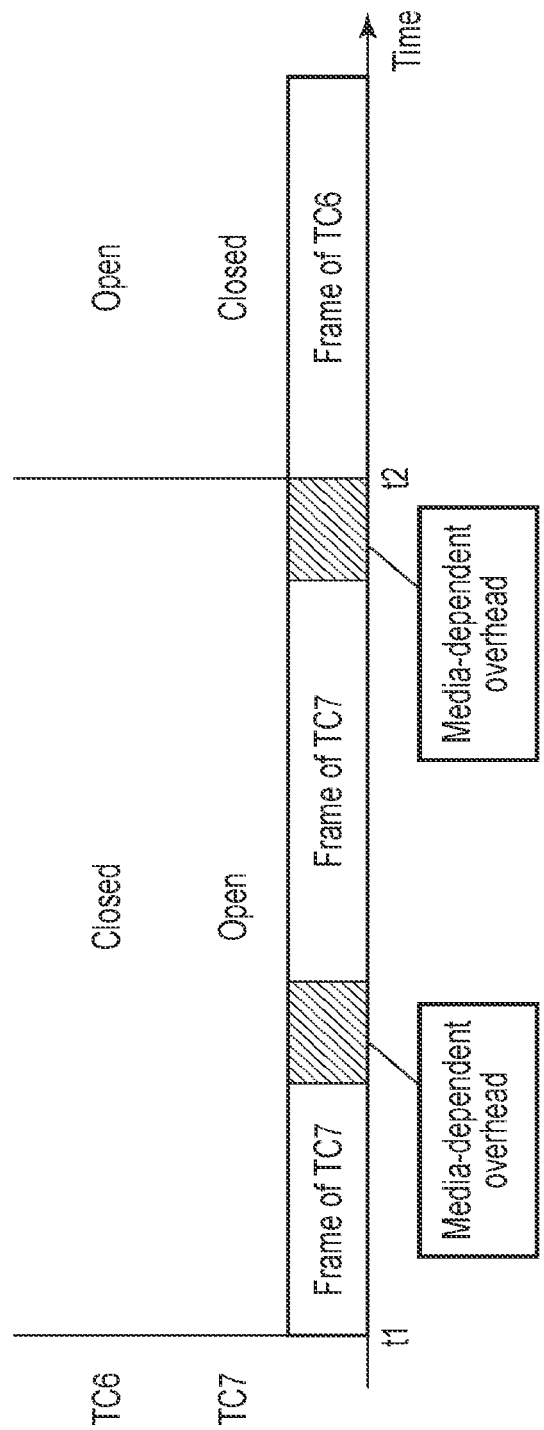
FIG. 23 is a chart showing an example of media-dependent overhead.

For example, a total value of the amount of data of the target frame obtained in step S34 and the communication overhead generated when the communication unit 401 actually transmits the target frame can be used as the total communication cost used in the guard band determination of step S35. The communication overhead includes, for example, the amount of data added internally in the communication unit 401 when transmitting the target frame (for example, a frame checksum sequence such as 32-bit CRC), and a media-dependent overhead. FIG. 23 shows an example of the media-dependent overhead. The media-dependent overhead includes, for example, the inter-frame gap (IFG), as well as the size of a preamble and a start frame delimiter (SFD) of the next frame.

In addition, the total communication cost can also be expressed in time units. For example, the total communication cost can be converted in time units, based on the total value (amount of data) described above and the link speed (the amount of data that can be transmitted per unit time). More specifically, for example, when the total communication cost (amount of data) is 1000 bits and the link speed is 10 Gbps, the total communication cost (time) is 1000 bits/10 Gbps=100 ns. Such a total communication cost expressed in time units is used in the guard band determination when the transmittable information is the frame transmittable time as described above.

If the process of step S35 is executed, the target determination unit 412a determines whether or not the target frame satisfies a condition of the guard band determination (step S36). If the transmittable information obtained in step S33 is the number of frame transmittable bits, the condition for guard band determination is, for example, "transmittable information (number of frame transmittable bits)≥the total communication cost (amount of data) when the target frame is transmitted by the communication unit 401". In contrast, if the transmittable information obtained in step S33 is the frame transmittable time, the condition for guard band determination is, for example, "transmittable information (frame transmittable time)≥total communication cost (time) when the target frame is transmitted by the communication unit 401". In other words, the condition for guard band determination is "transmittable information≥transmission cost".

If it is determined that the target frame satisfies the condition for guard band determination (YES in step S36), the target determination unit 412a notifies the transmission control unit 411 that the target frame (i.e., the frame stored at the leading part of the target queue) can be transmitted (step S37). More specifically, in step S37, the transmission possibility information indicating that the target frame can be transmitted is delivered from the target determination unit 412a to the transmission control unit 411.

In contrast, if it is determined that the target frame does not satisfy the condition for guard band determination (NO in step S36), the target determination unit 412a notifies the transmission control unit 411 that the target frame cannot be transmitted (i.e., untransmittable) (step S38). More specifically, in step S38, the transmission possibility information indicating that the target frame is transmittable is delivered from the target determination unit 412a to the transmission control unit 411.

If it is determined that there is no frame in the status of being transmittable to the target queue in step S31 described above (NO in step S31) or if it is determined that the transmission control information is not valid in step S32 (NO in step S32), the process of step S38 is executed.

Since the above-described guard band determination process is executed by a plurality of determination units 412a corresponding to a plurality of traffic classes, the transmission possibility determination unit 412 (a plurality of determination unit 412a) notifies the transmission control unit 411 of the possibility of transmission of the queue stored in the leading part of the queue of each traffic class, by executing the guard band determination process.

The queue transmission possibility (transmittable information) is delivered to the first transmission control unit 411a when an express frame is stored in the queue, and is delivered to the second transmission control unit 411b when a preemptable frame is stored in the queue. In this case, the determination unit 412a corresponding to each traffic class can recognize the transmission control unit to which the transmittable information is to be delivered based on setting (determination) executed by the communication processing determination unit 407.

An example of a procedure of the communication processing determination unit 407 will be described with reference to a flowchart of FIG. 24. The communication processing determination unit 407 determines the communication processing for the frames stored in the queues of each traffic class, and the queue storing the frames for which the communication processing is determined is referred to as the target queue.

First, the communication processing determination unit 407 refers to the attribute information (frame preemption status table) stored in the queue attribute information storage unit 406 (step S41).

Next, the communication processing determination unit 407 determines whether or not, for example, the frame preemption status associated with the traffic class of the target queue described above is the express (frame) (step S42).

If it is determined that the frame preemption status is the express (YES in step S42), the communication processing determination unit 407 determines processing the frame stored in the target queue by the first communication processing unit 413a, and sets an output destination of the frame to the first transmission control unit 411a (step S43).

When the process of step S43 is executed, the determination unit 412a corresponding to the traffic class of the target queue can operate to deliver (output) the above transmittable information to the first transmission control unit 411a.

In contrast, if it is determined that the frame preemption status is not the express (i.e., preemptable) (NO in step S42), the communication processing determination unit 407 determines processing the frame stored in the target queue by the first communication processing unit 413a, and sets an output destination of the frame to the second transmission control unit 411b (step S44).

When the process of step S44 is executed, the determination unit 412a corresponding to the traffic class of the target queue can operate to deliver (output) the above transmittable information to the second transmission control unit 411b.

Determining the communication process for the frames stored in one queue (target queue) has been described here, but the process shown in FIG. 24 described above is executed for each of a plurality of queues (a plurality of traffic classes).

Next, an example of a procedure of the frame selection process will be described with reference to a flowchart of FIG. 25. The frame selection process is executed by each of the first transmission control unit 411a and the second transmission control unit 411b. It is assumed here that the first transmission control unit 411a executes the frame selection process.

First, the first transmission control unit 411a determines whether or not the first transmission control unit 411a is in a busy status or not (step S51). The busy status means the status in which the first transmission control unit 411a is transferring frames to the communication unit 401 (first communication processing unit 413a).

If it is determined that the first transmission control unit 411a is not in the busy status (i.e., in the idle status in which no frame is transmitted) (NO in step S51), the first transmission control unit 411a determines whether or not transfer of a new frame can be started based on, for example, a notification from the communication unit 401 (step S52).

If it is determined that transfer of a new frame can be started (YES in step S52), the first transmission control unit 411a obtains the transmittable information delivered from the transmission possibility determination unit 412 (a plurality of determination units 412a) by executing the above guard band determination process (step S53). According to the transmittable information obtained in step S53, the first transmission control unit 411a can recognize whether or not each of the frames stored at the leading part of the queue storing the express frame, among the queues of the plurality of traffic classes, can be transmitted.

Next, the first transmission control unit 411a selects a frame whose transfer from the first transmission control unit 411a to the first communication processing unit 413a is to be actually started, among the transmittable frames (step S54). The process of step S54 may be executed according to any selection algorithm and, for example, if "Strict Priority" is used as the selection algorithm, the frame with the highest priority (express frame) is selected among the transmittable frames. The frame selected in step S54 is hereinafter referred to as a transfer start frame.

When the process of step S54 is executed, the first transmission control unit 411a starts transfer of the transfer start frame (step S55).

When the process of step S55 is executed, the first transmission control unit 411a transitions to the busy status (step S56). The busy status of the first transmission control unit 411a is canceled at the timing when the transfer of the transfer start frame is completed. When the busy status is canceled, the transmission control unit 411a automatically transitions to the idle status.

In contrast, if it is determined in step S51 that the first transmission control unit 411a is in the busy status (YES in step S51) and if it is determined in step S52 that transfer of a new frame cannot be started (NO in step S52), the process shown in FIG. 25 is ended.

According to the above-described frame selection process, the transfer start frame can be selected (i.e., the frame transmission timing can be determined) and the transmission of the transfer start frame can be started, based on the result of the guard band determination executed by the transmission possibility determination unit 412.

In the embodiment, the frame transmission control is implemented by combining and executing the guard band determination process and frame selection process described above in each clock cycle.

Figure 26:
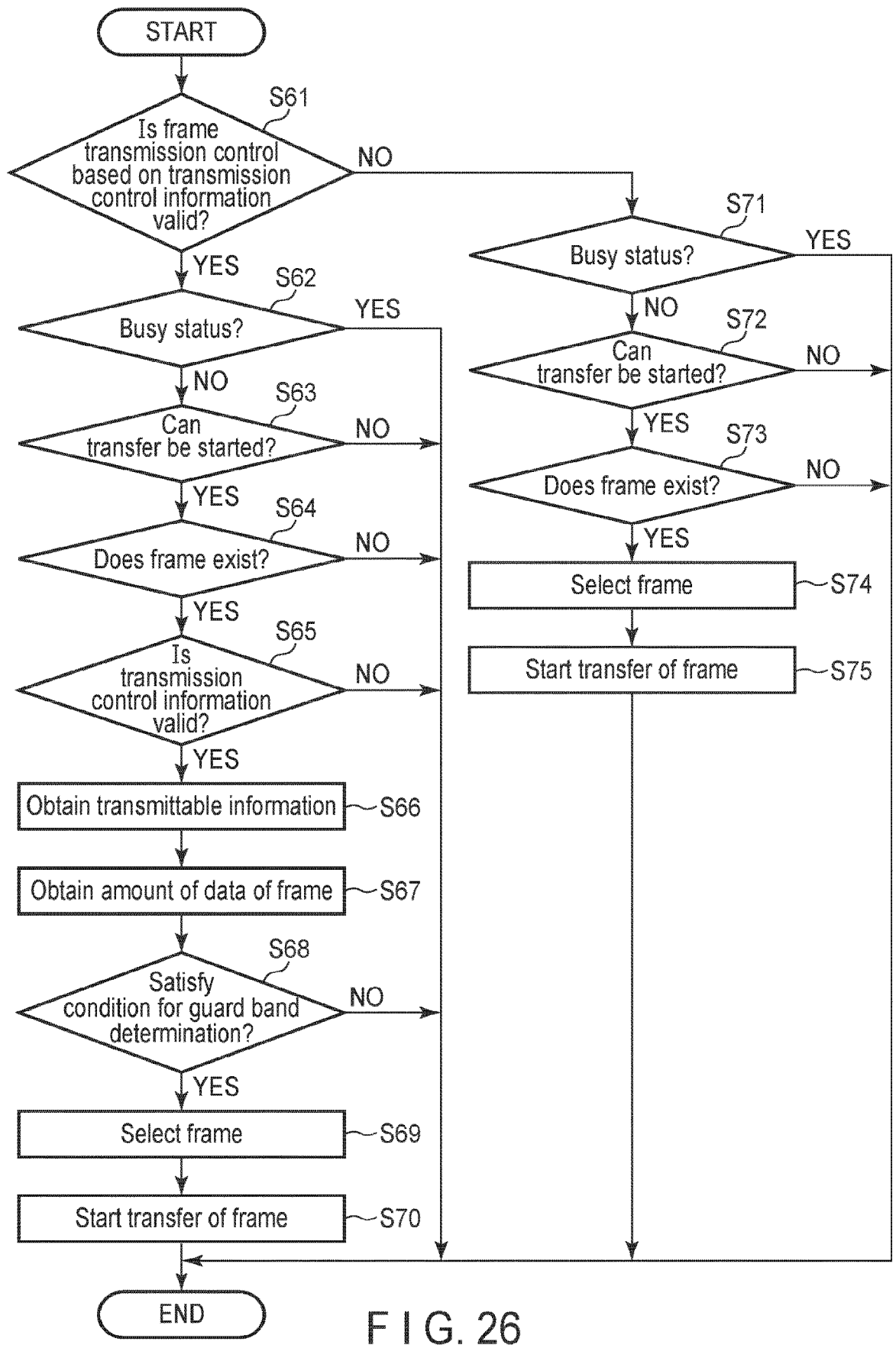
FIG. 26 is a flowchart showing an example of a process flow of the overall frame transmission control.

A flowchart in FIG. 26 shows an overall process flow of the frame transmission control implemented by the combination of the guard band determination process and frame selection process described above.

First, in the frame transmission control, it is determined whether or not the frame transmission control (gate control) based on the transmission control information is valid (step S61). In step S61, when the process shown in FIG. 9 (process in step S5) is executed, it is determined that the frame transmission control based on the transmission control information is valid.

If it is determined that the frame transmission control based on the transmission control information is valid (YES in step S61), processes of steps S62 and S63 corresponding to the processes in steps S51 and S52 shown in FIG. 25 are executed.

If it is determined in step S63 that transfer of a new frame can be started (YES in step S63), processes of steps S64 to S67 corresponding to the processes in steps S31 to S34 shown in FIG. 22 are executed.

Next, it is determined whether or not the condition for guard band determination is met (step S68). The process of step S68 corresponds to the processes of steps S35 and S36 shown in FIG. 22.

If it is determined in step S68 that the guard band determination is met (YES in step S68), processes of steps S69 and S70 corresponding to the processes of steps S54 and S55 shown in FIG. 25 are executed. If it is assumed in step S70 that, for example, the first transmission control unit 411a starts the frame transfer, the first transmission control unit 411a transitions to the busy status. The same operation is also executed when the second transmission control unit 411b starts the frame transfer.

If it is determined in step S62 that, for example, the first transmission control unit 411a is in the busy status (YES in step S62), the frame transmission control executed by the first transmission control unit 411a is ended. In contrast, if it is determined in step S62 that, for example, the second transmission control unit 411b is in the busy status (YES in step S62), the frame transmission control executed by the second transmission control unit 411b is ended.

In other words, the frame transmission control in the embodiment is executed independently by each of the first transmission control unit 411a and the second transmission control unit 411b, the transmission control is executed for frames (or queues) set to express in the first transmission control unit 411a, and the transmission control is executed for frames (or queues) set to preemptable in the second transmission control unit 411b.

The frame transmission control is ended if it is determined in step S63 that the transfer of a new frame cannot be started (NO in step S63), if it is determined in step S64 that there are no transmittable frames in all queues (NO in step S64), if it is determined in step S65 that the transmission control information is not valid (NO in step S65), and if it is determined in step S68 that there is no frame that satisfies the condition for guard band determination (NO in step S68).

If it is determined in step S61 that the frame transmission control based on the transmission control information is valid as described above, the frame transmission control based on the transmission control information is executed.

In contrast, in the example shown in FIG. 26, if it is determined in step S61 that the frame transmission control based on the transmission control information is not valid (NO in step S61), for example, the frame transmission control not using the transmission control information is executed.

More specifically, processes of steps S71 to S73 corresponding to the processes of steps S62 to S64 described above are executed, and processes of steps S74 and S75 corresponding to the processes of steps S69 and S70 are executed.

It has been described that the processes of steps S71 to S75 are executed if the frame transmission control based on the transmission control information is not valid but, if the frame transmission control is not valid, the processes of steps S71 to S75 may not be executed and the frame transmission control may be ended.

The (series of processes of the) frame transmission control described with reference to FIG. 26 described above is assumed to be completed in one clock cycle, and is suitable to a case where the guard band determination process and frame selection process described above are implemented by hardware implementation.

In contrast, in the embodiment, the transmission control of the frame in which the series of processes is not necessarily completed in one clock cycle may be performed. Since the frame transmission control in this case is substantially the same as the processing shown in FIG. 26, detailed description is omitted here, but such frame transmission control is suitable in a case where the guard band determination process and frame selection process described above are implemented by software implementation. The transmission control of the frame which is not completed in one clock cycle may be implemented by hardware implementation.

By the way, the frame transmission control in the case where the store-and-forward method is employed in the network interface controller 4 (transmitted frame storage unit 403) has been described, but the transmission control of the frame (guard band determination) cannot be applied to the cut-through method in which the frame transmission is started before the frame reception is completed.

Thus, the guard band determination in a case where the cut-through method is employed in the network interface controller 4 (transmitted frame storage unit 403) will be described. In the following descriptions, for convenience, the guard band determination process shown in FIG. 22 described above is referred to as a first guard band determination process, and the guard band determination process to be executed when the cut-through method is employed is referred to as a second guard band determination process.

First, an example of a procedure of the second guard band determination process will be described with reference to a flowchart of FIG. 27. Parts different from the above-described first guard band determination process will be described here.

The target determination unit 412a determines whether or not a frame in a transmittable status is in the target queue (step S81). When the cut-through method is employed in the network interface controller 4 (transmitted frame storage unit 403) as described above, "the frame in the transmittable status in the target queue" indicates that the frame in which leading data are prepared may be stored in the target queue, unlike the above first guard band determination process (i.e., step S31 shown in FIG. 22), and the frame in which all data constituting the frame are arranged does not necessarily need to be stored in the target queue (i.e., the amount of data does not need to be fixed).

If it is determined that the frame in the transmittable status is in the target queue (YES in step S81), processes of steps S82 and S83 corresponding to the processes of steps S32 and S33 shown in FIG. 22 described above are executed.

The amount of data of the frame (target frame) stored at the leading part of the target queue is obtained in the above-described first guard band determination process, but all data of the target frame are not arranged in the target queue and the amount of data of the target frame cannot be obtained in the second guard band determination process. For this reason, the target determination unit 412a obtains an upper limit of the amount of data (frame length) of the frame stored in the target queue (step S84). In step S84, for example, a value of queueMaxSDU (maximum data unit defined for each queue) of the target queue can be obtained as the upper limit of the amount of data of the frame. Alternatively, a maximum transmission unit (MTU) that is the maximum transmission unit in the communication unit 401 may also be used as the upper limit of the amount of data of the frame.

When the process of step S84 is executed, the target determination unit 412a executes the guard band determination, using the upper limit of the amount of data of the frame obtained in step S84 instead of the amount of data of the target frame in the first guard band determination process (step S85). In other words, in step S85, the guard band determination is executed based on the upper limit of the total communication cost when the target frame is transmitted by the communication unit 401. Detailed description of step S85 is omitted here since the process is similar to the guard band determination in the first guard band determination process except for using the upper limit of the amount of data of the frame instead of the amount of data of the target frame.

When the process of step S85 is executed, processes of steps S86 to S88 corresponding to the processes of steps S36 to S38 shown in FIG. 22 are executed.

In the above-described second guard band determination process, the guard band determination can be executed appropriately even when the cut-through method is employed, by using the upper limit of the amount of data in the frame.

As described above, in the embodiment, the frame transmission control is implemented by the combination of the first guard band determination process and the frame selection process when the store-and-forward method is employed, and the frame transmission control is implemented by the combination of the second guard band determination process and the frame selection process when the cut-through method is employed.

In other words, the frame transmission control that is a combination of the first guard band determination process and the frame selection process is considered suitable to the communication method in which the amount of data (frame length) of the frame is confirmed at the timing of determining possibility of the frame transmission (i.e., at the timing of determining whether or not the first transmission control unit 411a and the second transmission control unit 411b are in the busy status in the frame selection process). In contrast, the frame transmission control that is a combination of the second guard band determination process and the frame selection process is considered suitable for the communication method in which the amount of data in the frame is not confirmed at the time of executing the determination of possibility of the frame transmission.

In the embodiment, the second guard band determination process has been described as a process to be executed when the cut-through method is adopted, but, the second guard band determination process may also be executed when the store-and-forward method is employed.

As described above, the network interface controller 4 (communication control device) according to the embodiment includes the transmission control unit 411 that controls the transmission of messages stored in the queues based on the transmission control information generated based on the gate control list (gate control information) in which the open or close status of gates corresponding to each of a plurality of queues is specified, and the communication unit 401 that transmits frames (messages) under control of the transmission control unit. In the embodiment, the transmission control information indicates the timing when an event (next event) related to the transmission of the frame concerned next occurs at the point in time when the frame transmission is controlled.

More specifically, the transmission control information in the embodiment includes a plurality of entries, and each of the plurality of entries includes (period information indicating) a period assigned to the entry, and the period is indicated by the number of clock cycles based on the clock of the transmission control unit 411.

In addition, the transmission control information in the embodiment includes the transmittable information that indicates the time until the gate corresponding to each of the plurality of queues closes as the timing when the above event occurs or the transmittable information indicating the amount of data of frames that can be transmitted before the gate closes, and the transmission control unit 411 controls the frame transmission by opening and closing the gates based on the transmittable information. In other words, "the timing when the event occurs" in the embodiment is a concept that includes the timing when the gate corresponding to each of the plurality of queues closes.

In addition, in the embodiment, the transmission control information management unit 410 includes a storage unit 410a (temporary storage unit) that temporarily stores (the current entry of) the transmission control information, and the transmission control unit 411 controls the frame transmission by opening and closing the gates, based on the transmission control information stored in the storage unit 410a.

In addition, in the embodiment, for example, (the current entry of) the transmission control information can be managed in the latest status and appropriate frame transmission control (i.e., guard band determination) can be executed based on the transmission control information, by updating the transmittable amount indicated by the transmittable information included in the transmission control information for each operation clock of the transmission control unit 411 (i.e., timing at which the event indicated by the transmission control information occurs).

The above-described transmission control information is generated by the host processor 2 (information processing device) connected to the network 200 via the network interface controller 4.

In the embodiment, the operation according to the gate control list can be executed precisely and the given bandwidth can be effectively used while simplifying the hardware configuration or software processing, in the above-described configuration. Moreover, in the embodiment, processing can be executed based on a fixed number of elements of information, and completing processing within a determined time can be executed in the processing in a real time.

Furthermore, the embodiment includes the communication processing unit 413 including the first communication processing unit 413a that transmits the undividable frame (express frame) via the communication unit 401 and the second communication processing unit 413b that transmits the dividable frame (preemptable frame) via the communication unit 401, and the communication processing determination unit 407 determining the communication processing for the frames stored in the queues, based on the attribute information indicating the attribute of each of the plurality of queues (i.e., transmitting the frames by the first communication processing unit 413a or the second communication processing unit 413b), and can thereby implement a system effectively utilizing the bandwidth in combination with the frame interrupt function defined under IEEE 802.1Qbu.

In the embodiment, it has been described that the transmission control information is generated by the transmission control information generation unit 204 included in the host processor 2 as shown in FIG. 2 and that the transmission control information is stored in the transmission control information storage unit 409 included in the network interface controller 4, but the transmission control information may be dynamically generated (calculated) on the network interface controller 4 side.

FIG. 28 is a block diagram showing an example of the functional configuration of the communication device 100 (hereinafter referred to as a modified example of the embodiment) in a case where the transmission control information is generated on the network interface controller 4 side. In FIG. 28, portions like or similar to those shown in FIG. 2 are denoted by the same reference numerals and their detailed description is omitted.

As shown in FIG. 28, the network interface controller 4 includes a gate control list storage unit 415 and a transmission control information generation unit 416.

In the modified example of the embodiment, the host processor 2 does not include the transmission control information generation unit 204, and the reception unit 408 provided in the network interface controller 4 accepts the gate control list stored in the gate control list storage unit 201 via the setting unit 205 provided in the host processor 2. The gate control list thus received by the reception unit 408 is stored in the gate control list storage unit 415.

The transmission control information generation unit 416 reads one or more entries from the gate control list storage unit 415, calculates the amount of transmission (for example, the number of frame transmittable bits) indicated by the transmittable information of (the queue corresponding to) each traffic class, and generates the transmission control information including the period information (for example, the number of clock cycles indicating the time interval value) and the transmittable information, based on the global clock and the local clock.

Since the transmission control information management unit 410 switches entries according to (progress of) the global clock and local clock as described above, the transmission control information generation unit 416 desirably operates to calculate in advance the amount of transmission indicated by the transmittable information included in an entry following the current entry stored in the storage unit 410a in the transmission control information management unit 410a in order to smoothly execute such switching of entries. For example, if the calculation of the amount of transmission executed by the transmission control information generation unit 416 (i.e., generation of transmittable information) cannot be completed in time, the transmission control information management unit 410 may output "invalid" to the transmission possibility determination unit 412. The "invalid" means that the transmission control information (transmittable information) is not updated to the latest status as described above.

It is assumed that the transmission control information generation unit 416 calculate in advance the amount of transmission indicated by the transmittable information included in the first (leading) entry before the gate control becomes effective, and holds the entry. In addition, for the second and subsequent entries, the once-calculated transmittable amount (transmittable information) may be cached, and the cached transmittable amount may be reused for the next and subsequent entries.

Since the frame transmission control itself in the modified example of the embodiment has been described in the embodiment, its detailed description is omitted here.

Second Embodiment

Next, a second embodiment will be described. In the embodiment, descriptions of the portions like or similar to the above-described first embodiment are omitted and the portions different from those of the first embodiment will be mainly described. In addition, the hardware configuration of the communication device according to this embodiment is the same as that of the above-described first embodiment and will be described as appropriate with reference to FIG. 1.

Figure 29:
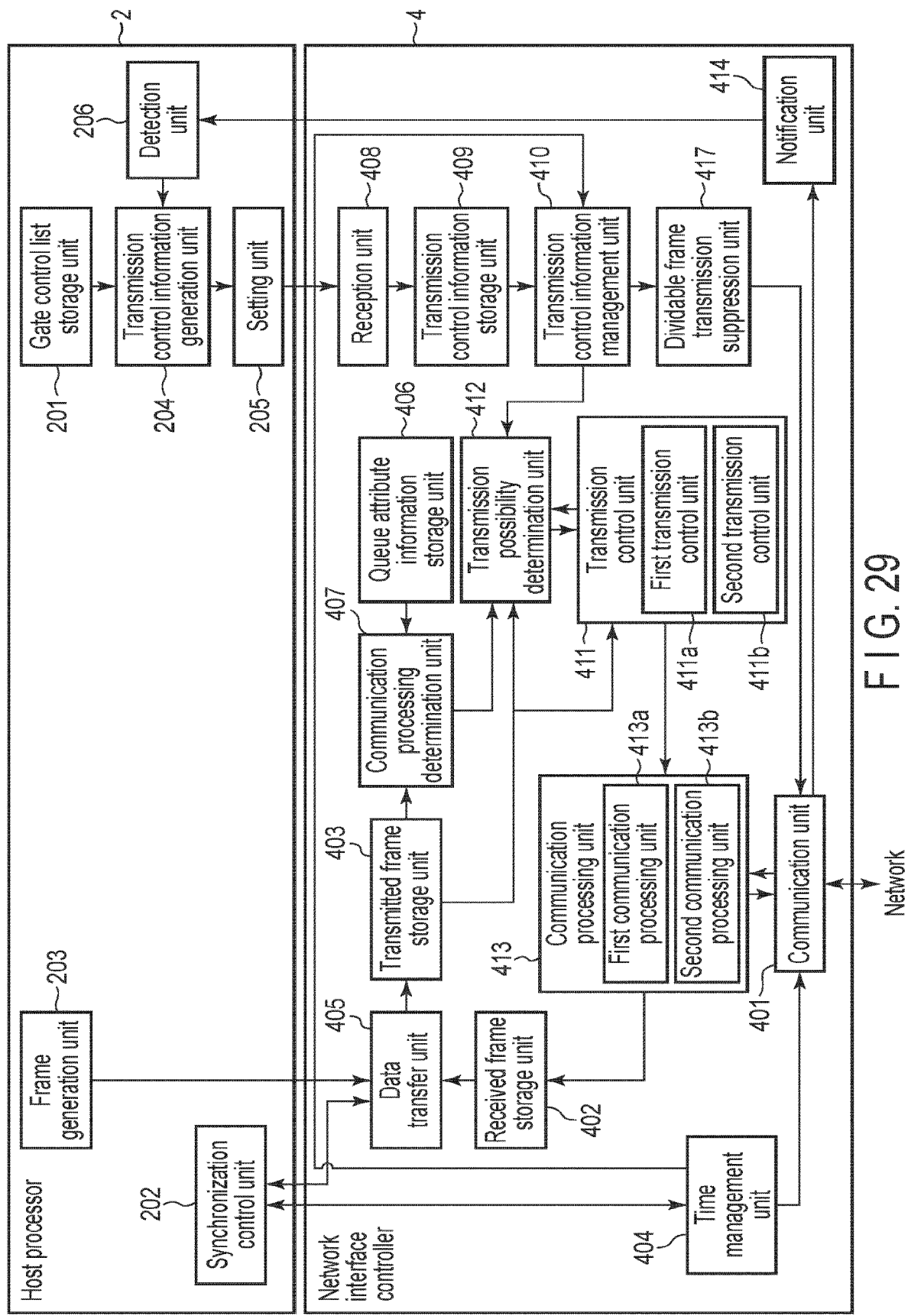
FIG. 29 is a block diagram showing an example of a functional configuration of a communication device according to a second embodiment.

FIG. 29 is a block diagram showing an example of a functional configuration of a communication device 100 according to the embodiment. In FIG. 29, portions like or similar to those shown in FIG. 2 are denoted by the same reference numerals and their detailed explanations are omitted.

As shown in FIG. 29, a network interface controller 4 of the embodiment is different from the network interface controller 4 shown in FIG. 2 described above in including a dividable frame transmission suppression unit 417.

Similarly to the above-described first embodiment, in this embodiment, an undividable frame (express frame) processed by a first communication processing unit 413a and a dividable frame (preemptable frame) processed by the second communication processing unit 413b are transmitted via a communication unit 401, and the dividable frame transmission suppression unit 417 controls the communication unit 401 to suppress transmission of the preemptable frame from the second communication processing unit 413b (i.e., transmission of the dividable frame by the second communication processing unit 413b), based on the transmission control information.

FIG. 30 shows an example of the gate control list of the embodiment. Points different from the gate control list shown in FIG. 3, which is described above in the first embodiment, will be mainly described here.

As shown in FIG. 30, Set-And-Hold-MAC is set as an operation of entry T02, and Set-And-Release-MAC is set as an operation of entry T03, in the gate control list of the embodiment.

Set-And-Hold-MAC indicates stopping (HOLD) the transmission of the preemptable frame from the communication unit 401 during a time interval (period) assigned to the entry for which Set-And-Hold-MAC is set, in addition to the operation of Set-And-Hold-MAC described above.

Set-And-Release-MAC indicates resuming (RELEASE) the transmission of the preemptable frame from the communication unit 401 during a time interval (period) assigned to the entry for which Set-And-Release-MAC is set, in addition to the operation of SetGatesStates described above.

In other words, according to the gate control list shown in FIG. 30, the transmission of the preemptable frame is suppressed during the time interval assigned to entry T02, and the transmission of the preemptable frame is executed during the time interval assigned to the other entries. The operations of stopping and resuming the transmission of the above preemptable frame can be implemented by issuing HOLD and RELEASE to the MAC of the communication unit 401.

FIG. 31 shows an example of the transmission control information generated from the gate control list shown in FIG. 30 in the embodiment. Points different from the gate control list shown in FIG. 17, which is described above in the first embodiment, will be mainly described here.

In the embodiment, (each entry of) the transmission control information) includes split transmission control information in addition to the period information and the transmittable information described in the above first embodiment.

In other words, in the embodiment, the transmission control information includes the timing at which an event related to the frame transmission occurs. The event includes switching the entries, closing the gates, and issuing HOLD/RELEASE to the communication unit 401. The timing at which an event occurs includes the base time, cycle time and time interval (period information for each entry), which are the timing information (entry switching information) for entry switching (including a cycle start), the transmittable information including the transmittable amount or transmittable time corresponding to the queue of each traffic class that is the timing information of closing the gate, and split transmission control information including a split transmission control residual that is timing information for HOLD/RELEASE for each entry.

The split transmission control information includes an initial status (HOLD or RELEASE) at the start time of the period assigned to each entry of the transmission control information, and the split transmission control residual (timer value) indicating the timing of switching the status. The split transmission control residual corresponds to information indicating the timing of stopping or resuming the transmission of the preemptable frame (dividable frame) (i.e., residual to stop/resume transmission of the preemptable frame), as the timing at which an event related to the transmission of the next frame occurs. In the example shown in FIG. 31, the split transmission control residual is expressed by the number of clock cycles.

An outline of the operation of the transmission control information generation unit 204 in generating the transmission control information (split transmission control information) shown in FIG. 31 from the gate control list shown in FIG. 30 will be described below in brief.

First, the transmission control information generation unit 204 sets an initial status of the suppression status of the split transmission at the start stage of each entry in the gate control list. In the gate control list shown in FIG. 30, since Set-And-Hold-MAC is set for entry T02, the transmission of the preemptable frame is stopped at the start stage of the entry T02. In this case, "Hold" is set in the initial status of the split transmission control information included in the entry corresponding to entry T02 among the plurality of entries of the transmission control information.

In addition, in the gate control list shown in FIG. 30, since Set-And-Release-MAC is set for entry T03, the stop (suppression) of the transmission of the preemptable frame in entry T02 is canceled at the start stage of entry T03. In this case, "Release" is set in the initial status of the split transmission control information included in the entry corresponding to entry T03 among the plurality of entries of the transmission control information.

Furthermore, in the gate control list shown in FIG. 30, the gate status of the gate of each traffic class is switched in order of entries T04, T05, T00, T01, . . . after entry T03, but the transmission of the preemptable frame is not stopped until entry T02. In this case, "Release" is set in the initial status of the split transmission control information included in the entries corresponding to entries T00, T01, T04, and T05 among the plurality of entries of the transmission control information, similarly to entry T03.

Next, the transmission control information generation unit 204 sets the split transmission control residual of the split transmission control information included in the transmission control information (i.e., the residual before stopping/resuming the transmission of the dividable frame).

Since a time lag is formed after issuing HOLD and RELEASE described above for MAC of the communication unit 401 and before actually stopping and resuming the transmission of the preemptable frame, the time lad needs to be set (specified) in advance to start the operations of HOLD and RELEASE at the start point of the period assigned to the entries for which Set-And-Hold-MAC and Set-And-Release-MAC are set. To control the operations, holdAdvance that is the maximum time to be spent after issuing HOLD for MAC and before the MAC stops the transmission of the preemptable frame, and releaseAdvance that is the maximum time to be spent after issuing RELEASE for MAC and before the MAC is ready to resume the transmission of the preemptable frame are used. In the embodiment, a value of holdAdvance is, for example, 32 ns, and a value of releaseAdvance value is, for example, 6.4 ns. When the transmission control unit 411 and the like operate at 156.25 MHz, 32 ns correspond to five clock cycles and 6.4 ns correspond to one clock cycle.

The split transmission control residual of the split transmission control information is set based on holdAdvance and releaseAdvance described above.

More specifically, when an entry for which (the operation of) Set-And-Hold-MAC is set in the gate control list, an entry to which the time interval (period) corresponding to the time before the value of holdAdvance from Set-And-Hold-MAC is assigned is specified. When the entry thus specified is an entry before the entry for which Set-And-Hold-MAC is set, the value of holdAdvance (number of clock cycles) is set as the split transmission control residual of the split transmission control information included in the entry of the transmission control information corresponding to the entry. In the example shown in FIG. 31, Set-And-Hold-MAC is set to the entry In the example shown in FIG. 31, five clock cycles are set as the split transmission control residual of the split transmission control information included in the entry of the transmission control information corresponding to the entry before the entry for which Set-And-Hold-MAC is set.

When the value of holdAdvance is larger than the value of the time interval assigned to the entry before the entry for which Set-And-Hold-MAC is set, a result of subtracting a sum of time intervals assigned to an entry existing between the entry for which Set-And-Hold-MAC is set and the entry specified as described above, from the value of holdAdvance may be set as the split transmission control residual.

In contrast, when an entry for which (the operation of) Set-And-Release-MAC is set exists in the gate control list, an entry to which the time interval (period) corresponding to the time before the value of releaseAdvance is assigned from the Set-And-Release-MAC is specified. When the entry thus specified is an entry before the entry for which Set-And-Release-MAC is set, the value of releaseAdvance (number of clock cycles) is set as the split transmission control residual of the split transmission control information included in the entry of the transmission control information corresponding to the entry. In the example shown in FIG. 31, one clock cycle is set as the split transmission control residual of the split transmission control information included in the entry for the transmission control information corresponding to the entry before the entry for which Set-And-Release-MAC is set.

When the value of releaseAdvance is larger than the value of the time interval assigned to the entry before the entry for which Set-And-Release-MAC is set, a result of subtracting a sum of time intervals assigned to an entry existing between the entry for which Set-And-Release-MAC is set and the entry specified as described above, from the value of releaseAdvance may be set as the split transmission control residual.

When the processing of HOLD or RELEASE is required before the leading part of the gate control list, the entry may be specified at the tail of the gate control list and the split transmission control residual may be set to issue HOLD or RELEASE in the previous cycle. In addition, HOLD/RELEASE may be issued before the base time for the first execution. The above operation may be executed in accordance with the advance of the local clock or in accordance with the global clock of the time management unit 404.

The split transmission control residual other than those set as described above (i.e., split transmission control residuals of the other entries) are set to 0, which indicates that the split transmission control (i.e., issuing HOLD and RELEASE) is not executed.

The transmission control information generated by the transmission control information generation unit 204 is stored in the transmission control information storage unit 409 as described above. In this case, the transmission control information management unit 410 can read the current entry that corresponds to the time (i.e., local clock) managed in the time management unit 404 from among a plurality of entries of the transmission control information stored in the transmission control information storage unit 409 as shown in FIG. 32. Since this embodiment is similar to the first embodiment except that the current entry read by the transmission control information management unit 410 (i.e., each entry of the transmission control information) includes the split transmission control information (initial status and split transmission control residual), detailed description on FIG. 32 is omitted here.

As shown in FIG. 32, when the current entry is stored in the storage unit 410a in the transmission control information management unit 410, (a plurality of determination units 412a included in) the transmission possibility determination unit 412 obtain the transmittable information (number of frame transmittable bits) included in the current entry, obtain the frame stored in the leading part of each of the plurality of queues prepared in the transmitted frame storage unit 403, and execute the guard band determination.

Furthermore, the split transmission control information included in the current entry stored in the storage unit 410a in the transmission control information management unit 410 is delivered to the dividable frame transmission suppression unit 417 as shown in FIG. 33. The dividable frame transmission suppression unit 417 includes a split transmission suppression determination unit 417a, and executes processing of suppressing transmission of the preemptable frame (dividable frame), based on the split transmission control information delivered from the transmission control information management unit 410. In FIG. 33, the fixed cache unit 410b and the variable cache unit 410c provided in the transmission control information management unit 410 are omitted for convenience.

An example of a procedure of the dividable frame transmission suppression unit 417 will be described below with reference to a flowchart of FIG. 34. The processing shown in FIG. 34 is executed in every clock cycle based on the local clock (operation clock of the transmission control unit 411, and the like) in the network interface controller 4.

The split transmission suppression determination unit 417a included in the dividable frame transmission suppression unit 417 reads the split transmission control information included in the current entry stored in the storage unit 410a in the transmission control information management unit 410 from the storage unit 410a (step S91).

Next, the split transmission suppression determination unit 417a determines whether or not the divisional transmission control residual included in the split transmission control information read in step S91 (i.e., the split transmission control residual of the current entry) is 0 (step S92).

Figure 34:
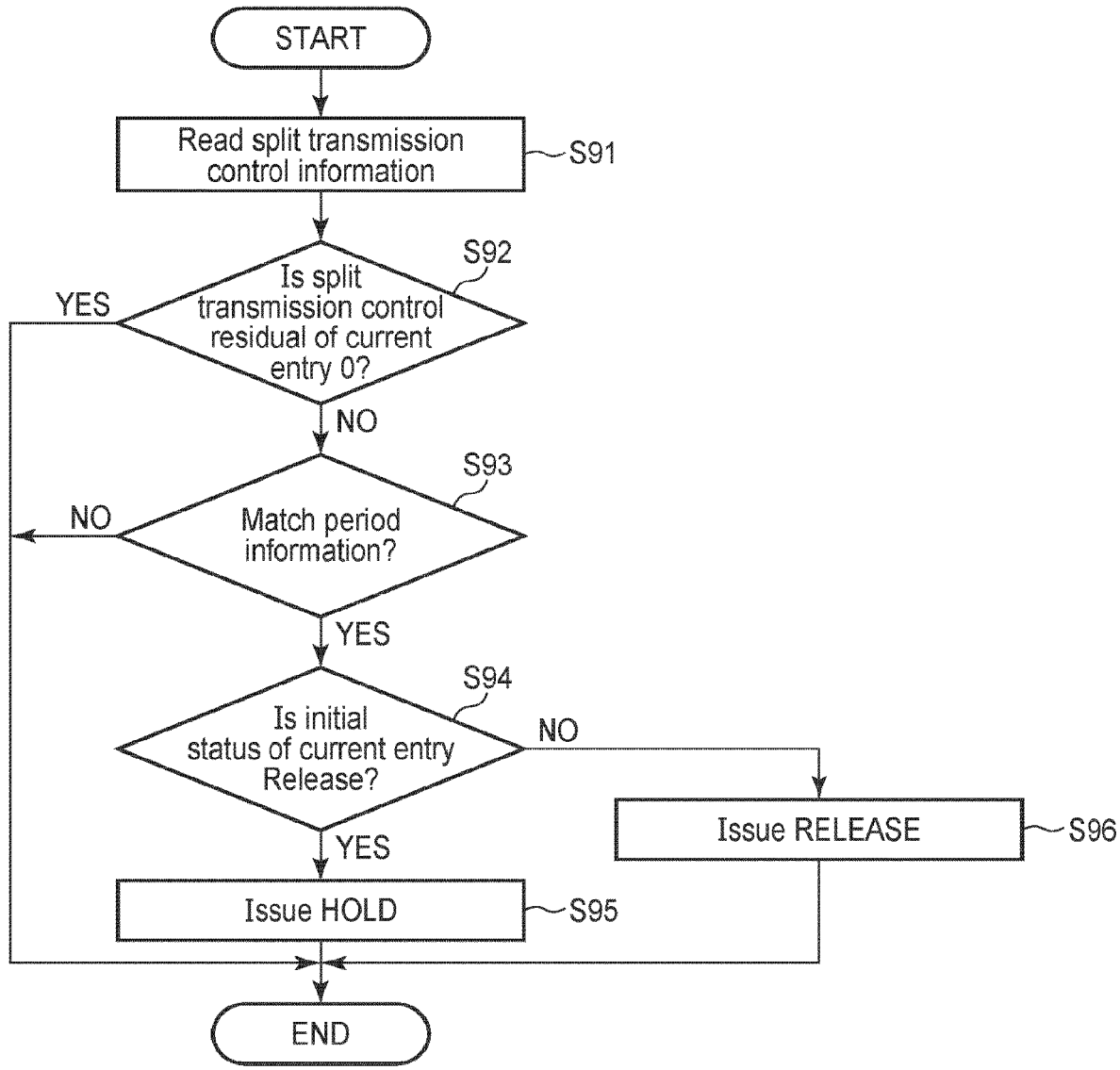
FIG. 34 is a flowchart showing an example of a procedure of a dividable frame transmission suppression unit.

If it is determined that the split transmission control residual of the current entry is 0 (YES in step S92), the processing shown in FIG. 34 is ended. In other words, the fact that the split transmission control residual of the current entry is 0 means that the processing (i.e., split transmission control) is not executed in the dividable frame transmission suppression unit 417 in the current entry.

In contrast, if it is determined that the split transmission control residual of the current entry is not 0 (NO in step S92), the split transmission suppression determination unit 417a determines whether or not the split transmission control residual (number of time clocks) matches the period information (number of time clocks) included in the current entry stored in the storage unit 410a in the transmission control information management unit 410 (step S93).

Since the transmission control information management unit 410 updates the period information to subtract the period information in accordance with the clock cycle as described in the above first embodiment, the fact that the split transmission control residual of the current entry matches the period information means the timing of issuing HOLD or RELEASE in consideration of the above-described time lag.

If it is determined that the split transmission control residual of the current entry matches the period information (step S93), the split transmission suppression determination unit 417a determines whether or not the initial status included in the split transmission control information read in step S91 (i.e., the initial status of the current entry) is Release (step S94).

If it is determined that the initial status of the current entry is Release (YES in step S94), the dividable frame transmission suppression unit 417 issues HOLD to the communication unit 401 (step S95). By executing the process of step S95, the transmission of the preemptable frame can be stopped (suppressed) at timing of starting the period assigned to (the entry of the transmission control information corresponding to) the entry of the gate control list for which Set-And-Hold-MAC is set after the value of holdAdvance has passed.

In contrast, if it is determined that the initial status of the current entry is not Release (i.e., Hold) (NO in step S94), the dividable frame transmission suppression unit 417 issues RELEASE to the communication unit 401 (step S96). By executing the process of step S96, the transmission of the preemptable frame can be resumed at timing of starting the period assigned to (the entry of the transmission control information corresponding to) the entry of the gate control list for which Set-And-Release-MAC is set after the value of releaseAdvance has passed.

If it is determined that the split transmission control residual of the current entry does not match the period information (NO in step S93), the processing shown in FIG. 34 is ended since this timing is not the timing of issuing HOLD or RELEASE.

According to the processing shown in FIG. 34 described above, HOLD and RELEASE can be issued at the appropriate timing in consideration of the values of holdAdvance and releaseAdvance. It is assumed that the processing shown in FIG. 34 is executed for each port of the communication unit 401.

By the way, it has been described that HOLD or RELEASE is issued, in the embodiment, when the split transmission control residual (number of clock cycles) of the split transmission control information included in the transmission control information is a fixed value and when the split transmission control residual matches the period information that is subtracted in accordance with the clock cycles, but the embodiment may has a configuration that the split transmission control residual is subtracted in accordance with the clock cycle (hereinafter referred to as a modified example of the embodiment).

FIG. 35 shows an example of the transmission control information generated from the gate control list shown in FIG. 30 in the modified example of the embodiment. Points different from the transmission control information shown in FIG. 31 described above will be mainly described here.

For example, a fixed value based on the value of holdAdvance or releaseAdvance is set as the split transmission control residual of the split transmission control information included in the transmission control information shown in FIG. 31 while a variable value based on the value of holdAdvance or releaseAdvance is set as the split transmission control residual in the modified example of the embodiment.

More specifically, when an entry for which Set-And-Hold-MAC is set exists in the gate control list, an entry to which the time interval (period) corresponding to the time before the value of holdAdvance is assigned from Set-And-Hold-MAC is specified. When the entry thus specified is the entry before the entry for which Set-And-Hold-MAC is set, a result of subtracting the value of holdAdvance from (the number of clock cycles indicating the value of) the time interval assigned to the entry is set as the split transmission control residual of the split transmission control information included in the entry of the transmission control information corresponding to the entry. In the example shown in FIG. 35, 19,995 clock cycles obtained by subtracting five clock cycles from 20,000 clock cycles of the time interval is set as the split transmission control residual of the split transmission control information included in the entry of the transmission control information corresponding to the entry before the entry for which Set-And-Hold-MAC is set.

When the value of holdAdvance is larger than the value of the time interval assigned to the entry before the entry for which Set-And-Hold-MAC is set, a sum of the time intervals assigned to an entry existing between the entry including the entry for which Set-And-Hold-MAC is set and the entry specified as described above may be subtracted from the value of holdAdvance, and a value obtained by subtracting the value of the subtraction from (the number of clock cycles indicating the value of) the interval assigned to the specified entry may be set as the split transmission control residual.

In contrast, when the entry for which Set-And-Release-MAC is set exists in the gate control list, an entry to which the time interval (period) corresponding to the time before the value of releaseAdvance is assigned from the Set-And-Release-MAC is specified. When the entry thus specified is the entry before the entry for which Set-And-Release-MAC is set, a result of subtracting the value of releaseAdvance from (the number of clock cycles indicating the value of) the time interval assigned to the entry is set as the split transmission control residual of the split transmission control information included in the entry of the transmission control information corresponding to the entry. In the example shown in FIG. 35, 79,999 clock cycles obtained by subtracting one clock cycle from 80,000 clock cycles of the time interval is set as the split transmission control residual of the split transmission control information included in the entry of the transmission control information corresponding to the entry before the entry for which Set-And-Release-MAC is set.

When the value of releaseAdvance is larger than the value of the time interval assigned to the entry before the entry for which Set-And-Release-MAC is set, a sum of the time intervals assigned to an entry existing between the entry including the entry for which Set-And-Release-MAC is set and the entry specified as described above may be subtracted from the value of releaseAdvance, and a value obtained by subtracting the value of the subtraction from (the number of clock cycles indicating the value of) the interval assigned to the specified entry may be set as the split transmission control residual.

For example, a maximum value (4,294,967,295 clock cycles) of the time interval is set as the split transmission control residual other than those set as described above (i.e., split transmission control residuals of the other entries), such that the split transmission control (i.e., issuing HOLD and RELEASE) is not executed.

Figure 36:
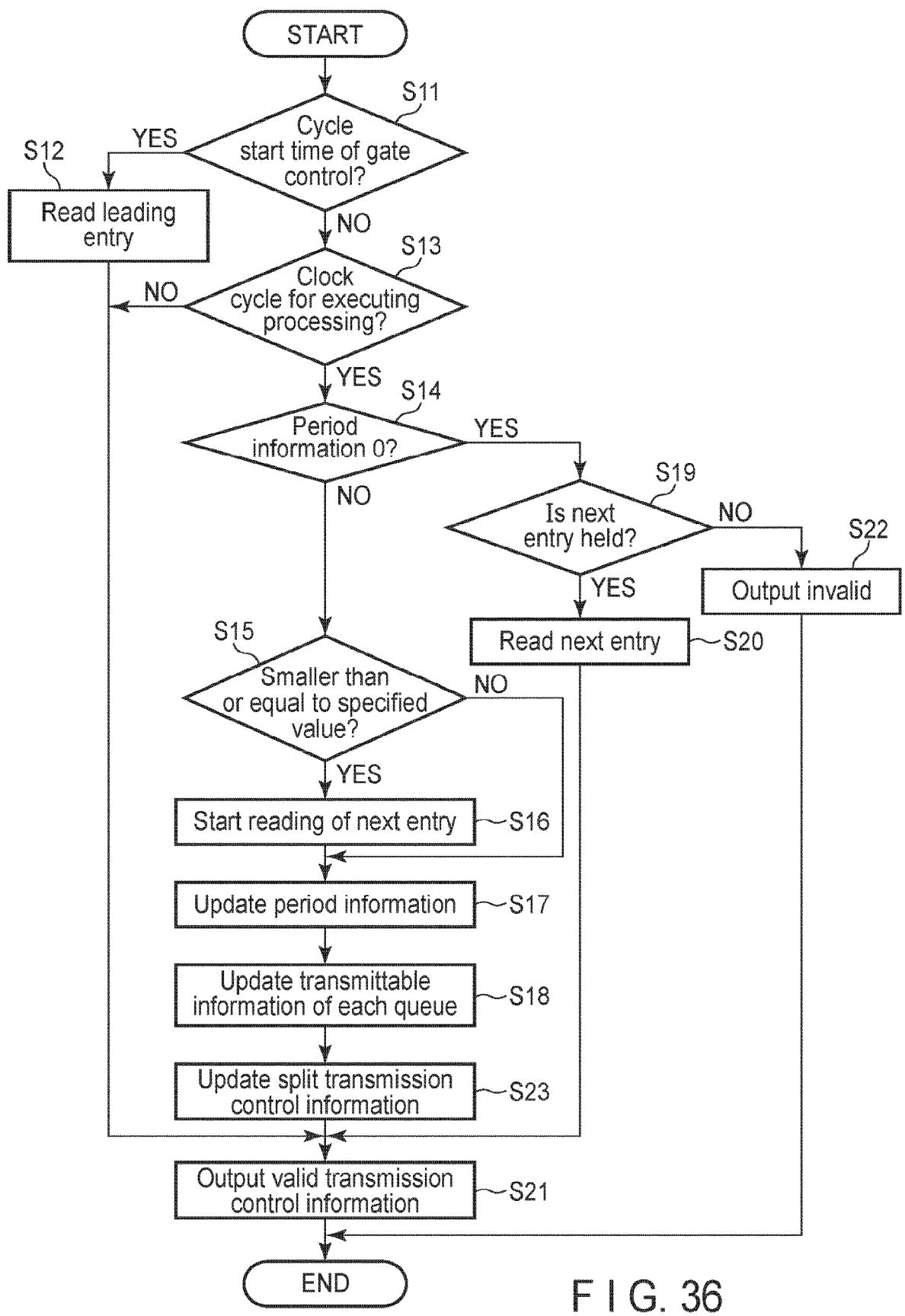
FIG. 36 is a flowchart showing an example of a procedure of the transmission control information management unit.

In the modified example of the embodiment, since the split transmission control residuals set as described above needs to be reduced according to the clock cycles, the transmission control information management unit 410 executes the processing shown in FIG. 36. In FIG. 36, as compared with FIG. 21 described above, the process of step S23 is added after the process of step S18. In step S23, the transmission control information management unit 410 updates the split transmission control information included in the current entry stored in the storage unit 410a. More specifically, in step S23, the process of subtracting the number of processing unit clock cycles from the split transmission control residual included in the split transmission control information is executed.

Furthermore, in the modified example of the embodiment, the processing of the dividable frame transmission suppression unit 417 is also different from the processing shown in FIG. 34 described above.

An example of a procedure of the dividable frame transmission suppression unit 417 in the modified example of the embodiment will be described below with reference to a flowchart of FIG. 37.

First, a process of step S101 corresponding to the process of step S91 shown in FIG. 34 described above is executed.

Next, the split transmission suppression determination unit 417a included in the dividable frame transmission suppression unit 417 determines whether or not the divisional transmission control residual included in the split transmission control information read in step S101 (i.e., the split transmission control residual of the current entry) is 0 (step S102).

If it is determined that the split transmission control residual of the current entry is not 0 (NO in step S102), the processing shown in FIG. 37 is ended. In other words, the fact that the split transmission control residual of the current entry is not 0 means that the processing (i.e., split transmission control) is not executed in the dividable frame transmission suppression unit 417 in the current entry.

In contrast, in the modified example of the embodiment, the fact that the split transmission control residual of the current entry is 0 means the timing of issuing HOLD or RELEASE in consideration of the above-described time lag.

For this reason, if it is determined that the split transmission control residual of the current entry is 0 (YES in step S102), processes of steps S103 to S105 corresponding to the processes of steps S94 to S96 shown in FIG. 34 described above are executed.

In the modified example of the embodiment, the transmission control information management unit 410 executes the processing shown in FIG. 36, and the dividable frame transmission suppression unit 417 executes the processing shown in FIG. 37, and HOLD and RELEASE can be thereby issued at appropriate timing based on the split transmission control residuals that vary according to the clock cycles.

According to the embodiment and the modified example of the embodiment as described above, transmission of the express frame from the first communication processing unit 413a, which is not affected by the influence from the transmission of the preemptable frame, (i.e., communication of the first communication processing unit 413a) can be implemented by suppressing the transmission of the preemptable frame from the second communication processing unit 413b in the time interval (period) assigned to a predetermined entry while efficiently transmitting a best-effort traffic by the second communication processing unit 413b.

In the embodiment and the modified example of the embodiment, it has been described that (the timing indicated by) the split transmission control information is indicated by the time (number of clock cycles) elapsed until the transmission of the preemptable frame (dividable frame) is stopped or resumed, but the split transmission control information may be expressed by, for example, the data amount of the frame (number of frame transmittable bits) that can be transmitted before the transmission of the preemptable frame is stopped or resumed, and the like.

The embodiment and the modified example of the embodiment may be configured to further include a buffer unit 418 and a data transfer status management unit 419 provided between the transmission control unit 411 and the communication processing unit 413 as shown in, for example, FIG. 38. According to such a configuration, the frame transmission control can be implemented in consideration of the transfer status of the frames (express frames and preemptable frames) from the transmission control unit 411 to the communication processing unit 413 through the buffer unit 418.

Third Embodiment

Next, a third embodiment will be described. In the embodiment, descriptions of the portions like or similar to the above-described first and second embodiments are omitted and the portions different from those of the first and second embodiments will be mainly described. In addition, the hardware configuration of the communication device according to this embodiment is the same as that of the above-described first embodiment and will be described as appropriate with reference to FIG. 1.

Figure 39:
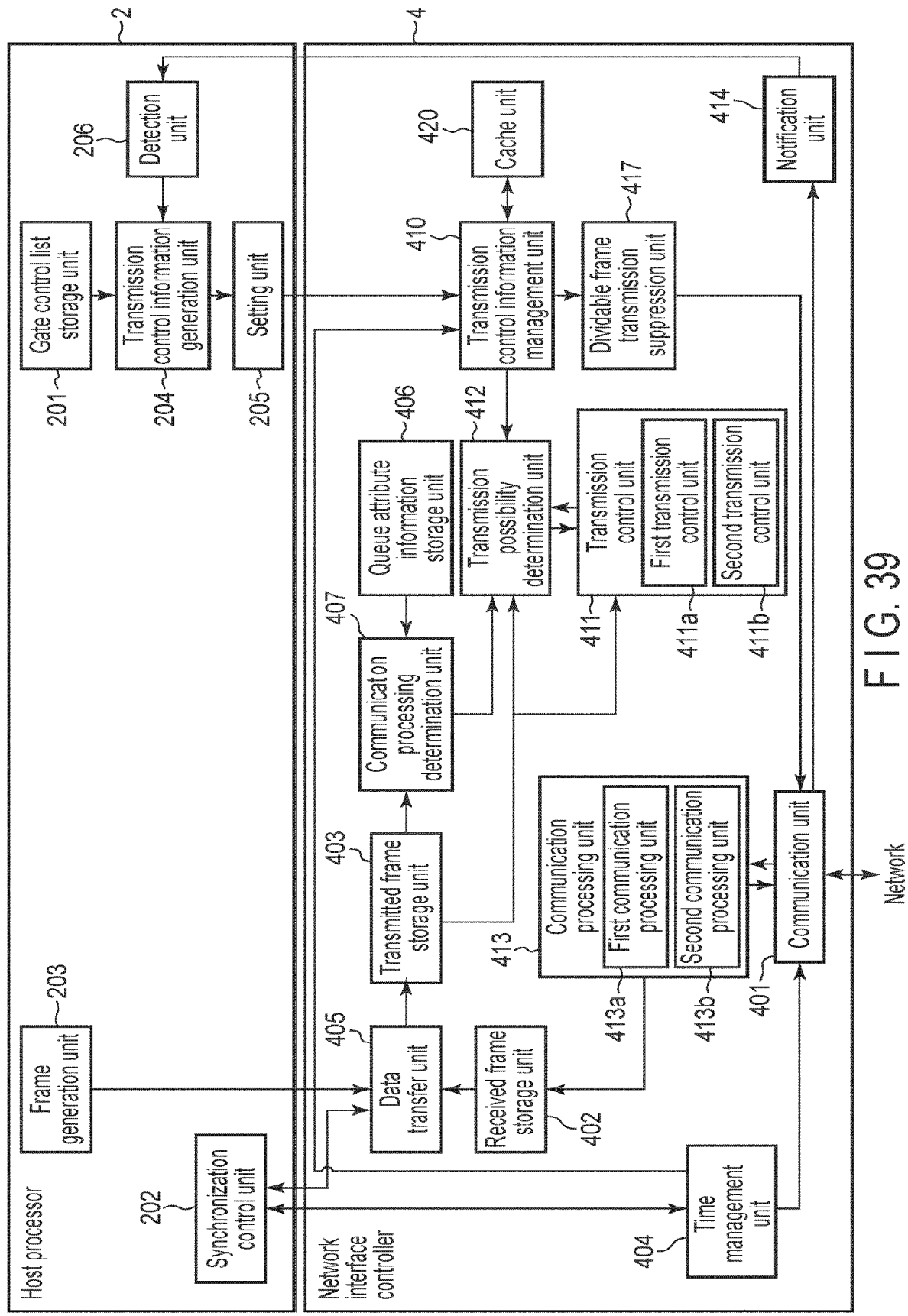
FIG. 39 is a block diagram showing an example of a functional configuration of a communication device according to a third embodiment.

FIG. 39 is a block diagram showing an example of a functional configuration of a communication device 100 according to the embodiment. In FIG. 39, portions like or similar to those shown in FIG. 2 and FIG. 29 described above are denoted by the same reference numbers and symbols and detailed explanations are omitted.

As shown in FIG. 39, a host processor 2 of the embodiment is different from the host processor 2 shown in FIG. 2 and FIG. 29 described above in not including a setting unit 205 but including a transmission control information storage unit 207. In addition, a network interface controller 4 of the embodiment is different from the network interface controller 4 shown in FIG. 2 and FIG. 29 described above in not including a reception unit 408 or a transmission control information storage unit 409 but including a cache unit 420 (a temporary storage unit).

In the embodiment, the transmission control information storage unit 207 stores the transmission control information generated by a transmission control information generation unit 204.

A transmission control information management unit 410 obtains transmission control information from the transmission control information storage unit 207 not via the setting unit 205 or the reception unit 408 described in the above first embodiment, but directly. For example, the transmission control information management unit 410 obtains the transmission control information from the transmission control information storage unit 207 by DMA.

A cache unit 420 is a storage medium (temporary storage unit) that temporarily stores at least a part of the transmission control information. For example, the cache unit 420 can be constituted by a storage medium that can be accessed faster than the transmission control information storage unit 207. The cache unit 420 may not be provided.

For example, the transmission control information management unit 410 periodically reads the transmission control information from the transmission control information storage unit 207 in advance and stores the transmission control information in the cache unit 420. Thus, the constitution can correspond to a case where the memory of the network interface controller 4 is small and cannot store all (entries included in) the transmission control information.

To prevent the transmission control information required for transmission control from being starved, the cache unit 420 may be configured to have a plurality of storage areas (cache areas). FIG. 40 is a diagram showing a configuration example of cache areas in the cache unit 420. The transmission control information storage unit 207 may be constituted by, for example, a large-capacity memory such as DRAM, as well as SRAM. In contrast, the cache unit 420 is constituted by a memory such as SRAM, which has a smaller capacity than the transmission control information storage unit 207 but can be read at a high speed with a fixed delay.

As shown in FIG. 40, the cache unit 420 includes a fixed (static) cache area (fixed storage unit) and a variable (dynamic) cache area (variable storage unit).

In the fixed cache area, predetermined transmission control information among the transmission control information stored in the transmission control information storage 207 is stored. The predefined transmission control information is, for example, a fixed number of elements of transmission control information from the leading part. In the variable cache area, a fixed number of elements of transmission control information other than the transmission control information stored in the fixed cache area, which varies in accordance with the transmission control is stored.

In the example shown in FIG. 40, the cache unit 420 stores m entries in the fixed cache area and n entries in the variable cache area. A leading area (entries 0 to m−1) of the transmission control information storage unit 207 is written to the fixed cache area, and several areas (entries k to k+n−1)

of the other areas are written to the variable cache area. k is the offset from the leading part of the transmission control information. An area where reading of the transmission control information management unit 410 has been completed, of the variable cache area, is overwritten and reused.

The number of entries m of the fixed cache area and the number of entries n of the variable cache area may be specified at any value, and may be determined by, for example, the capacity of the SRAM to be used or the like. The ratio of the fixed cache area to the variable cache area can be varied by m and n. For example, the ratio may be set to 1:1 as m=n or set to 1:2 as 2m=n.

Figure 41:
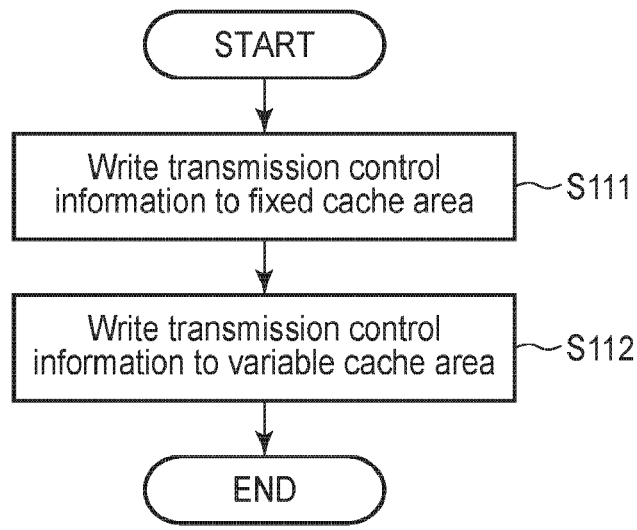
FIG. 41 is a flowchart showing an example of a procedure of an initialization process in a cache unit.

FIG. 41 shows an example of a procedure of initialization processing of the cache unit 420. The initialization processing is executed, for example, by user settings or via a network when the gate control list is updated.

The transmission control information management unit 410 writes the transmission control information to the fixed cache area from the leading part (step S111). When finishing writing all information to the fixed cache area, the transmission control information management unit 410 starts writing subsequent information to the variable cache area (step S112). More specifically, if m entries are cached in the fixed cache area, m+1-th entry and subsequent entries are written to the variable cache area.

If the number of entries that can be cached in the variable cache area is n, the initialization processing is completed when writing the n entries to the variable cache area is finished. The transmission control information management unit 410 manages the position where the writing has been completed.

After that, the transmission control information management unit 410 reads the transmission control information stored in the fixed cache area or variable cache area and uses the transmission control information for the transmission control. When reading the transmission control information stored in the variable cache area is completed, the transmission control information management unit 410 updates the transmission control information stored in the variable cache area.

The transmission control information management unit 410 updates, for example, the information from the entry following the last write position in the variable cache area to the entry before the read position from which the transmission control information management unit 410 reads the entry.

Figure 42:
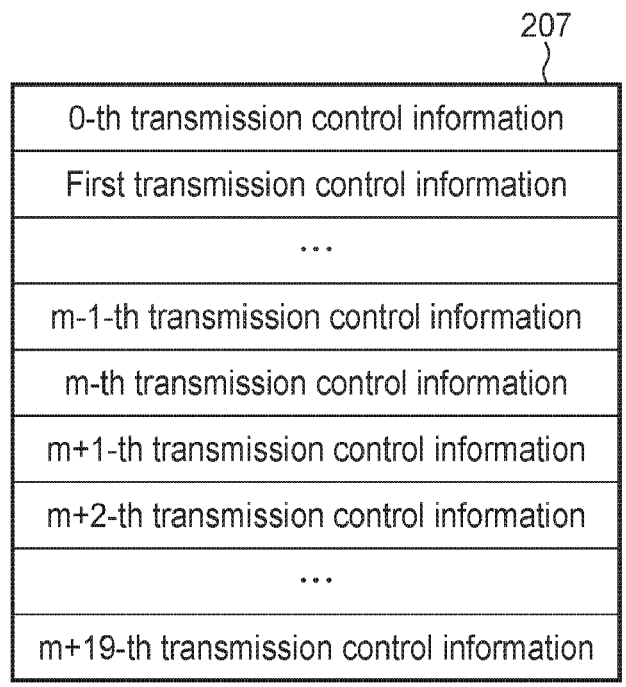
FIG. 42 is a table specifically illustrating a transmission control information updating process.

A specific example of the processing of updating the transmission control information will be described with reference to FIG. 42 to FIG. 49. For simplicity of description, the number of entries n in the variable cache area is set to 10. In addition, as shown in FIG. 42, the number of (a plurality of entries of) the transmission control information stored in the transmission control information storage unit 207 is set to m+20 (from the 0-th to the m+19-th). The entries of the transmission control information are stored in the fixed cache area and the variable cache area, but the transmission control information is stored in the fixed cache area and the variable cache area, for convenience, in the following descriptions.

Figure 43:
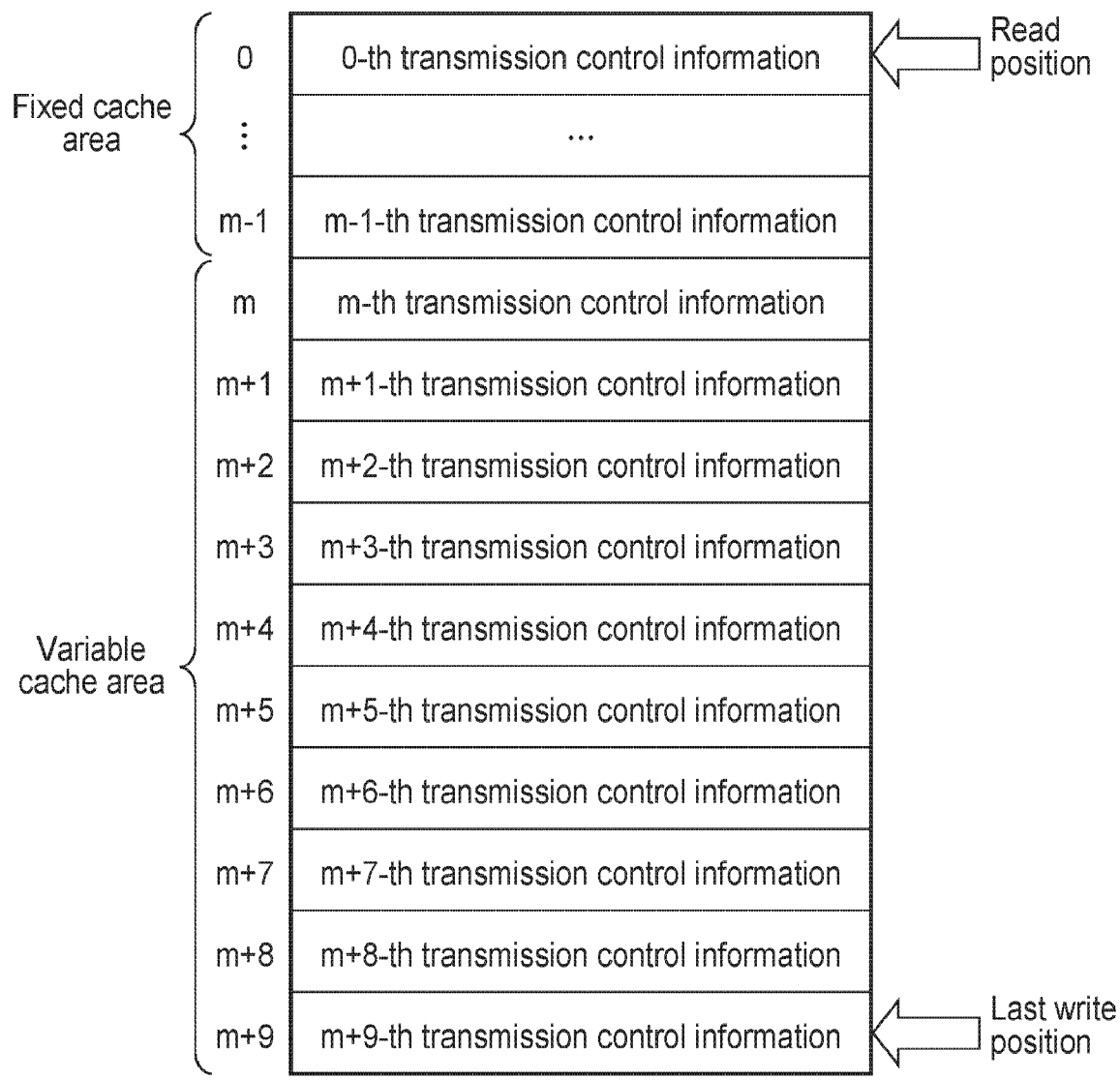
FIG. 43 is a table specifically illustrating the transmission control information updating process.

FIG. 43 is a diagram showing the status of the cache unit 420 after the initialization processing shown in FIG. 41. In this status, 0 to m−1-th elements of the transmission control information of the transmission control information storage unit 207 are stored in entries 0 to m−1 of the fixed cache area, and m to m+9-th elements of the transmission control information storage unit 207 are stored in entries m to m+9 of the variable cache area. At this time, the last write position is m+9. Since the variable cache area operates as a circular buffer, a position following m+9 is m. When the transmission control is validated, the transmission control information management unit 410 reads the transmission control information of entry 0 corresponding to the current read position 0 and executes read transmission control.

Figure 44:
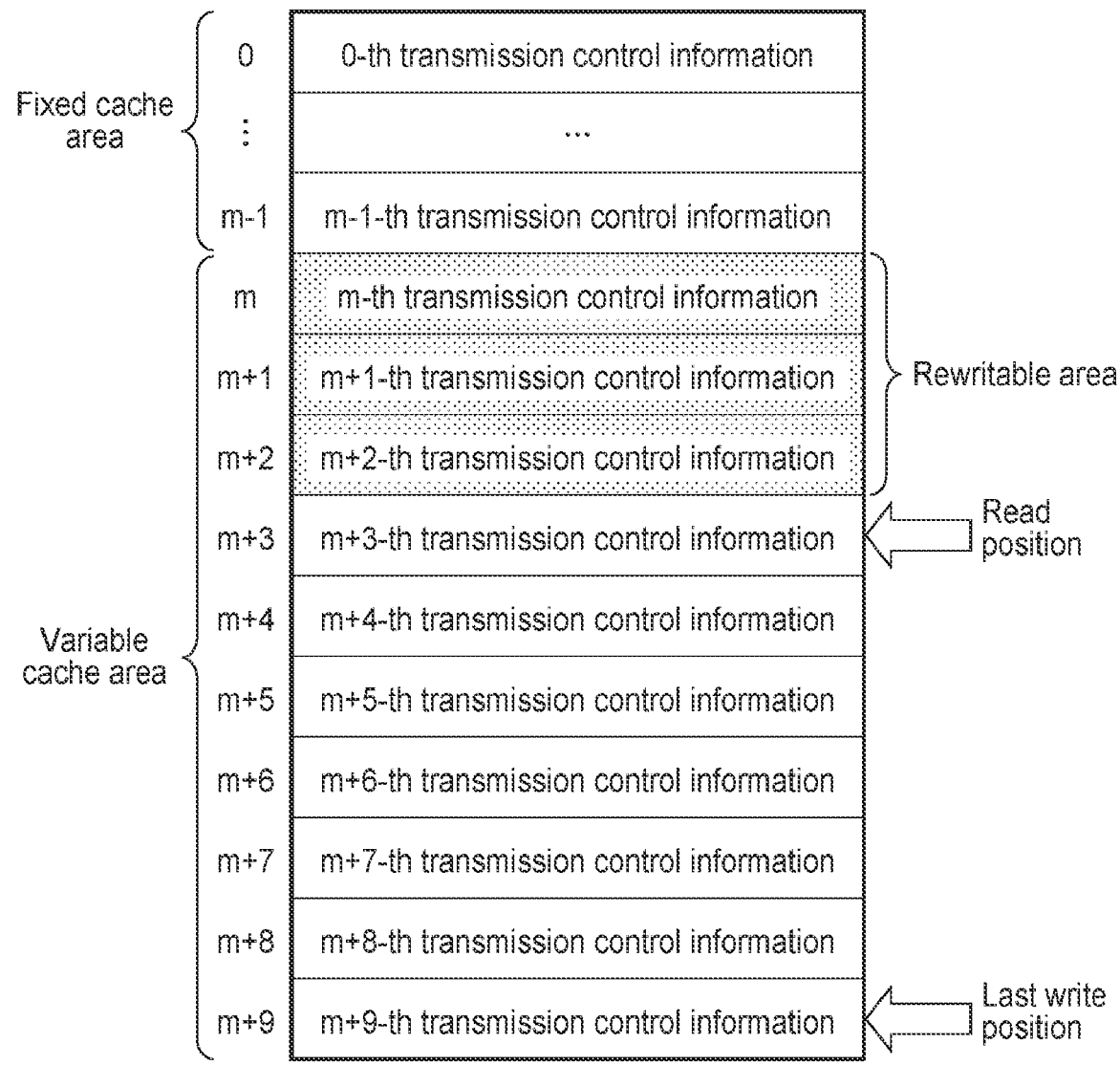
FIG. 44 is a table specifically illustrating the transmission control information updating process.

FIG. 44 is a diagram showing a status in which time has elapsed and the read position of the transmission control information management unit 410 is m+3. In this status, the transmission control information of entries m to m+2, which corresponds to information from the entry following the last write position to the entry before the read position, will not be retrieved immediately in future. This is because the transmission control information is read and used in order from the leading part as time elapses. Therefore, the transmission control information management unit 410 updates these entries.

Figure 45:
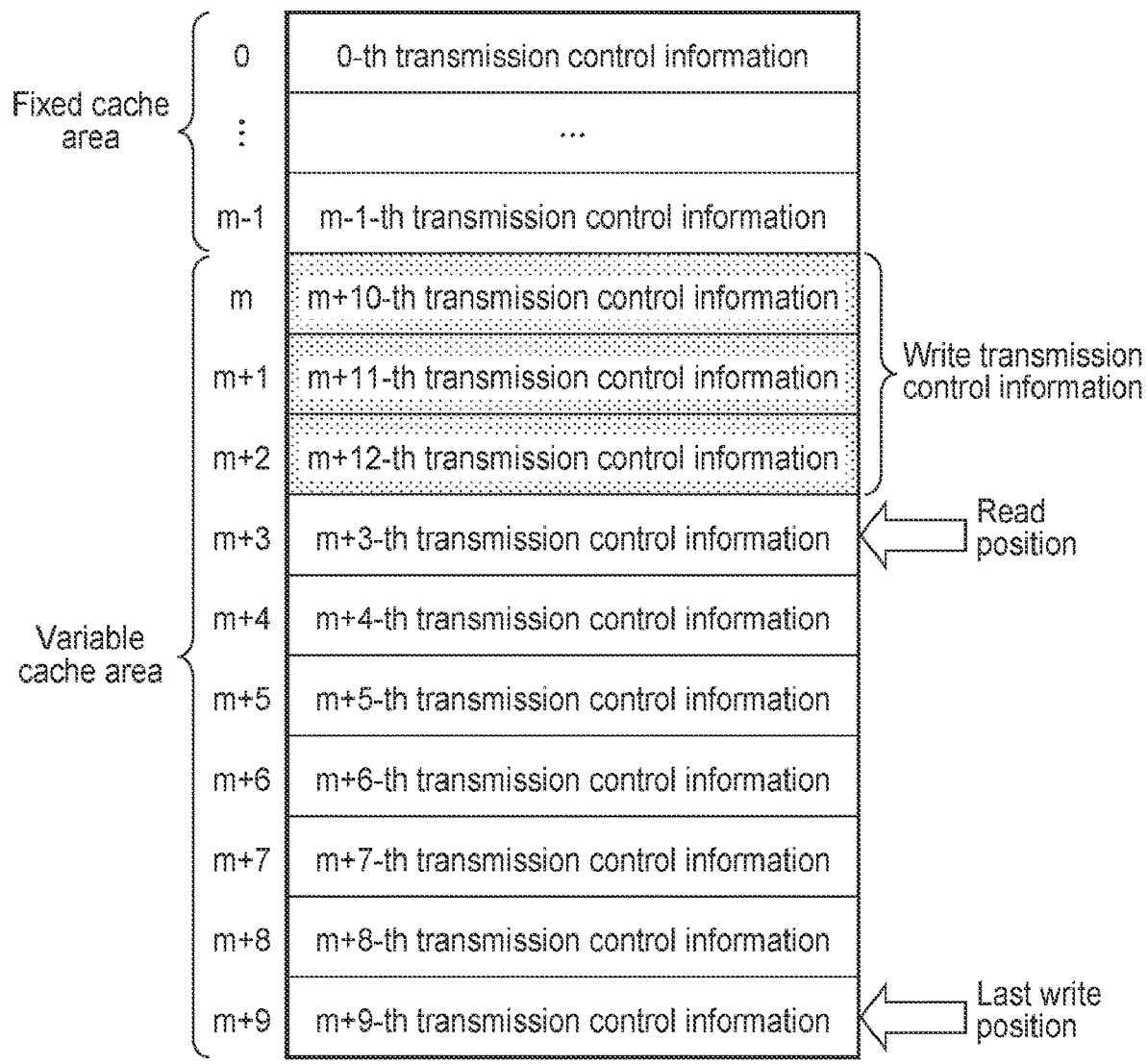
FIG. 45 is a table specifically illustrating the transmission control information updating process.

FIG. 45 is a diagram showing a status of these entries that have been updated. The transmission control information management unit 410 reads the number of elements of transmission control information corresponding to the rewritable area of the variable cache area, from the position of the last written transmission control information in the transmission control information storage unit 207, and writes the transmission control information to the variable cache area. In the example shown in FIG. 45, the transmission control information management unit 410 writes m+10-th to m+12-th transmission control information to entries m to m+2.

FIG. 46 is a diagram showing a status of entries m+3 to m+8 that have been updated similarly after the time has elapsed. In other words, when the time elapses and the read position reaches m+9, entries m+3 to m+8 are updated. As described above, since the variable cache area is a circulating buffer (ring buffer), an entry following m+9 is m.

When the read position is circulated to m, the transmission control information management unit 410 updates entry m+9 corresponding to a position following the last write position. FIG. 47 shows a status of entry m+9 that has been updated.

Thus, the transmission control information to be next retrieved can be stored while updated, in the variable cache area.

The transmission control (gate control) is operated by the clock (local clock) that controls the operation of the transmission control information management unit 410 and the clock (global clock) of the time management unit 404. In the embodiment, even when the operation of returning the gate control list to the leading entry is executed by a signal (CycleStart signal) generated based on the time of the time management unit 404 referred to as CycleStart, the transmission control information is not starved (underrun) and the transmission control can be executed by storing a certain number of elements of the transmission control information from the leading part in the fixed cache area.

FIG. 48 is a diagram showing the read position returning from the status shown in FIG. 47 to the leading position by the CycleStart signal. As shown in FIG. 48, the read position returns to 0, which is the leading position of the fixed cache area, and the last write position moves to m−1. After this, the transmission control information management unit 410 writes the transmission control information to the variable cache area in the same manner as the initialization processing.

Figure 49:
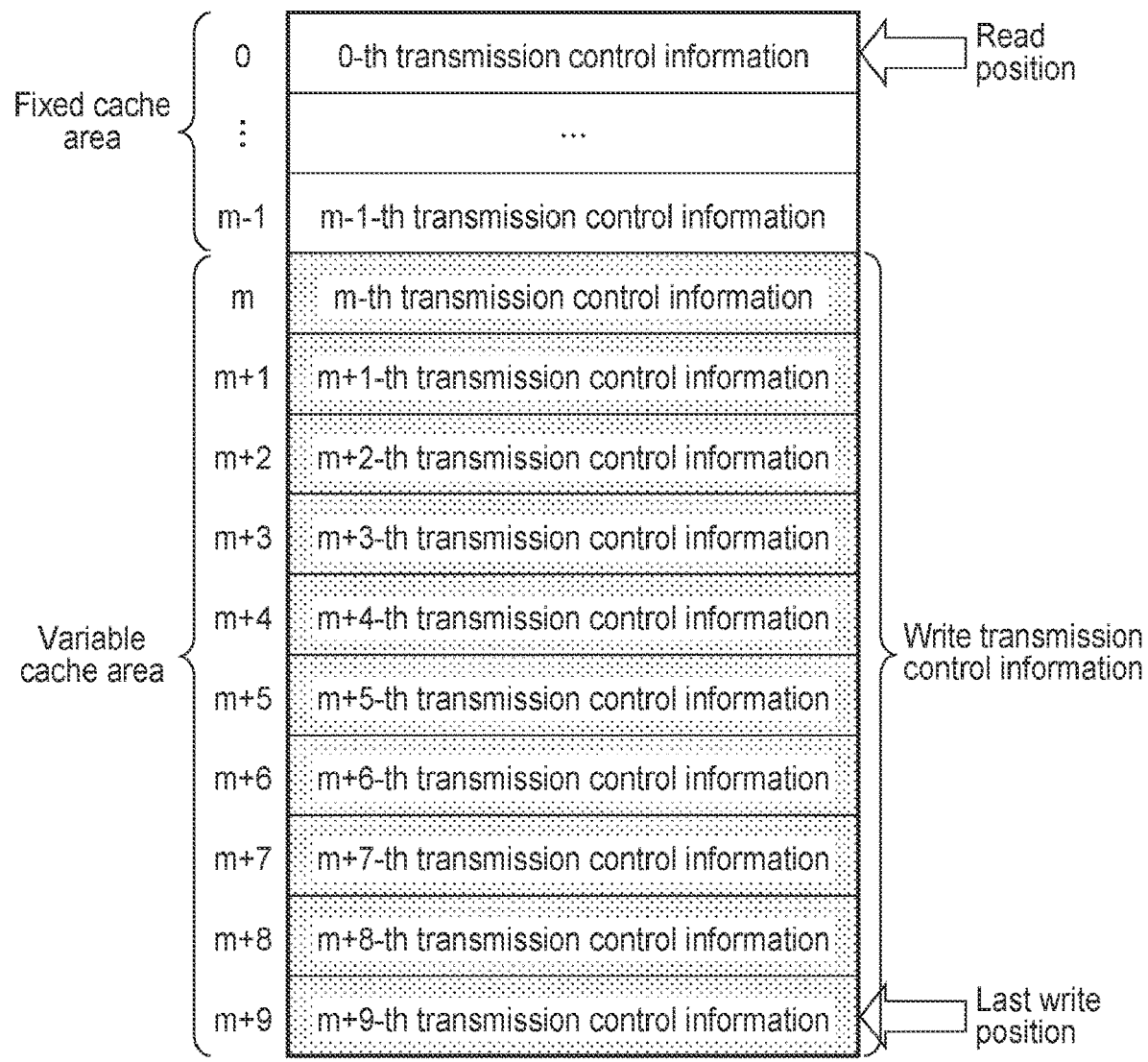
FIG. 49 is a table specifically illustrating the transmission control information updating process.

FIG. 49 is a diagram showing a status in which writing the transmission control information to the variable cache area has been executed. After this, even when the read position is moved to the variable cache area, the transmission control information can be kept in a status of being stored in the cache unit 420 by the processing.

FIG. 39 and FIG. 40 show the configuration of including one cache unit 420, but a plurality of cache units may be provided. FIG. 50 is a block diagram showing an example of a functional configuration of the communication device 100 (host processor 2 and network interface controller 4) configured to include two cache units 420-1 and 420-2.

In transmission control (gate control), when the gate control list is switched, it is specified at the same time when the gate control list becomes valid. When switching the gate control list to a new gate control list, the transmission control information management unit 410 desirably executes the transmission control using the old gate control list immediately before switching, and executes the transmission control using the new gate control list immediately after switching.

If the two cache units 420-1 and 420-2 are configured to store the transmission control information generated from the gate control list before and after the switching, respectively, and the cache units to be used are switched, the transmission control information can be switched more accurately at the specified time. The transmission control information management unit 410 stores the new transmission control information in the cache unit which is not currently used, of the cache units 420-1 and 420-2, in advance, before switching, and switches the cache unit to be read at the timing of switching (specified time). Thus, the transmission control using the old transmission control information can be executed immediately before switching and can be immediately switched to the transmission control using the new transmission control information.

In this embodiment, it has been described that the transmission control information storage unit 207 is implemented in the memory in the host processor 2, but the transmission control information storage unit 207 may be implemented in the memory (DRAM) in the network interface controller 4. In addition, it has been described that the transmission control information management unit 410 reads the transmission control information from the transmission control information storage unit 207 and urges the cache unit 420 to store the transmission control information, but a method of storing in the cache unit 420 is not limited to this. For example, the transmission control information management unit 410 or the other control unit may instruct a DMA controller to read the transmission control information from the transmission control information storage unit 207 and to store the transmission control information in the cache unit 420.

In this embodiment, it has been described that the cache unit 420 is provided outside the transmission control information management unit 410, but the registers (fixed and variable registers) in the transmission control information management unit 410 can also be used as the cache units.

In addition, since the frame transmission control in the embodiment is the same as that of the above first embodiment, its detailed description is omitted here.

In the embodiment, the same advantages as those in the first embodiment described above can be achieved in the configuration where the network interface controller 4 includes the cache units as described above.

The configuration in which the network interface controller 4 in the first embodiment includes the cache units has been mainly described, but the embodiment may be combined with the above-described second embodiment (i.e., the configuration in which the network interface controller 4 in the second embodiment includes the cache units).

Fourth Embodiment

Next, a fourth embodiment will be described. In the embodiment, descriptions of the portions like or similar to the above-described first and second embodiments are omitted and the portions different from those of the first and second embodiments will be mainly described. In addition, the hardware configuration of the communication device according to this embodiment is the same as that of the above-described first embodiment and will be described as appropriate with reference to FIG. 1.

Figure 51:
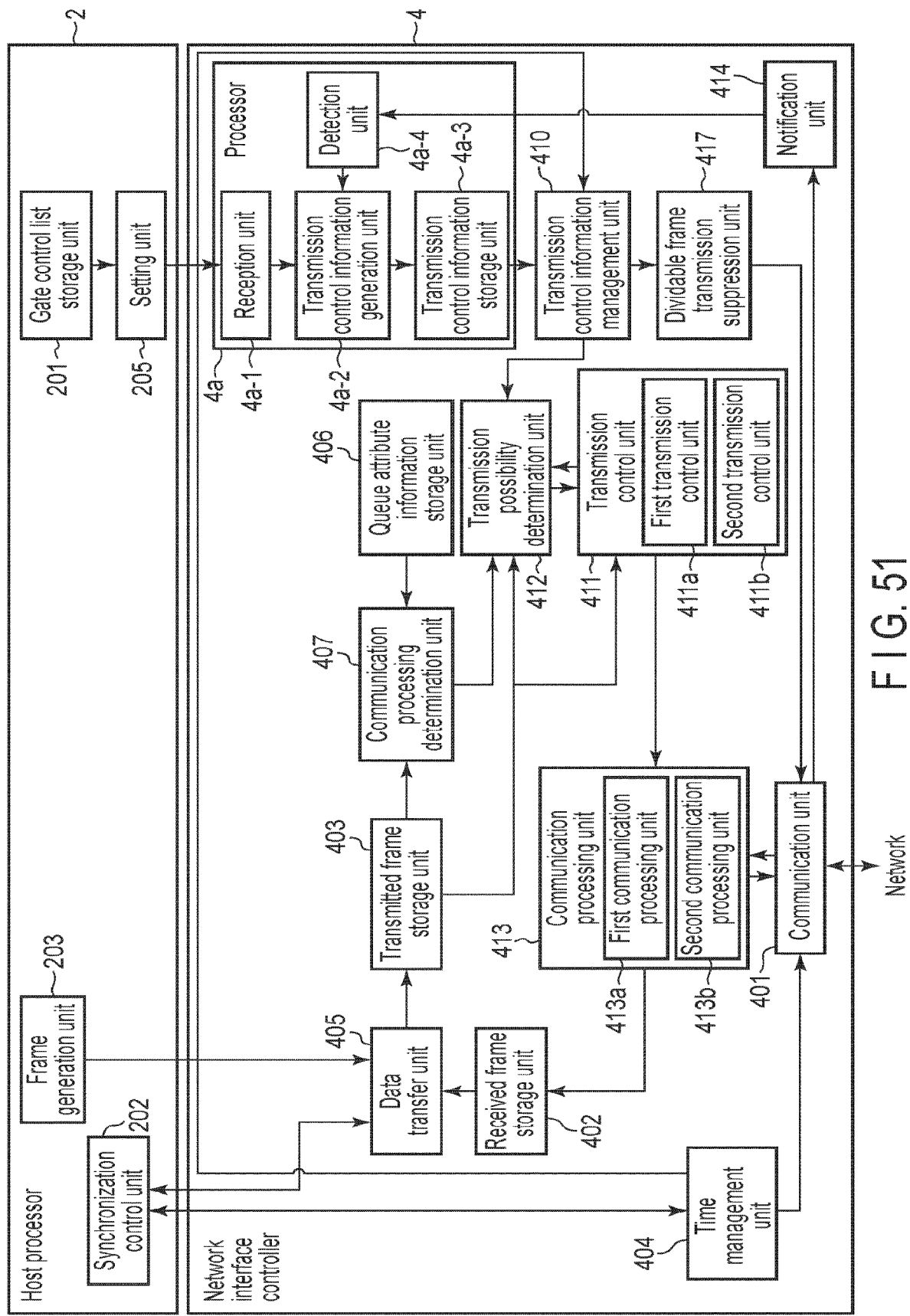
FIG. 51 is a diagram showing an example of a functional configuration of a communication device according to a fourth embodiment.

FIG. 51 is a block diagram showing an example of a functional configuration of a communication device 100 according to the embodiment. In FIG. 51, portions like or similar to those shown in FIG. 2 and FIG. 29 described above are denoted by the same reference numbers and symbols and detailed explanations are omitted.

As shown in FIG. 51, a host processor 2 of the embodiment is different from the host processor 2 shown in FIG. 2 and FIG. 29 described above in not including a transmission control information generation unit 204 or a detection unit 206. In addition, a network interface controller 4 of the embodiment is different from the network interface controller 4 shown in FIG. 2 and FIG. 29 described above in including a processor 4*a*.

In the embodiment, the setting unit 205 transmits the gate control list stored in the gate control list storage unit 201 to the network interface controller 4.

The processor 4*a* includes a reception unit 4*a*-1, a transmission control information generation unit 4*a*-2, a transmission control information storage unit 4*a*-3, and a detection unit 4*a*-4.

The reception unit 4*a*-1 receives an input of the gate control list transmitted by the setting unit 205 of the host processor 2. The reception unit 4*a*-1 may also receive the gate control list from a device other than the host processor 2, for example, via a network 200.

The transmission control information generation unit 4*a*-2 generates transmission control information from the gate control list received by the reception unit 4*a*-1.

The transmission control information storage unit 4*a*-3 stores the transmission control information generated by the transmission control information generation unit 4*a*-2.

The detection unit 4*a*-4 detects change in a link speed and operating speed information via an internal bus of the network interface controller 4. When detecting the change in the link speed or the operating speed information, the detection unit 4*a*-4 instructs the transmission control information generation unit 4*a*-2 to regenerate the transmission control information.

Since frame transmission control of the embodiment is the same as that of the above-described first embodiment, its detailed description is omitted here.

In the embodiment, the same advantages as those of the above-described first embodiment can be achieved by the configuration where the network interface controller 4 includes a processor as described above.

The configuration in which the network interface controller 4 in the first embodiment includes the processor has been mainly described, but the embodiment may be combined with the above-described second embodiment (i.e., the configuration in which the network interface controller 4 in the second embodiment includes the processor).

Fifth Embodiment

In each of the above embodiments, the configuration including one network interface controller and one port has been described, but each of the embodiments may be configured to include a plurality of network interface controllers and a plurality of ports corresponding to the respective network interface controllers. In this case, transmission control information is set (generated) for each port.

In addition, in each of the above embodiments, it has been described that the frame generation unit 203 is implemented by the host processor 2, but the frame generation unit 203 may be implemented by hardware such as FPGA or ASIC. In such a case, a DMA function of a data transfer unit 405 may be omitted such that data (frames) can be directly exchanged through a stream interface.

According to at least one embodiment described above, a communication control device, an information processing device, a communication control method, an information processing method, and a program capable of effectively utilizing a bandwidth are provided.

In addition, in at least one embodiment described above, operations according to the gate control list can be exactly executed and the provided bandwidth can be effectively utilized while simplifying the hardware configuration or software processing. Furthermore, real-time transmission control processing (completing the processing within a determined time) can be executed.

In the description of the operations of each of the above embodiments, the example of executing the processing in every operating clock cycle, i.e., executing the processing in every cycle has been mainly described, but this does not preclude executing the processing in every predetermined number of clock cycles. For example, the processing may be executed in every five clock cycles. In this case, in the process of subtracting a predetermined amount of the transmission control information (the transmittable amount indicated by the transmittable information), the subtraction may be executed in accordance with the number of clock cycles in which the processing is executed.

In addition, in the operations of each of the above embodiments, the example that the updating of step S18 and step S23 is executed in units of clock cycles has been described, but when the processing is executed by software, the time elapsed after the previous iteration (iterative processing) may be detected and the corresponding amount of time may be subtracted.

Furthermore, in each of the above embodiments, it has been described that the subtracted amount of the transmittable amount indicated by the link speed and the transmittable information used to generate the transmission control information is determined based on the data transfer rate (i.e., the amount of data transmitted per clock cycle) of MAC (communication unit 401), but the embodiment may be applied to a case where communication is executed inside a predetermined device. In this case, the data transfer rate between components executing communication in a predetermined device may be used as the criterion. In other words, when internal data transfer is executed, the data transfer rate between components that communicate in a predetermined device may be used as the criterion. Although not shown in the figure, 256 bits or 64 bits may be used as the standard for the data transfer rate when it is assumed that, for example, a bus width of the transmission control unit 411 is 256 bits and a bus width of the component is 64 bits. In either case, it is important that the process of generating the transmission control information and the process of subtracting the transmittable amount are consistent (i.e., based on a common data transfer rate).

In addition, in each of the above embodiments, the example in which the amount of data is calculated until the gate is closed next time in each traffic class when generating the transmission control information, has been described, but the amount of transmittable data before the point (calculation target end point) of calculating the time (hereinafter a maximum frame transmittable time) to transmit a sum of queueMaxSDU defined in each traffic class, the frame checksum sequence, and the media-dependent overhead from the current link speed, and adding the maximum frame transmittable time from the leading part of the next entry (end of the current entry), may be calculated. In this case, in each traffic class, if a gate close exists between the leading part of the current entry and the calculation target end point, the amount of transmittable data before the gate close is calculated as the transmittable amount. If the gate close does not exist, the amount of data that can be transmitted before the calculation target end point is set as the transmittable amount. The maximum frame transmittable time may be calculated using the value of MTU instead of queueMaxSDU. Alternatively, for example, the transmittable amount may be calculated by using the end of the current entry as the calculation target end point. Alternatively, the transmittable amount may be calculated by using the amount between the current entry and an end of an n-th preceding entry as the calculation target end point.

In each of the above embodiments, it has been described that the communication unit 401 is connected to an external network, but this may be an internal communication unit (i.e., an internal module) that makes internal connections. In this case, the communication unit 401 may not include a function such as MAC or PHY, but may simply make bus connection inside the configuration.

(Example of System Configuration)

FIG. 52 is a diagram showing a configuration example of a system using the communication device 100 according to each of the above-described embodiments. FIG. 52 shows an example of controlling robot arms 602*a* and 602*b* and a belt conveyor 601 at a site from an edge server 700 via a 5th Generation (5G)/local 5G (private 5G) system 500 in a factory or plant.

The 5G/local 5G system 500 includes a 5G core network 505, a central unit 504, a distributed unit 503, a remote unit 502, and user equipment 501. The 5G/local 5G system 500 executes 5G communication defined under 3rd Generation Partnership Project (3GPP) standards.

The communication device 100 in each embodiment can be mounted on, for example, an edge server 700 or a 5G core network 505. The real-time performance of the communication between the edge server 700 and the 5G core network 505 can be thereby improved.

In addition, the communication device 100 in each embodiment may be used for communication between the units in the 5G/local 5G system 500. In other words, to execute communication between the remote unit 502, the distributed unit 503, the central unit 504, and the 5G core network 505, the communication device 100 in each embodiment may be mounted on at least some of the remote unit 502, the distributed unit 503, the central unit 504, and the 5G core network 505.

The communication device 100 in each embodiment may be used for communication between at least one of the conveyor belt 601 and robot arms 602a and 602b, and the user equipment 501 or communication between the conveyor belt 601 and the robot arms 602a and 602b.

The system to which the communication device 100 in each embodiment can be applied is not limited to this, but can be any system. For example, the system can also be applied to industrial network systems in factories or plants that do not use 5G/local 5G, network systems inside vehicles and aircraft, and the like.

A program to be run by the communication device 100 (information processing device and communication control device) in each embodiment is provided in the storage 3, ROM (not shown), and the like, in advance and is provided. When the communication device 100 is implemented in FPGA, for example, the data for setting the FPGA configuration (configuration data) correspond to the programs.

The program to be run by the communication device 100 in each embodiment may be configured to be recorded on a computer-readable storage medium such as Compact Disk Read Only Memory (CD-ROM), Flexible Disk (FD), Compact Disk Recordable (CD-R), and Digital Versatile Disk (DVD) as files of an installable or executable format and to be provided as a computer program product.

Furthermore, the program to be run by the communication device 100 in each embodiment may be configured to be stored on a computer connected to a network such as the Internet, and to be provided by being downloaded via the network. Alternatively, the program to be run by the communication device 100 of the embodiments may be configured to be provided or distributed via a network such as the Internet.

The program to be run by the communication device 100 in each embodiment can cause the computer to function as each unit of the communication device 100. The program can be read on a main storage device from a computer-readable storage medium and run by the computer (processor).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication control device comprising:
   a transmission control unit configured to control transmission of a message stored in a queue based on transmission control information generated from gate control information in which open or close status of a gate corresponding to each of a plurality of queues is specified; and
   a communication unit configured to transmit the message under control of the transmission control unit, wherein
   the transmission control information indicates timing of next event related to the transmission of the message when the transmission of the message is controlled,
   the transmission control information includes a plurality of entries,
   each of the plurality of entries includes a period assigned to the entry, and
   the period is converted in advance from a time duration in units of time into a corresponding number of clock cycles based on an operation clock of the transmission control unit.

2. The communication control device of claim 1, further comprising:
   a temporary storage unit configured to temporarily store the transmission control information,
   wherein
   the transmission control unit is configured to control the transmission of the message based on transmission control information stored in the temporary storage unit.

3. The communication control device of claim 1, wherein
   the transmission control information includes transmittable information indicating a transmittable time or an amount of data of a transmittable message corresponding to each of the plurality of queues, as timing at which the event occurs, and
   the transmission control unit is configured to control the transmission of the message based on the transmittable information.

4. The communication control device of claim 1, further comprising:
   a first communication processing unit configured to transmit an undividable message via the communication unit;
   a second communication processing unit configured to transmit a dividable message via the communication unit; and
   a communication processing determination unit configured to determine transmitting the message stored in the queue by the first communication processing unit or the second communication processing unit, based on attribute information indicating an attribute of each of the plurality of queues.

5. The communication control device of claim 4, further comprising:
   a split transmission suppression unit,
   wherein
   the transmission control information includes, as the timing at which the event occurs, split transmission control information indicating time before transmission of the dividable message is stopped or resumed or an amount of data of a message transmittable before the transmission of the dividable message is stopped or resumed, and
   the split transmission suppression unit is configured to suppress the transmission of the dividable message from the second communication processing unit, based on the split transmission control information.

6. The communication control device of claim 1, further comprising:
   a transmission control information management unit configured to update the timing at which the event occurs, which is indicated by the transmission control information, in each operation clock of the transmission control unit.

7. An information processing device comprising:
   a transmission control information generation unit configured to generate transmission control information, based on gate control information in which open or close status of a gate corresponding to each of a plurality of queues is specified, wherein
   the transmission control information indicates timing of next event related to the transmission of the message when the transmission of the message stored in each of the plurality of queues is controlled,
the transmission control information includes a plurality of entries,
each of the plurality of entries includes a period assigned to the entry, and
the period is converted in advance from a time duration in units of time into a corresponding number of clock cycles based on an operation clock of a transmission control unit controlling the transmission of the message.

8. The information processing device of claim 7, wherein the transmission control information includes transmittable information indicating time before a gate corresponding to each of the plurality of queues is closed or an amount of data of a message transmittable before the gate is closed, as timing at which the event occurs.

9. The information processing device of claim 7, wherein the transmission control information includes, as the timing at which the event occurs, split transmission control information indicating time before transmission of the dividable message is stopped or resumed or an amount of data of a message transmittable before the transmission of the dividable message is stopped or resumed.

10. The information processing device of claim 7, wherein
the timing at which the event occurs and which is indicated by the transmission control information is updated in each operation clock of the transmission control unit controlling the transmission of the message.

11. A communication control method comprising:
controlling transmission of a message stored in a queue based on transmission control information generated from gate control information in which open or close status of a gate corresponding to each of a plurality of queues is specified; and
transmitting the message under the control, wherein
the transmission control information indicates timing of next event related to the transmission of the message when the transmission of the message is controlled,
the transmission control information includes a plurality of entries,
each of the plurality of entries includes a period assigned to the entry, and
the period is converted in advance from a time duration in units of time into a corresponding number of clock cycles based on an operation clock of a transmission control unit controlling the transmission of the message.

12. An information processing method comprising:
generating transmission control information, based on gate control information in which open or close status of a gate corresponding to each of a plurality of queues is specified, wherein
the transmission control information indicates timing of next event related to the transmission of the message when the transmission of the message stored in each of the plurality of queues is controlled,
the transmission control information includes a plurality of entries,
each of the plurality of entries includes a period assigned to the entry, and
the period is converted in advance from a time duration in units of time into a corresponding number of clock cycles based on an operation clock of a transmission control unit controlling the transmission of the message.

13. A non-transitory computer-readable storage medium having stored thereon a program which is executed by a computer of a communication control device, the program comprising instructions capable of causing the computer to execute functions of:
controlling transmission of a message stored in a queue based on transmission control information generated from gate control information in which open or close status of a gate corresponding to each of a plurality of queues is specified; and
transmitting the message under the control, wherein
the transmission control information indicates timing of next event related to the transmission of the message when the transmission of the message is controlled,
the transmission control information includes a plurality of entries,
each of the plurality of entries includes a period assigned to the entry, and
the period is converted in advance from a time duration in units of time into a corresponding number of clock cycles based on an operation clock of a transmission control unit controlling the transmission of the message.

14. A non-transitory computer-readable storage medium having stored thereon a program which is executed by a computer of an information processing device, the program comprising instructions capable of causing the computer to execute functions of:
generating transmission control information, based on gate control information in which open or close status of a gate corresponding to each of a plurality of queues is specified, wherein
the transmission control information indicates timing of next event related to the transmission of the message when the transmission of the message stored in each of the plurality of queues is controlled,
the transmission control information includes a plurality of entries,
each of the plurality of entries includes a period assigned to the entry, and
the period is converted in advance from a time duration in units of time into a corresponding number of clock cycles based on an operation clock of a transmission control unit controlling the transmission of the message.

* * * * *